US006434438B1

(12) United States Patent
Jin et al.

(10) Patent No.: US 6,434,438 B1
(45) Date of Patent: Aug. 13, 2002

(54) METHOD AND DEVICE FOR EVALUATING ASSEMBLABILITY AND REVERSE ASSEMBLABILITY

(75) Inventors: Keiichi Jin, Hirakata; Tadayuki Onoda, Toyonaka; Toshinori Otsuki; Kazuo Tatsukami, both of Yawata, all of (JP); Kenichiro Suzuki, Arlington Heights, IL (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/355,840

(22) PCT Filed: Dec. 2, 1998

(86) PCT No.: PCT/JP98/05432

§ 371 (c)(1),
(2), (4) Date: Aug. 5, 1999

(87) PCT Pub. No.: WO99/30258

PCT Pub. Date: Jun. 17, 1999

(30) Foreign Application Priority Data

Dec. 5, 1997 (JP) ............................................ 9-335820

(51) Int. Cl.[7] ............................................... G06F 19/00

(52) U.S. Cl. ............................ 700/95; 700/96; 700/97; 700/99; 700/105; 700/103; 700/117; 340/3.1; 340/3.9

(58) Field of Search ............................. 700/95, 96, 97, 700/99, 105, 117, 119, 103; 53/396, 397, 398; 340/3.1–3.9

(56) References Cited

U.S. PATENT DOCUMENTS 5,058,026 A * 10/1991 Kunii et al. .................. 700/95
5,086,337 A * 2/1992 Noro et al. ................... 357/79
5,442,563 A * 8/1995 Lee ............................ 700/95
5,691,895 A * 11/1997 Kurtzberg et al. ............ 700/97
5,710,700 A * 1/1998 Kurtzberg et al. ............ 700/28
5,717,598 A * 2/1998 Miyakawa et al. ........... 700/99
5,907,488 A * 5/1999 Arimoto et al. .............. 700/97
5,926,822 A * 7/1999 Garman ...................... 707/503
6,223,092 B1 * 4/2001 Miyakawa et al. ......... 700/103

FOREIGN PATENT DOCUMENTS

JP 6-251024 9/1994
JP 9-160959 6/1997
JP 96-190152 7/1997

OTHER PUBLICATIONS

Keiichi Jin, et al., Activities by Manufacturing Support Center, entitled "On new assemblability (reverse assemblability) evaluation technique", issued Mar. 1999.

* cited by examiner

*Primary Examiner*—Ramesh Patel
(74) *Attorney, Agent, or Firm*—Wenderoth, Lind & Ponack, L.L.P.

(57) ABSTRACT

With respect to a plurality of evaluation items for evaluating assemblability of an evaluation-target product, assemblability evaluation information as to the evaluation-target product is entered and an assemblability evaluation is performed based on the entered assemblability evaluation information. Simultaneously with the assemblability evaluation, a reverse-assemblability evaluation is performed based on reverse-assemblability evaluation information which is among the entered assemblability evaluation information and which is usable for evaluation items for performing the reverse-assemblability evaluation.

23 Claims, 39 Drawing Sheets

Fig.8

| COMPONENT NAME<br>COMPONENT NUMBER | | EVALUATION ITEM 1 | | EVALUATION ITEM 2 | | ......EVALUATION ITEM m | EVALUATION RESULT | |
|---|---|---|---|---|---|---|---|---|
| | | FOR ONE COMPONENT | FOR NUMBER OF COMPONENTS | FOR ONE COMPONENT | FOR NUMBER OF COMPONENTS | | | |
| α<br>3 | SELECTION | A : ○○ | ○○×3 | B : ☆☆ | ☆☆×3 | | SUM OF 1 - m EVALUATION SCORES | SUM×3 |
| | NUMERICAL INPUT | | | A : □□<br>B : △△ | □□×3<br>△△×3 | | SUM OF 1 - m NUMERICAL VALUES | SUM×3 |
| | MAN-HOUR | A : 10 | 10×3=30 | B : 10 | 10×3=30 | | SUM OF 1 - m NUMERICAL VALUES | SUM×3 |
| | SPECIAL FLAC | | | ON | 3 | | | |
| β<br>2<br>. . . . . . . . . . . . | | | | | | | | |

*Fig.10*

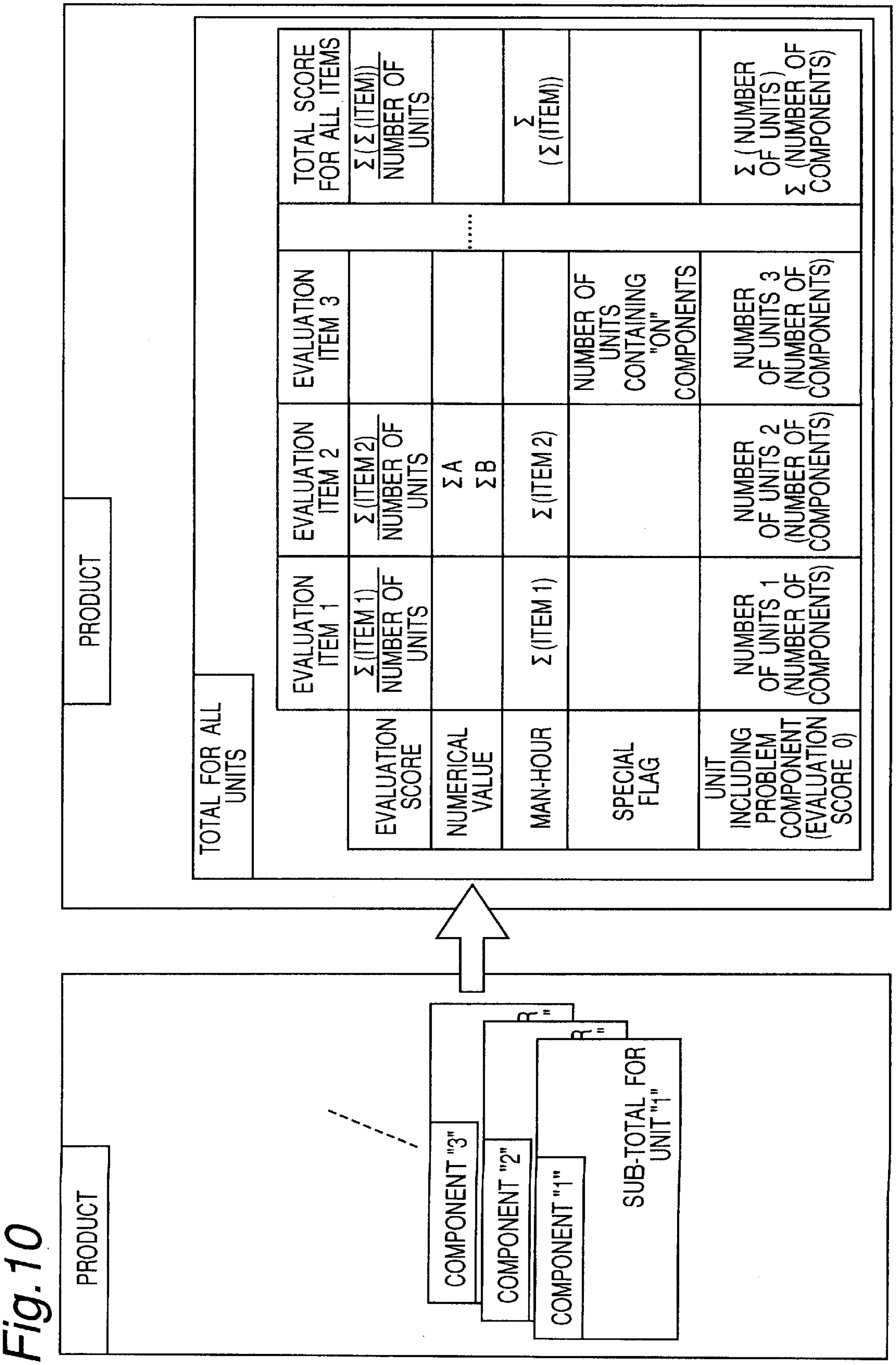

| | EVALUATION ITEM 1 | EVALUATION ITEM 2 | EVALUATION ITEM 3 | ...... | TOTAL SCORE FOR ALL ITEMS |
|---|---|---|---|---|---|
| EVALUATION SCORE | $\frac{\Sigma(\text{ITEM 1})}{\text{NUMBER OF UNITS}}$ | $\frac{\Sigma(\text{ITEM 2})}{\text{NUMBER OF UNITS}}$ | | | $\frac{\Sigma(\Sigma(\text{ITEM}))}{\text{NUMBER OF UNITS}}$ |
| NUMERICAL VALUE | | $\frac{\Sigma A}{\Sigma B}$ | | | |
| MAN-HOUR | $\Sigma$(ITEM 1) | $\Sigma$(ITEM 2) | | | $\Sigma(\Sigma(\text{ITEM}))$ |
| SPECIAL FLAG | | | NUMBER OF UNITS CONTAINING "ON" COMPONENTS | | |
| UNIT INCLUDING PROBLEM COMPONENT (EVALUATION SCORE 0) | NUMBER OF UNITS 1 (NUMBER OF COMPONENTS) | NUMBER OF UNITS 2 (NUMBER OF COMPONENTS) | NUMBER OF UNITS 3 (NUMBER OF COMPONENTS) | | $\Sigma$(NUMBER OF UNITS) $\Sigma$(NUMBER OF COMPONENTS) |

Fig. 16

| MAJOR ITEM | EVALUATION ITEM | QUESTION | SELECTIONAL ITEM | ASSEMBLY SCORE | REVERSE-ASSEMBLABILITY SCORE, EVALUATION | |
|---|---|---|---|---|---|---|
| | | | | | | |
| MATERIAL | WEIGHT | WEIGHT ? | [ ] g | | | |
| | COMPONENT FORMATION / MATERIAL | HOW IS THE COMPONENT MAKED UP ? | A.SINGLE-UNIT COMPONENT<br>B.COMPOSITE COMPONENT<br>C.SEMIFINISHED PRODUCT | | | |
| | | WHICH MATERIAL IS USED ? | A.METAL<br>B.RESIN<br>C.WOOD<br>D.OTHERS<br>E.HARMFUL SUBSTANCE | | 10<br>5<br>2<br>1<br>0 | |
| | | IS ANY COMBINATION TYPE OTHER THAN MECHANICAL USED WITHIN THE COMPOSITE COMPONENT ? | A.NO<br>B.YES | | 5<br>0 | |
| | | | | | | |
| | PREPROCESSING | IS PREPROCESSING NECESSARY ? | A.YES<br>B.NO | | 0<br>5 | |
| PREPARATION OF BASE COMPONENTS | MATERIAL | IS COMPONENT OF THE SAME MATERIAL ? | A.YES<br>B.NO | | | USED FOR NECESSITY OR UNNECESSITY OF DISASSEMBLY |
| | POSTURE CHANGE OF BASE COMPONENTS | IS POSTURE CHANGE OF BASE COMPONENTS NECESSARY ? | A.UNNECESSARY<br>B.NECESSARY | 5<br>0 | | |

Fig. 17

| MAJOR ITEM | EVALUATION ITEM | QUESTION | SELECTIONAL ITEM | ASSEMBLY SCORE | REVERSE-ASSEMBLABILITY SCORE, EVALUATION | |
|---|---|---|---|---|---|---|
| PREPARATION OF BASE COMPONENTS | BASE COMPONENT SIDE JIGS | IS ANY JIG FITTING UP COMPONENT NECESSARY ? | A.UNNECESSARY<br>B.NECESSARY | 5<br>0 | | |
| COMPONENT SUPPLIABILITY | POSTURE CHANGE OF ASSEMBLY COMPONENTS | IS ANY POSTURE CHANGE OF COMPONENT NECESSARY ? | A.UNNECESSARY<br>B.NECESSARY | 5<br>0 | | |
| | FRAGILITY, VULNERABILITY | IS THE COMPONENT SUBJECT TO DAMAGE ? | A.NO<br>B.YES | 5<br>0 | | |
| | INDEFINITE SHAPE | IS THE COMPONENT SHAPE DEFINITE ? | A.DEFINITE<br>B.INDEFINITE | 5<br>0 | | |
| | OUTLINE CHARACTERISTICS | IS THE COMPONENT EASY TO ALIGN ? | A.EASY<br>B.NOT EASY | 5<br>0 | | |
| | OVERLAP<br>FIT-IN<br>ENTANGLEMENT<br>AFFIXATION | IS THERE ANY OVERLAP, FIT-IN, ENTANGLEMENT, OR AFFIXATION ? | A.NO<br>B.YES | 5<br>0 | | |

Fig.18

| MAJOR ITEM | EVALUATION ITEM | QUESTION | SELECTIONAL ITEM | ASSEMBLY SCORE | REVERSE-ASSEMBLABILITY SCORE, EVALUATION | |
|---|---|---|---|---|---|---|
| HOLDABILITY | CHUCKING ABILITY (1) | WHAT CHUCK IS USED ? | A.GENERAL CHUCK<br>B.SPECIAL CHUCK<br>C.CANNOT BE CHUCKED | 3<br>2<br>0 | | |
| | CHUCKING ABILITY (2) | IS THERE SPACE TO INSERT A CHUCK ? | A.YES<br>B.NO | 5<br>0 | | |
| ASSEMBLABILITY | POSITIONABILITY | AS TO POSITIONING | A.ALIGNABLE<br>B.LESS ALIGNABLE<br>C.NOT ALIGNABLE | 5<br>3<br>0 | | |
| | DIRECTION AND OPERATION | AS TO DIRECTION AND OPERATION | A.SIMPLE FROM UPWARD<br>B.SIMPLE FROM OTHER THAN UPWARD<br>C.COMPLEX IN BOTH DIRECTION AND OPERATION | 10<br>5<br>0 | 10<br>5<br>0 | |
| | STABILITY | IS THERE STABILITY OF ASSEMBLY COMPONENT ? | A.YES<br>B.NO | 5<br>0 | | |

Fig. 19

| MAJOR ITEM | EVALUATION ITEM | QUESTION | SELECTIONAL ITEM | ASSEMBLY SCORE | REVERSE-ASSEMBLABILITY SCORE, EVALUATION | |
|---|---|---|---|---|---|---|
| COMBINABILITY | CASE OF SCREWING | IS PRE- OR POST-PROCESSING WORK NECESSARY? | A.UNNECESSARY<br>B.NECESSARY | | | |
| | | DOES THE COMPONENT HAVE SHARABILITY OF SCREWS? | A.YES<br>B.NO | | | |
| | | AS TO DIRECTION AND METHOD | A.ONE SCREW FROM UPWARD<br>B.A FEW SCREWS FROM UPWARD<br>C.SCREWING FROM OTHER THAN UPWARD | 10<br>5<br>0 | | USED FOR NECESSITY OR UNNECESSITY OF DISASSEMBLY |
| | CASE OF OTHER THAN SCREWING | IS THERE PREPARATION OR PROCESSING WORK? | A.NO<br>B.YES | | | |
| | | AS TO COMBINATION TYPE | A.FIT-IN<br>B.PRESS-FITTING OR CAULKING<br>C.MECHANICAL COMPONENT<br>D.SPOT WELDING<br>E.SOLDERING<br>F.INDEFINITE TIGHTENING<br>G.DIFFICULT-TO-AUTOMATIZE | 20<br>15<br>10<br>8<br>5<br>2<br>0 | 20<br>20<br>20<br>10<br>5<br>10<br>0 | |

Fig.20

| MAJOR ITEM | EVALUATION ITEM | QUESTION | SELECTIONAL ITEM | ASSEMBLY SCORE | REVERSE-ASSEMBLABILITY SCORE, EVALUATION | |
|---|---|---|---|---|---|---|
| COMBINABILITY | | HOW MANY METHODS AND TYPES OF COMBINATION ARE INVOLVED? | (see grid below) | | | |
| | | | | | | |
| NECESSITY OR UNNECESSITY OF ADJUSTMENT | NECESSITY OR UNNECESSITY OF ADJUSTMENT | IS ADJUSTMENT WORK NECESSARY? | A.UNNECESSARY<br>B.NECESSARY | | | |
| SHARABILITY | SHARABILITY | IS THERE SHARABILITY? | A.YES<br>B.NO | 5<br>0 | | |
| COMPONENT OMISSION | NECESSITY OR UNNECESSITY OF COMPONENT | IS THE COMPONENT NECESSARY? | COMPONENT INTEGRATION (YES/NO) | | | |
| REUSABILITY | THEORETICAL REUSABILITY | POSSIBILITY OF REUSE? | 1.WEAR (YES/NO)<br>2.DETERIORATION (YES/NO)<br>3.FLAW (YES/NO) | | | |

| | UP | DOWN | FRONT | BACK | LEFT | RIGHT |
|---|---|---|---|---|---|---|
| A | | | | | | |
| A | | | | | | |
| | | | | | | |
| E | | | | | | |
| G | | | | | | |
| | | | | | | |
| | | | | | | |

Fig.22

①WEIGHT OF DISASSEMBLY-TARGET COMPONENT / UNIT ?
②EASY-TO-UNDO TIGHTENING METHOD ? (INPUT UNNECESSARY---AUTOMATICALLY ENTERED FROM ASSEMBLABILITY EVALUATION)
- TIGHTENING BY SCREWS / TIGHTENING BY OTHER THAN SCREWS
- TYPE OF UNTIGHTENING TOOLS···BARE HAND / GENERAL TOOLS (SCREWDRIVER ETC.) / JIGS AND EQUIPMENT)

③IS PREPROCESSING FOR UNTIGHTENING NECESSARY ?
- DEWATERING, DEGASSING, DERUSTING ETC. FOR UNTIGHTENING

④TIGHTENING DIRECTION ?
- DEGREE OF CONCENTRATION OF UNTIGHTENING DIRECTIONS
···THE FIRST UNTIGHTENING DIRECTION IS REGARDED AS TOP FACE (A) OR FRONT FACE (B)

⑤IS REMOVAL OPERATION SIMPLE ?
(INPUT UNNECESSARY---AUTOMATICALLY ENTERED FROM ASSEMBLABILITY EVALUATION)
- ACCORDING TO ITEMS OF ASSEMBLABILITY EVALUATION
(WHERE ONE-OPERATION REMOVAL FROM TOP OR FRONT FACE IS GOOD)

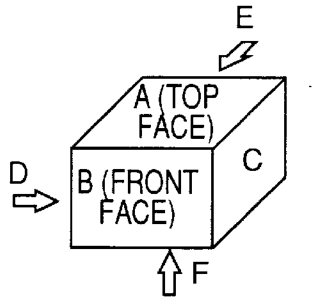

□ EVALUATION SCORE

| UNTIGHTENING SCORE | | NUMBER OF UNTIGHTENING PLACES AND UNTIGHTENING DIRECTIONS | | | | | | DIRECTION SCORE | NECESSARY TOOLS | REMOVAL OPERATION (SCORE ALLOCATION) | |
|---|---|---|---|---|---|---|---|---|---|---|---|
| SCREWS | OTHER THAN SCREWS | UP | FRONT | LEFT | RIGHT | BACK | DOWN | | | | |
| 20 | 20 | | | | | | | LESS THAN 4 DIRECTIONS=10 | BARE HAND, SCREWDRIVER, NIPPER, PLIERS, ETC. | ONE OPERATION | 20 |
| 15 | 10 | | | | | | | NOT LESS THAN 4 DIRECTIONS=0 | POWER TOOL, SOLDERING IRON, HAMMER, CHISEL, ETC. | TWO OPERATIONS | 10 |
| 10 | 0 | | | | | | | | OTHER JIGS, SPECIAL DEVICE, ETC. | COMPLEX OPERATION | 0 |
| SUM | | | | | | | | | | | |

COMPONENT EVALUATION & TOTAL EVALUATION

Fig.23

| PRODUCT NAME | PRODUCT A |
|---|---|

| No. | COMPONENT NAME | COMPONENT NUMBER | SEMI-FINISHED PRODUCT | BASE COMPONENT | COMPONENT NUMBER |
|---|---|---|---|---|---|
| 1 | FRAME | 100 | | JIG | 0 |
| 2 | AGITATION U | 110 | * | FRAME | 100 |
| 3 | SENSOR | 101 | | AGITATION U | 110 |
| 4 | SENSOR COVER | 102 | | AGITATION U | 110 |
| 5 | STAY | 103 | | FRAME | 100 |
| 6 | BLADE | 104 | | STAY | 103 |
| 7 | DRUM U | 120 | * | FRAME | 100 |
| 8 | DRUM COVER U | 130 | * | FRAME | 100 |
| 9 | FRAME COVER | 106 | | FRAME | 100 |
| 10 | GROUND TERMINAL | 107 | | FRAME COVER | 106 |
| 11 | POWER CORD | 108 | | AGITATION U | 110 |
| 12 | NAMEPLATE | 109 | | FRAME | 100 |
| 13 | | | | | |
| 14 | | | | | |
| 15 | | | | | |
| 16 | | | | | |
| 17 | | | | | |
| 18 | | | | | |
| 19 | | | | | |
| 20 | | | | | |
| | SUB-TOTAL / AVERAGE | | 3 | | |
| | RATE OF ITEMS | | | | |
| | NUMBER OF 0 SCORE | | 0 | | |

| RATE OF POSTURE CHANGE $\beta$ | 18.18% |
|---|---|
| NUMBER OF ACTUAL COMPONENTS | 9 |
| NUMBER OF OMITTABLE COMPONENTS n | 2 |

Fig.24

| UNIT NAME | COMPLETION OF PRODUCT A | BLOCK NAME | X BLOCK |
|---|---|---|---|

| BASE COMPONENT | | COMPONENT SUPPLIABILITY | | | | | HOLDABILITY | | ASSENBLABILITY | | |
|---|---|---|---|---|---|---|---|---|---|---|---|
| ⑩ | ⑪ | ⑩ | ⑫ | ⑬ | ⑭ | ⑮ | (1) | (2) | ⑯ | ⑰ | ⑱ |
| AB | ABC | ABC | ABC | AB | ABC | AB | ABC | AB | ABC | ABC | AB |
| ------ | ------ | 2 | 3 | 10 | 3 | 3 | 2 | 3 | ------ | ------ | ------ |
| 5 | 2 | 2 | 0 | 10 | 3 | 0 | 2 | 3 | 5 | 10 | 5 |
| 0 | 1 | 0 | 0 | 0 | 0 | 3 | 2 | 0 | 5 | 0 | 5 |
| 5 | 2 | 2 | 3 | 10 | 3 | 0 | 5 | 3 | 10 | 20 | 5 |
| 0 | 2 | 2 | 3 | 10 | 0 | 3 | 2 | 3 | 5 | 10 | 5 |
| 5 | 2 | 2 | 0 | 0 | 3 | 0 | 0 | 3 | 0 | 0 | 0 |
| 5 | 2 | 2 | 3 | 10 | 3 | 3 | 5 | 3 | 10 | 10 | 5 |
| 5 | 2 | 2 | 3 | 10 | 0 | 3 | 5 | 3 | 5 | 10 | 5 |
| 5 | 2 | 2 | 3 | 10 | 3 | 3 | 5 | 3 | 10 | 10 | 5 |
| 5 | 2 | 0 | 3 | 0 | 0 | 0 | 0 | 0 | 0 | 0 | 0 |
| 5 | 2 | 0 | 3 | 0 | 3 | 0 | 0 | 3 | 0 | 0 | 0 |
| 5 | 2 | 2 | 0 | 0 | 0 | 0 | 0 | 3 | 0 | 20 | 5 |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| 4.09 | 1.91 | 1.50 | 2.00 | 5.83 | 1.75 | 1.50 | 2.33 | 2.50 | 4.91 | 8.18 | 3.64 |
| 0.82 | 0.95 | 0.50 | 0.67 | 0.58 | 0.58 | 0.50 | 0.47 | 0.83 | 0.49 | 0.41 | 0.73 |
| 2 | 0 | 3 | 4 | 5 | 5 | 6 | 4 | 2 | 4 | 4 | 3 |

| BASIC EVALUATION SCORE $\alpha = (\Sigma R * n / \Sigma n)$ | 49.00 |
|---|---|
| EVALUATION INDEX $C = (\Sigma R * n - \Sigma R' * n') / \Sigma n$ | 35.73 |

⑩ : POSTURE CHANGE
⑪ : JIG
⑫ : FRAGILITY
⑬ : INDEFINITE SHAPE
⑭ : OUTLINE CHARACTERISTICS
⑮ : OVERLAP / FIT-IN
⑯ : POSITIONABILITY
⑰ : ASSEMBLY DIRECTION, ASSEMBLY OPERATION
⑱ : STABILITY

Fig.25

| PRODUCT NAME | PRODUCT A |
|---|---|

| No. | COMPONENT NAME | COMPONENT NUMBER | SEMI-FINISHED PRODUCT |
|---|---|---|---|
| 1 | FRAME | 100 | |
| 2 | AGITATION U | 110 | * |
| 3 | SENSOR | 101 | |
| 4 | SENSOR COVER | 102 | |
| 5 | STAY | 103 | |
| 6 | BLADE | 104 | |
| 7 | DRUM U | 120 | * |
| 8 | DRUM COVER U | 130 | * |
| 9 | FRAME COVER | 106 | |
| 10 | GROUND TERMINAL | 107 | |
| 11 | POWER CORD | 108 | |
| 12 | NAMEPLATE | 109 | |
| 13 | | | |
| 14 | | | |
| 15 | | | |
| 16 | | | |
| 17 | | | |
| 18 | | | |
| 19 | | | |
| 20 | | | |
| | SUB-TOTAL / AVERAGE | | 3 |
| | RATE OF ITEMS | | |
| | NUMBER OF 0 SCORE | | 0 |

Fig.26

| COMBINABILITY | | | | | | | | | | | | | | | | | | | | | |
|---|---|---|---|---|---|---|---|---|---|---|---|---|---|---|---|---|---|---|---|---|---|
| SCREWING | | | | | | | | | OTHER THAN SCREWING | | | | | | | | | | | ⑫ |
| NUMBER OF COMBINING PLACES | | | | | JUDGMENT FOR COMBINABILITY | | ⑩ | ⑪ | NUMBER OF COMBINING PLACES | | | | | | | JUDGMENT FOR COMBINABILITY | | ⑩ | | |
| A | B | C | D | E | ABCDE | | | | A | B | C | D | E | F | G | ABCDEF | | | | |
| --- | --- | --- | --- | --- | ------- | ------- | --- | --- | --- | --- | --- | --- | --- | --- | --- | ------- | ------- | --- | ------- | |
| | | 4 | | | 10 | 10.00 | | | | | | | | | | | | | 10.00 | |
| | | | | | | | | | 2 | 2 | | | | | | 16 | 16.00 | | 16.00 | |
| | 2 | | | | 12 | 6.00 | 2 | | | | | | | | | | | | 6.00 | |
| | | | 2 | | 6 | 6.00 | | | | | | | | | | | | | 6.00 | |
| | | | | | | | | | | | | 1 | | | | 8 | 4.00 | 1 | 4.00 | |
| | | | | | | | | | | | | 2 | | | | 8 | 8.00 | | 8.00 | |
| | | | | | | | | | | 2 | | | | | | 16 | 8.00 | 2 | 8.00 | |
| | | | | | | | | | | 2 | | | | | | 16 | 16.00 | | 16.00 | |
| 1 | | | | | 16 | 16.00 | | | | | | | | 2 | | 0 | 0.00 | | 0.00 | |
| | 2 | | | | 12 | 6.00 | 2 | | | | | | | 2 | | 0 | 0.00 | | 0.00 | |
| | | | | | | | | | | | | | | | | 8 | 8.00 | | 8.00 | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| | | | | | | | | | | | | | | | | | | | | |
| 1 | 4 | 4 | 2 | 0 | 5.09 | 4.00 | 4 | 0 | 2 | 6 | 0 | 0 | 0 | 4 | 0 | 6.55 | 5.45 | 3 | 7.45 | |
| TOTAL | | | | 11 | 0.32 | 0.25 | ⑬ | 4 | | | | | TOTAL | | 16 | 0.33 | 0.27 | 3 | 0.37 | |
| | | | | | | 0 | | | | | | | | | | | 2 | | 2 | |

| SCORE DISTRIBUTION | UNDER 40 | 40- | 50- | 60- | 70- | OVER 80 |
|---|---|---|---|---|---|---|
| NUMBER OF COMPONENTS | 2 | 0 | 2 | 0 | 9 | 4 |

| RATE OF SHARING | 25.00% |
|---|---|

⑩ : PROCESSING
⑪ : SHARABILITY
⑫ : CONCLUSION FOR COMBINABILITY
⑬ : TOTAL

Fig.27

| PRODUCT NAME | PRODUCT A |
|---|---|

| No. | COMPONENT NAME | COMPONENT NUMBER | SEMI-FINISHED PRODUCT |
|---|---|---|---|
| 1 | FRAME | 100 | |
| 2 | AGITATION U | 110 | * |
| 3 | SENSOR | 101 | |
| 4 | SENSOR COVER | 102 | |
| 5 | STAY | 103 | |
| 6 | BLADE | 104 | |
| 7 | DRUM U | 120 | * |
| 8 | DRUM COVER U | 130 | * |
| 9 | FRAME COVER | 106 | |
| 10 | GROUND TERMINAL | 107 | |
| 11 | POWER CORD | 108 | |
| 12 | NAMEPLATE | 109 | |
| 13 | | | |
| 14 | | | |
| 15 | | | |
| 16 | | | |
| 17 | | | |
| 18 | | | |
| 19 | | | |
| 20 | | | |
| | SUB-TOTAL / AVERAGE | | 3 |
| | RATE OF ITEMS | | |
| | NUMBER OF 0 SCORE | | 0 |

Fig.28

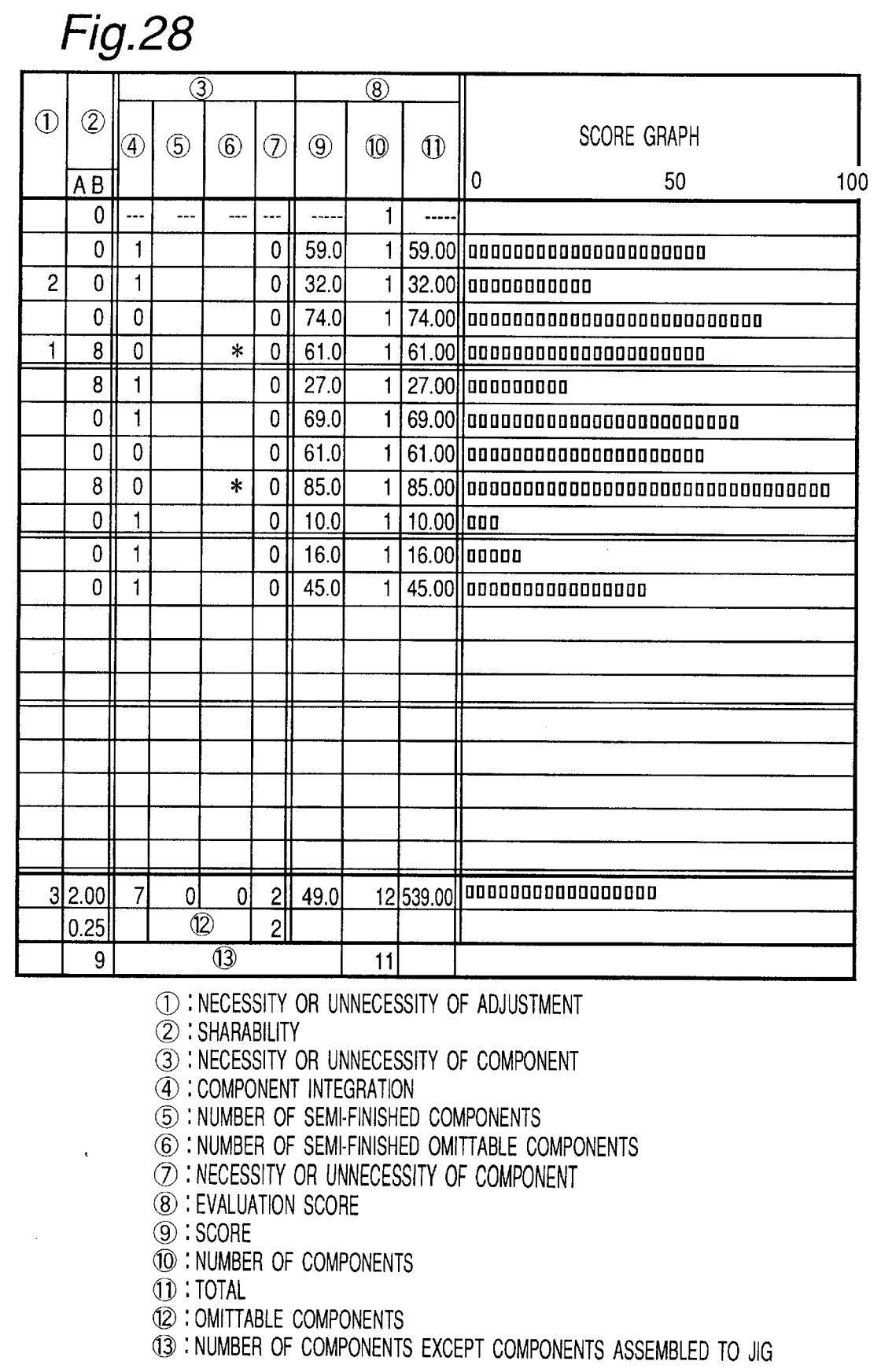

| ① | ② | ③ | | | | ⑧ | | | SCORE GRAPH |
|---|---|---|---|---|---|---|---|---|---|
| | AB | ④ | ⑤ | ⑥ | ⑦ | ⑨ | ⑩ | ⑪ | 0 50 100 |
| | 0 | --- | --- | --- | --- | ----- | 1 | ----- | |
| | 0 | 1 | | | 0 | 59.0 | 1 | 59.00 | |
| 2 | 0 | 1 | | | 0 | 32.0 | 1 | 32.00 | |
| | 0 | 0 | | | 0 | 74.0 | 1 | 74.00 | |
| 1 | 8 | 0 | | * | 0 | 61.0 | 1 | 61.00 | |
| | 8 | 1 | | | 0 | 27.0 | 1 | 27.00 | |
| | 0 | 1 | | | 0 | 69.0 | 1 | 69.00 | |
| | 0 | 0 | | | 0 | 61.0 | 1 | 61.00 | |
| | 8 | 0 | | * | 0 | 85.0 | 1 | 85.00 | |
| | 0 | 1 | | | 0 | 10.0 | 1 | 10.00 | |
| | 0 | 1 | | | 0 | 16.0 | 1 | 16.00 | |
| | 0 | 1 | | | 0 | 45.0 | 1 | 45.00 | |
| 3 | 2.00 | 7 | 0 | 0 | 2 | 49.0 | 12 | 539.00 | |
| | 0.25 | | ⑫ | | 2 | | | | |
| | 9 | ⑬ | | | | | 11 | | |

①: NECESSITY OR UNNECESSITY OF ADJUSTMENT
②: SHARABILITY
③: NECESSITY OR UNNECESSITY OF COMPONENT
④: COMPONENT INTEGRATION
⑤: NUMBER OF SEMI-FINISHED COMPONENTS
⑥: NUMBER OF SEMI-FINISHED OMITTABLE COMPONENTS
⑦: NECESSITY OR UNNECESSITY OF COMPONENT
⑧: EVALUATION SCORE
⑨: SCORE
⑩: NUMBER OF COMPONENTS
⑪: TOTAL
⑫: OMITTABLE COMPONENTS
⑬: NUMBER OF COMPONENTS EXCEPT COMPONENTS ASSEMBLED TO JIG

Fig.29

COMPONENT NUMBER

| PRODUCT NAME | PRODUCT A | UNIT NAME | COMPLETION OF PRODUCT A |
|---|---|---|---|

| No. | COMPONENT NAME | COMPONENT NUMBER | SEMI-FINISHED PRODUCT | BASE COMPONENT | COMPONENT NUMBER | BASE COMPONENT / MATERIAL / MATERIAL NAME | COMPONENT FORMATION A① B② C P D③ |
|---|---|---|---|---|---|---|---|
| 1 | FRAME | 100 | | JIG | 0 | -------------------- | ① |
| 2 | AGITATION U | 110 | * | FRAME | 100 | IRON (STEEL) | ③ |
| 3 | SENSOR | 101 | | AGITATION U | 110 | STYRENE (ABS) | ② |
| 4 | SENSOR COVER | 102 | | AGITATION U | 110 | STYRENE (ABS) | ① |
| 5 | STAY | 103 | | FRAME | 100 | IRON (STEEL) | ① |
| 6 | BLADE | 104 | | STAY | 103 | IRON (STEEL) | ① |
| 7 | DRUM U | 120 | * | FRAME | 100 | IRON (STEEL) | ③ |
| 8 | DRUM COVER U | 130 | * | FRAME | 100 | IRON (STEEL) | ③ |
| 9 | FRAME COVER | 106 | | FRAME | 100 | IRON (STEEL) | ① |
| 10 | GROUND TERMINAL | 107 | | FRAME COVER | 106 | IRON (STEEL) | ② |
| 11 | POWER CORD | 108 | | AGITATION U | 110 | STYRENE (ABS) | ② |
| 12 | NAMEPLATE | 109 | | FRAME | 100 | IRON (STEEL) | ① |
| 13 | | | | | | | |
| 14 | | | | | | | |
| 15 | | | | | | | |
| 16 | | | | | | | |
| 17 | | | | | | | |
| 18 | | | | | | | |
| 19 | | | | | | | |
| 20 | | | | | | | |
| | SUB-TOTAL / AVERAGE | | 3 | | | | |
| | RATE OF ITEMS | | ④ | | | | |
| | NUMBER OF 0 SCORE / WEIGHT | | | | | 0 | 0 |

| | |
|---|---|
| NUMBER OF RECYCLABLE COMPONENTS | 3 |
| NUMBER OF ACTUAL COMPONENTS TO BE DISASSEMBLED | 9 |
| RATE OF MATERIAL RECYCLABILITY (IN WEIGHT RATIO) | 85.71% |
| WEIGHT (g) OF COMPONENTS CONTAINING ENVIRONMENTALLY LOADING CHEMICAL SUBSTANCES | 61 |
| TOTAL WEIGHT (g) | 427 |

①: SINGLE COMPONENT
②: COMPOSITE PRODUCT
③: SEMIFINISHED PRODUCT
④: NUMBER OF SEMI-FINISHED PRODUCT COMPONENTS TO BE DISASSEMBLED

*Fig.30*

| PRODUCT NAME | PRODUCT A |
|---|---|

| No. | COMPONENT NAME | COMPONENT NUMBER | SEMI-FINISHED PRODUCT |
|---|---|---|---|
| 1 | FRAME | 100 | |
| 2 | AGITATION U | 110 | * |
| 3 | SENSOR | 101 | |
| 4 | SENSOR COVER | 102 | |
| 5 | STAY | 103 | |
| 6 | BLADE | 104 | |
| 7 | DRUM U | 120 | * |
| 8 | DRUM COVER U | 130 | * |
| 9 | FRAME COVER | 106 | |
| 10 | GROUND TERMINAL | 107 | |
| 11 | POWER CORD | 108 | |
| 12 | NAMEPLATE | 109 | |
| 13 | | | |
| 14 | | | |
| 15 | | | |
| 16 | | | |
| 17 | | | |
| 18 | | | |
| 19 | | | |
| 20 | | | |
| | SUB-TOTAL / AVERAGE | | 3 |
| | RATE OF ITEMS | | |
| | NUMBER OF 0 SCORE / WEIGHT | | 0 |

Fig.31

| BLOCK NAME | X BLOCK |
|---|---|

CONCLUSION

| | COMPONENT CHARACTERISTICS | | | | | | | | | | | |
|---|---|---|---|---|---|---|---|---|---|---|---|---|
| | MATERIAL | | | | | | | | WEIGHT | ① | ② | ⑤ |
| | MATERIAL JUDGMENT | | | | | | | | | | | |
| | A | B | C | D | E | F | G | | g | AB | AB | ABCD |
| IRON (STEEL) | 1 | | | | | | | 40 | 291.00 | 10 | | ------ |
| STYRENE (ABS) | 1 | | 2 | | | 1 | | ----- | --------- | ----- | | 2 |
| ALUMINUM | 1 | 1 | 1 | | 1 | 1 | 1 | 0 | 31.00 | 10 | * | 0 |
| POLYPROPYLENE (PP) | | | 1 | | | | | 25 | 10.00 | 10 | | 5 |
| IRON (STEEL) | 1 | | | | | | | 40 | 33.00 | 10 | | 2 |
| POLYACETAL (POM) | | | 1 | | | | | 25 | 6.00 | 10 | | 0 |
| IRON (STEEL) | 2 | | 1 | | | | | ----- | | ----- | | 2 |
| POLYESTER (PET,P | 1 | | 1 | | | | | ----- | --------- | ----- | | 2 |
| IRON (STEEL) | 1 | | | | | | 1 | 0 | 17.00 | 10 | | 2 |
| POLYVINYL CHLORIDE (PVC) | 1 | | 1 | | | | 1 | 0 | 13.00 | 10 | | 0 |
| COPPER | 2 | | 1 | | | | | 25 | 24.00 | 0 | * | 0 |
| POLYESTER (PET,PBT) | | | 1 | | | | | 25 | 2.00 | 10 | | 5 |
| | 11 | 1 | 10 | 0 | 1 | 2 | 3 | 20.00 | 427.00 | 8.89 | 2 | 1.82 |
| | TOTAL | | | | | | 28 | 0.50 | ③ | 0.89 | ④ | 0.36 |
| WEIGHT ACCORDING TO RECYCLABILITY RANK | 341.00 | 0.00 | 18.00 | 0.00 | 0.00 | 0.000 | 17.00 | 3 | 366.00 | 1 | | 4 |

| | |
|---|---|
| REVERSE-ASSEMBLABILITY EVALUATION SCORE | 51.81 |
| MATERIAL SCORE (FULL : 50 POINTS) | 27.5 |
| DISASSEMBLY SCORE (FULL : 50 POINTS) | 27.09 |

| | |
|---|---|
| NUMBER OF UNNECESSARY-TO-DISASSEMBLE COMPONENTS | 1 |

①: PREPROCESSING
②: PRESENCE OF EXCEPT MECHANICAL TIGHTENING
③: TOTAL WEIGHT
④ : NUMBER OF COMPONENTS INVOLVING TIGHTENING OTHER THAN MECHANICAL
⑤ : DISASSEMBLING DIRECTION, DISASSEMBLING OPERATION

*Fig.32*

| PRODUCT NAME | PRODUCT A |
|---|---|

| No. | COMPONENT NAME | COMPONENT NUMBER | SEMI-FINISHED PRODUCT |
|---|---|---|---|
| 1 | FRAME | 100 | |
| 2 | AGITATION U | 110 | * |
| 3 | SENSOR | 101 | |
| 4 | SENSOR COVER | 102 | |
| 5 | STAY | 103 | |
| 6 | BLADE | 104 | |
| 7 | DRUM U | 120 | * |
| 8 | DRUM COVER U | 130 | * |
| 9 | FRAME COVER | 106 | |
| 10 | GROUND TERMINAL | 107 | |
| 11 | POWER CORD | 108 | |
| 12 | NAMEPLATE | 109 | |
| 13 | | | |
| 14 | | | |
| 15 | | | |
| 16 | | | |
| 17 | | | |
| 18 | | | |
| 19 | | | |
| 20 | | | |
| | SUB-TOTAL / AVERAGE | | 3 |
| | RATE OF ITEMS | | |
| | NUMBER OF 0 SCORE / WEIGHT | | 0 |

*Fig.33*

| COMBINABILITY | | | | | | | | | | | | | | | | |
|---|---|---|---|---|---|---|---|---|---|---|---|---|---|---|---|---|
| SCREWING | | | | | | | OTHER THAN SCREWING | | | | | | | | | ① |
| NUMBER OF COMBINING PLACES | | | | | JUDGMENT FOR DE-COMBINABILITY | | NUMBER OF COMBINING PLACES | | | | | | | JUDGMENT FOR DE-COMBINABILITY | | |
| A | B | C | D | E | ABCDE | | A | B | C | F | D | E | G | ABCDEF | | |
| --- | --- | --- | --- | --- | ------- | ------- | --- | --- | --- | --- | --- | --- | --- | ------- | ------- | ------- |
| | | 4 | | | 20 | 20.00 | | | | | | | | | | 20.00 |
| | | | | | | | 2 | 2 | | | | | | 15 | 15.00 | 15.00 |
| | 2 | | | | 20 | 20.00 | | | | | | | | | | 20.00 |
| | | | 2 | | 15 | 15.00 | | | | | | | | | | 15.00 |
| | | | | | | | | | | | 1 | | | 5 | 5.00 | 5.00 |
| | | | | | | | | | | | 2 | | | 5 | 5.00 | 5.00 |
| | | | | | | | | 2 | | | | | | 15 | 15.00 | 15.00 |
| | | | | | | | | 2 | | | | | | 15 | 15.00 | 15.00 |
| 1 | | | | | 20 | 20.00 | | | | 2 | | | | 10 | 10.00 | 10.00 |
| | 2 | | | | 20 | 20.00 | | | | 2 | | | | 10 | 10.00 | 10.00 |
| | | | | | | | | | | | 1 | | | 5 | 5.00 | 5.00 |
| | | | | | | | | | | | | | | | | |
| | | | | | | | | | | | | | | | | |
| | | | | | | | | | | | | | | | | |
| | | | | | | | | | | | | | | | | |
| | | | | | | | | | | | | | | | | |
| | | | | | | | | | | | | | | | | |
| | | | | | | | | | | | | | | | | |
| | | | | | | | | | | | | | | | | |
| 1 | 4 | 4 | 2 | 0 | | 8.64 | 2 | 6 | 0 | 4 | 0 | 0 | 0 | | 7.27 | 12.27 |
| | | | TOTAL | 11 | | 0.27 | | | | | | TOTAL | 16 | | 0.36 | 0.61 |
| | | | | | | 6 | | | | | | | | | 3 | 0 |

| A | B | C | D | E | ② | | A | B | C | F | D | E | G |
|---|---|---|---|---|---|---|---|---|---|---|---|---|---|
| 1 | 2 | 4 | 0 | 0 | ③ | 12 | 0 | 2 | 0 | 2 | 1 | 0 | 0 |
| 0 | 2 | 0 | 0 | 0 | ④ | 6 | 2 | 2 | 0 | 0 | 0 | 0 | 0 |
| 0 | 0 | 0 | 0 | 0 | ⑤ | 5 | 0 | 0 | 0 | 2 | 3 | 0 | 0 |
| 0 | 0 | 0 | 0 | 0 | ⑥ | 0 | 0 | 0 | 0 | 0 | 0 | 0 | 0 |
| 0 | 0 | 0 | 1 | 0 | ⑦ | 2 | 0 | 1 | 0 | 0 | 0 | 0 | 0 |
| 0 | 0 | 0 | 1 | 0 | ⑧ | 2 | 0 | 1 | 0 | 0 | 0 | 0 | 0 |

① : CONCLUSION FOR COMBINABILITY
② : TOTAL OF NUMBER OF DIRECTIONS
③ : UPWARD
④ : DOWNWARD
⑤ : FORWARD
⑥ : BACKWARD
⑦ : LEFTWARD
⑧ : RIGHTWARD

Fig.34

| PRODUCT NAME | PRODUCT A |
|---|---|

| No. | COMPONENT NAME | COMPONENT NUMBER | SEMI-FINISHED PRODUCT |
|---|---|---|---|
| 1 | FRAME | 100 | |
| 2 | AGITATION U | 110 | * |
| 3 | SENSOR | 101 | |
| 4 | SENSOR COVER | 102 | |
| 5 | STAY | 103 | |
| 6 | BLADE | 104 | |
| 7 | DRUM U | 120 | * |
| 8 | DRUM COVER U | 130 | * |
| 9 | FRAME COVER | 106 | |
| 10 | GROUND TERMINAL | 107 | |
| 11 | POWER CORD | 108 | |
| 12 | NAMEPLATE | 109 | |
| 13 | | | |
| 14 | | | |
| 15 | | | |
| 16 | | | |
| 17 | | | |
| 18 | | | |
| 19 | | | |
| 20 | | | |
| | SUB-TOTAL / AVERAGE | | 3 |
| | RATE OF ITEMS | | |
| | NUMBER OF 0 SCORE / WEIGHT | | 0 |

Fig.35

| ① | ② | ③ | REUSABILITY | | | | | | ⑩ | EVALUATION SCORE | | | | |
|---|---|---|---|---|---|---|---|---|---|---|---|---|---|---|
| | A B | | ④ | ⑤ | ⑥ | ⑦ | ⑧ | ⑨ | | ⑪ | ⑫ | ⑬ | ⑭ | TOTAL |
| ---- | ---- | ---- | 0 | 0 | 0 | | | * | 1 | 50.00 | ------- | ----- | 1 | ------- |
| 10 | 5 | ⑮ | 1 | 0 | 0 | | | | 1 | ------- | 37.00 | ----- | 1 | ------- |
| 10 | 0 | ⑮ | 0 | 1 | 0 | | | | 1 | 10.00 | 25.00 | 35.0 | 1 | 35.00 |
| 10 | 5 | ⑮ | 0 | 0 | 0 | | | * | 1 | 35.00 | 40.00 | 75.0 | 1 | 75.00 |
| 10 | 5 | ⑮ | 0 | 0 | 0 | | | * | 1 | 50.00 | 32.00 | 82.0 | 1 | 82.00 |
| 10 | 0 | ⑮ | 1 | 0 | 0 | | | | 1 | 35.00 | 15.00 | 50.0 | 1 | 50.00 |
| 10 | 5 | ⑮ | 1 | 1 | 1 | | | | 1 | ------- | 22.00 | ----- | 1 | ------- |
| 10 | 5 | ⑮ | 0 | 0 | 1 | | | | 1 | ------- | 32.00 | ----- | 1 | ------- |
| 10 | 5 | ★ | 0 | 1 | 0 | | | | 1 | 10.00 | 50.00 | 60.0 | 1 | 60.00 |
| 10 | 5 | ⑮ | 0 | 1 | 0 | | | | 1 | 10.00 | 25.00 | 35.0 | 1 | 35.00 |
| 10 | 5 | ⑮ | 0 | 1 | 0 | | | | 1 | 12.50. | 25.00 | 37.50 | 1 | 37.50 |
| 10 | 5 | ⑮ | 0 | 0 | 1 | | | | 1 | 35.00 | 25.00 | 60.0 | 1 | 60.00 |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| | | | | | | | | | | | | | | |
| 10.00 | 4.09 | 1 | 3 | 5 | 3 | 0 | 0 | 3 | 12 | 27.50 | 27.09 | 51.81 | 12 | 414.50 |
| 1.00 | 0.82 | | | ⑯ | | | | 3 | | 9 | 11 | ⑰ | 8 | |
| 3 | 2 | | | | | | | | | ⑱ | ⑲ | | | |

| TOTAL | | | | | | | |
|---|---|---|---|---|---|---|---|
| TOTAL | SCORE DISTRIBUTION | UNDER 40 | -50 | -60 | -70 | -80 | OVER 80 |
| | NUMBER OF COMPONENTS | 3 | 1 | 2 | 0 | 1 | 1 |
| MATERIAL | SCORE DISTRIBUTION | UNDER 5 | -10 | -20 | -30 | -40 | OVER 40 |
| | NUMBER OF COMPONENTS | 0 | 3 | 1 | 0 | 3 | 1 |
| DISASSEMBLY | SCORE DISTRIBUTION | UNDER 5 | -10 | -20 | -30 | -40 | OVER 40 |
| | NUMBER OF COMPONENTS | 0 | 0 | 3 | 4 | 3 | 1 |

①: DIRECTION SCORE
②: DISASSEMBLY MARK
③: NECESSITY OF DISASSEMBLY
④: WEAR
⑤: NATURAL DETERIORATION
⑥: EFFECT OF FLAW
⑦: NUMBER OF SEMIFINISHED COMPONENTS
⑧: NUMBER OF SEMIFINISHED RECYCLABLE COMPONENTS
⑨: REUSABILITY
⑩: EVALUATION TARGET
⑪: MATERIAL SCORE
⑫: DISASSEMBLY SCORE
⑬: SCORE 100
⑭: NUMBER OF COMPONENTS
⑮: NECESSARY
⑯: NUMBER OF REUSABLE COMPONENTS
⑰: EFFECTIVE NUMBER
⑱: SEMIFINISHED EXCLUDED
⑲: JIGS EXCLUDED

METHOD AND DEVICE FOR EVALUATING ASSEMBLABILITY AND REVERSE ASSEMBLABILITY

BACKGROUND OF THE INVENTION

1. Field of the Invention

The present invention relates to an assemblability and reverse-assemblability evaluating method and apparatus for simultaneously evaluating the assemblability of evaluation targets including, for example, at least one component, composite products in which a plurality of components are combined together, semifinished products in which a plurality of components are assembled together, and finished products, and the reverse assemblability including at least disassemblability, classifiability, reusability, and safety of the evaluation targets.

2. Description of Related Art

As this type of evaluation method, conventionally, there has been available, for example, an evaluation method in which a commercial product is evaluated in terms of producibility at its design stage so that its components evaluated with low scores are found out. Also, independently of this method, a reusability evaluation method for designs taking into account the recent year's recyclability has also begun to be developed.

However, there has conventionally been available no method for simultaneously evaluating producibility and recyclability, and moreover for exploiting the evaluation for design improvement.

Therefore, as a conventional practice, data is entered into and used in various data evaluation units for assemblability evaluation of a product. Further, the data that has once been used for the evaluation of assemblability has been re-entered into evaluation units for evaluation of recyclability of the product, which has been troublesome. Also, some products involve evaluating assemblability and reusability independently of each other. Such independent evaluation makes it impossible to determine, in a single evaluation, whether the recyclability can be improved when the assemblability is improved. Therefore, it is necessary to re-enter, after the assemblability has been improved, data to the evaluation apparatus with respect to the reusability, and re-evaluate the reusability. In such a case, the reusability may become much worse, while the assemblability has been improved. This would give rise to balancing improvement in assemblability and reusability by relying on trial and error or an operator's experience. Thus, it has been quite difficult to simultaneously improve both assemblability and reusability.

Therefore, an object of the present invention is to solve these and other issues and to provide an assemblability and a reverse-assemblability evaluating method and apparatus capable of simultaneously evaluating assemblability including producibility and reverse assemblability including recyclability.

SUMMARY OF THE INVENTION

In order to achieve the above object, the present invention has the following constitutions.

According to a first aspect of the present invention, there is provided an assemblability and reverse-assemblability evaluating method, comprising: with respect to a plurality of evaluation items for evaluating assemblability of an evaluation-target product, entering assemblability evaluation information as to the evaluation-target product; and performing assemblability evaluation based on the entered assemblability evaluation information and, simultaneously, performing reverse-assemblability evaluation based on reverse-assemblability evaluation information which is among the entered assemblability evaluation information and which is usable for evaluation items for performing the reverse-assemblability evaluation.

According to a second aspect of the present invention, there is provided an assemblability and reverse-assemblability evaluating method as described in the first aspect, wherein the method comprises: with respect to a plurality of evaluation items for evaluating the reverse assemblability of the evaluation-target product, further entering reverse-assemblability evaluation information as to the evaluation-target product; and performing the assemblability evaluation based on the entered assemblability evaluation information and, simultaneously, performing the reverse-assemblability evaluation based on the reverse-assemblability evaluation information as well as on the entered reverse-assemblability evaluation information which is among the entered assemblability evaluation information and which is usable for the evaluation items for, evaluating the, reverse-assemblability evaluation.

According to a third aspect of the present invention, there is provided an, assemblability and reverse-assemblability evaluating method as described in the first or second aspect, wherein the term, assemblability, refers to, at least, ease of production or ease of assembly of the evaluation-target product which is a single component, a composite product in which a plurality of components are combined together, a semifinished product in which a plurality of components are assembled together, or a finished product, and the term, reverse assemblability, refers to, at least, ease of disassembly, ease of classification, ease of reuse, and safety.

According to a fourth aspect of the present invention, there is provided an assemblability and reverse-assemblability evaluating method as described in any one of the first to third aspects, wherein entering the. evaluation information is implemented by entering selectional information to be selected from among a plurality of answer items, numerical information to be answered by entering specific numerical values, and YES/NO type information to be entered as YES or NO in response to questions in the evaluation items with respect to the evaluation-target product, and evaluating the assemblability and the reverse assemblability based on the entered evaluation information is implemented by giving evaluation scores for the acquired evaluation information to thereby simultaneously accomplish the evaluation of the assemblability and the reverse assemblability.

According to a fifth aspect of the present invention, there is provided an assemblability and reverse-assemblability evaluating method as described in any one of the first to fourth aspects, wherein the evaluation items for the assemblability are preparation for a base component of the evaluation-target product, suppliability, holdability, assemblability, combinability, necessity or non-necessity of adjustment, component sharability, and component omittability of the evaluation-target product.

According to a sixth aspect of the present invention, there is provided an assemblability and reverse-assemblability evaluating method as described in the fifth aspect, wherein as more detailed evaluation items for the preparation of the base component, posture change of the base component, and necessity or non-necessity of any special jig for the base component are evaluated; as more detailed evaluation items for the suppliability of the evaluation-target product, at least, posture change of the evaluation-target product, vulnerability of the evaluation-target product, indefinite shape as an evaluation-target product's own shape, outline feature of the valuation-target product, and entanglement of the evaluation-target product are evaluated; as more detailed evaluation items for the holdability, at least, necessary chuck and chuck space for holding the evaluation-target product are evaluated; as more detailed evaluation items for the assemblability, at least, positionability, direction of assembly, and stability of the evaluation-target product are evaluated; as more detailed evaluation items for the combinability, at least, number and direction of tightening screws in assembly process of the evaluation-target product, and places number and direction of tightening other than the tightening screws in the assembly process are evaluated; as a more detailed evaluation item for the necessity or non-necessity of adjustment, at least, necessity or non-necessity of various adjustments in the assembly process of the evaluation-target product is evaluated; as a more detailed evaluation item for the component sharability, at least, how sharability of components of the evaluation-target product is accomplished-is evaluated; and as a more detailed evaluation item for the component omittability, at least, possibility that one of the components of the evaluation-target product can be omitted is evaluated.

According to a seventh aspect of the present invention, there is provided an assemblability and reverse-assemblability evaluating method as described in any one of the first to sixth aspects, wherein the evaluation items for the reverse assemblability are disassemblability, classifiability, reusability, and safety.

According to an eighth aspect of the present invention, there is provided an assemblability and reverse-assemblability evaluating method as described in the seventh aspect, wherein as a more concrete evaluation item for the disassemblability is de-combinability, where as more detailed evaluation items for the de-combinability, at least, tightening place, pre- and post-processing, combination type, combination direction, tightening screw sharability, and tightening direction of tightening screws are evaluated; as a more concrete evaluation item for the component reusability, possibility of reuse of components of the evaluation-target product is evaluated; as more concrete evaluation items for the classifiability, component weight and number of material types are evaluated; and as more concrete evaluation items for the safety, at least, whether or not any harmful substance is contained is evaluated.

According to a ninth aspect of the present invention, there is provided an assemblability and reverse-assemblability evaluating method as described in any one of the first to fifth aspects, wherein the evaluation items for the assemblability are preparation for a base component of the evaluation-target product, suppliability, holdability, assemblability, combinability, necessity or non-necessity of adjustment, component sharability and component omittability of the evaluation-target product, where as more detailed evaluation items for the preparation for the base component, posture change of the base component, and necessity or non-necessity of any special jig for the base component are evaluated; as more detailed evaluation items for the suppliability of the evaluation-target product, at least, posture change of the evaluation-target product, vulnerability of the evaluation-target product, indefinite shape as an evaluation-target product's own shape, outline characteristic of the evaluation-target product, and entanglement of the evaluation-target product are evaluated; as more detailed evaluation items for the holdability, at least, necessary chucks and chuck space for holding the evaluation-target product are evaluated; as more detailed evaluation items for the assemblability, at least, positionability, direction of assembly, and stability of the evaluation-target product are evaluated; as more detailed evaluation items for the combinability, at least, number and direction of tightening screws in assembly process of the evaluation-target product, and places number and direction of tightening other than the tightening screws in the assembly process are evaluated, as a more detailed evaluation item for the necessity or non-necessity of adjustment, at least, necessity or non-necessity of various adjustments in the assembly process of the evaluation-target product is evaluated; as a more detailed evaluation item for the component sharability, at least, how sharability of components of the evaluation-target product is accomplished is evaluated; and as a more detailed evaluation item for the component omittability, at least, possibility that one of components of the evaluation-target product can be omitted is evaluated, while the evaluation items for the reverse assemblability are disassemblability, classifiability, reusability, and safety, where a more concrete evaluation item for the disassemblability is de-combinability, where as more detailed evaluation items for the de-combinability, at least, tightening place, pre- and post-processing, combination type, combination direction, tightening screw sharability, and tightening direction of tightening screws are evaluated; as a more concrete evaluation item for the component reusability, possibility of reuse of components of the evaluation-target product is evaluated; as more concrete evaluation items for the classifiability, component weight and number of material types are evaluated; and as a more concrete evaluation item for the safety, at least, whether or not any harmful substance is contained is evaluated, and wherein: information on the evaluation items of the combinability and the component omittability is shared between the assemblability evaluation and the reverse-assemblability evaluation, information on the evaluation items of the component weight and the number of material types is shared between the de-combinability evaluation and the classifiability evaluation, and information on the evaluation item of the material type is shared between the classifiability and the safety.

According to a tenth aspect of the present invention, there is provided an assemblability and reverse-assemblability evaluating method as described in the fifth, sixth, or ninth aspect, wherein at a time point when evaluation for the evaluation-target product is done, an assembly total score for a component that is possible to omit is set to 0.

According to an eleventh aspect of the present invention, there is provided an assemblability and reverse-assemblability evaluating method as described in any one of the first to tenth aspects, wherein as results of the assemblability and reverse-assemblability evaluation, at least, information including at least an assemblability evaluation graph, structural characteristics of the evaluation-target product, extraction of omittable components, and assembly man-hours can be outputted at least in a table or graph form, and information including a reverse-assembly flow chart, a reverse-assemblability evaluation graph, extraction of unnecessary-to-disassemble/reuse components, reverse-assembly man-hours, use amount of each material, and rate of recyclability can be outputted at least in a table or graph form.

According to a twelfth aspect of the present invention, there is provided an assemblability and reverse-assemblability evaluating apparatus comprising: at least, a computing unit into which assembly information as to an evaluation-target product as well as information on component name, assembly sequence, and quantity in number as to an evaluation-target product is entered, wherein the computing unit stores the information in a storage unit, prepares an assembly flow chart in an assembly-flow-chart preparing section based on the information stored in the storage unit and CAD information as to the evaluation-target product and stores the assembly flow chart into the storage unit, extracts from the storage unit information on assembly components, information on a base component, information on a relation between the assembly components and the base component, and component detail information on combination type out of the information prepared in the assembly flow chart preparation and stored in the storage unit, and based on the extracted information, performs the assemblability and reverse-assemblability evaluation by using at least computational equations, evaluation criteria, evaluation scores, man-hours, and particular-component extraction logics, necessary for the assemblability and reverse-assemblability evaluation which are stored in a database for the assemblability and reverse-assemblability evaluation.

According to a thirteenth aspect of the present invention, there is provided an assemblability and reverse-assemblability evaluating apparatus as described in the twelfth aspect, wherein an evaluation unit comprises an assemblability evaluation section and a reverse-assemblability evaluation section, and wherein into the assemblability evaluation section, type information as to whether the evaluation-target product is a single product, a composite product, or a semifinished product, material information on those products, base component information, information on suppliability of the evaluation-target product, information on holdability, information on assemblability, information on combinability, information on adjusting work, information on sharability, and information on component omittability is entered, based on which information the assemblability evaluation is executed, while into the reverse-assemblability evaluation section, the type information as to whether the evaluation-target product is a single product, a composite product, or a semifinished product, the material information on those products, the information on assemblability, the information on combinability, the information on sharability, and the information on component omittability is entered from the assemblability evaluation section out of the information entered into the assemblability evaluation section, and independently of this, component weight information and information on reusability is entered, and based on these pieces of information, the reverse assemblability evaluation is executed.

According to a fourteenth aspect of the present invention, there is provided an assemblability and reverse-assemblability evaluating apparatus as described in the twelfth or thirteenth aspect, wherein results of the evaluation in the evaluation unit are stored into the storage unit and evaluation result information stored in the storage unit is outputted at least in a graph or table form by an output device.

According to a fifteenth aspect of the present invention, there is provided an assemblability and reverse-assemblability evaluating apparatus as described in any one of the twelfth to fourteenth aspects, wherein the term, assemblability, refers to, at least, ease of production or ease of assembly of the evaluation-target product which is a single component, a composite product in which a plurality of components are combined together, a semifinished product in which a plurality of components are assembled together, or a finished product, and the term, reverse assemblability, refers to, at least, disassemblability, classifiability, reusability, and safety.

According to a sixteenth aspect of the present invention, there is provided an assemblability and reverse-assemblability evaluating apparatus as described in any one of the twelfth to fifteenth aspects, wherein entering the evaluation information is implemented by entering selectional information to be selected from among a plurality of answer items, numerical information to be answered by entering specific numerical values, and YES/NO type information to be entered as YES or NO in response to questions in the evaluation items with respect to the evaluation-target product, and evaluating the assemblability and the reverse assemblability based on the entered evaluation information is implemented by giving evaluation scores for the acquired evaluation information to thereby simultaneously accomplish the evaluation of the assemblability and the reverse assemblability.

According to a seventeenth aspect of the present invention, there is provided an assemblability and reverse-assemblability evaluating apparatus as described in any one of the twelfth to sixteenth aspects, wherein the evaluation items for the assemblability are preparation for the base component of the evaluation-target product, suppliability, holdability, assemblability, combinability, necessity or non-necessity of adjustment, component sharability, and component omittability of the evaluation-target product.

According to an eighteenth aspect of the present invention, there is provided an assemblability and reverse-assemblability evaluating apparatus as described in the seventeenth aspect, wherein as more detailed evaluation items for the preparation of the base component, posture change of the base component, and necessity or non-necessity of any special jig for the base component are evaluated; as more detailed evaluation items for the suppliability of the evaluation-target product, at least, posture change of the evaluation-target product, vulnerability of the evaluation-target product, indefinite shape as an evaluation-target product's own shape, outline feature of the evaluation-target product, and entanglement of the evaluation-target product are evaluated; as more detailed evaluation items for the holdability, at least, necessary chuck and chuck space for holding the evaluation-target product are evaluated; as more detailed evaluation items for the assemblability, at least, positionability, direction of assembly, and stability of the evaluation-target product are evaluated; as more detailed evaluation items for the combinability, at least, number and direction of tightening screws in assembly process of the evaluation-target product, and number and direction of tightening places other than the tightening screws in the assembly process are evaluated; as a more detailed evaluation item for the necessity or non-necessity of adjustment, at least, necessity or non-necessity of various adjustments in the assembly process of the evaluation-target product is evaluated; as a more detailed evaluation item for the component sharability, at least, how sharability of components of the evaluation-target product is accomplished; and as a more detailed evaluation item for the component omittability, at least, possibility that components of the evaluation-target product can be omitted is evaluated.

According to a nineteenth aspect of the present invention, there is provided an assemblability and reverse-assemblability evaluating apparatus as described in any one of the twelfth to eighteenth aspects, wherein the evaluation items for the reverse assemblability are disassemblability, classifiability, reusability, and safety.

According to a twentieth aspect of the present invention, there is provided an assemblability and reverse-assemblability evaluating apparatus as described in the nineteenth aspect, wherein a more concrete evaluation item for the disassemblability is de-combinability, where as more detailed evaluation items for the de-combinability, at least, tightening place, pre- and post-processing, combination type, combination direction, tightening screw sharability, and tightening direction of tightening screws are evaluated; as a more concrete evaluation item for the component reusability, possibility of reuse of components of the evaluation-target product is evaluated; as more concrete evaluation items for the classifiability, component weight and number of material types are evaluated; and as a more concrete evaluation item for the safety, at least, whether or not any harmful substance is contained is evaluated.

According to a twenty-first aspect of the present invention, there is provided an assemblability and reverse-assemblability evaluating apparatus as described in any one of the twelfth to sixteenth aspects, wherein the evaluation items for the assemblability are preparation for the base component of the evaluation-target product, suppliability, holdability, assemblability, combinability, necessity or non-necessity of adjustment, component sharability, and component omittability of the evaluation-target product, where as more detailed evaluation items for the preparation for the base component, posture change of the base component, and necessity or non-necessity of any special jig for the base component are evaluated; as more detailed evaluation items for the suppliability of the evaluation-target product, at least, posture change of the evaluation-target product, vulnerability of the evaluation-target product, indefinite shape as an evaluation-target product's own shape, outline feature of the evaluation-target product, and entanglement of the evaluation-target product are evaluated; as more detailed evaluation items for the holdability, at least, necessary chucks and chuck space for holding the evaluation-target product are evaluated; as more detailed evaluation items for the assemblability, at least, positionability, direction of assembly, and stability of the evaluation-target product are evaluated; as more detailed evaluation items for the combinability, at least, number and direction of tightening. screws in assembly process of the evaluation-target product, and number and direction of tightening places other than the tightening screws in the assembly process are evaluated; as a more detailed evaluation item for the necessity or non-necessity of adjustment, at least, necessity or non-necessity of various adjustments in the assembly process of the evaluation-target product is evaluated; as a more detailed evaluation item for the component sharability, at least, how sharability of components of the evaluation-target product is accomplished is evaluated; and as a more detailed evaluation item for the component omittability, at least, possibility that components of the evaluation-target product can be omitted is evaluated, while the evaluation items for the reverse assemblability are disassemblability, classifiability, reusability, and safety, where a more concrete evaluation item for the disassemblability is de-combinability, where as more detailed evaluation items for the de-combinability, at least, tightening place, pre- and post-processing, combination type, combination direction, tightening screw sharability, and tightening direction of tightening screws are evaluated; as a more concrete evaluation item for the component reusability, possibility of reuse of components of the evaluation-target product is evaluated; as more concrete evaluation items for the classifiability, component weight and number of material types are evaluated; and as a more concrete evaluation item for the safety, at least, whether or not any harmful substance is contained is evaluated, and wherein: information on the evaluation items of combinability and the component omittability is shared between the assemblability evaluation and the reverse-assemblability evaluation, information on the evaluation items of the component weight and the number of material types is shared between the de-combinability evaluation and the classifiability evaluation, and information on the evaluation item of the material type is shared between the classifiability and the safety.

According to a twenty-second aspect of the present invention, there is provided an assemblability and reverse-assemblability evaluating apparatus as described in the thirteenth, seventeenth, eighteenth, or twenty-first aspect, wherein at a time point when evaluation for the evaluation-target product is done, an assembly total score for a component that is possible to omit is set to 0.

According to a twenty-third aspect of the present invention, there is provided an assemblability and reverse-assemblability evaluating apparatus as described in any one of the twelfth to twenty-second aspects, wherein as results of the assemblability and reverse-assemblability evaluation, at least, information including at least an assemblability evaluation graph, structural characteristics of the evaluation-target product, extraction of omittable components, and assembly man-hours can be outputted by the output device at least in a table or graph form, and information including at least a reverse-assembly flow chart, a reverse-assemblability evaluation graph, extraction of unnecessary-to-disassemble/reuse components, reverse-assembly man-hours, use amount of each material, and rate of recyclability can be outputted by the output device at least in a table or graph form.

With the above constitution, if evaluation items are selected based on the work of actual an assembly process, the operator (e.g., designer) enters information on the evaluation items directly to the evaluation apparatus based on actual assembly work. On the other hand, it can be seen that, assuming that the reverse-assembly process, such as disassembly for which the reverse assemblability such as reusability, is evaluated as a reverse flow to the above assembly process, the reverse assemblability is automatically evaluated while the information for the evaluation of the reverse assemblability, which is unknown from the assemblability, can be entered into the evaluation apparatus. As a result, the operator is enabled to enter information with better understanding of the assembly and the reverse-assembly work such as disassembly, which helps the operator to concretely find out improvement proposals for both assemblability and reverse assemblability.

With respect-to evaluation-target products, without being limited to finished products, the evaluation unit may be set as a unit product (semifinished product), a composite product made up of a plurality of components, and one component, in which case an operator, such as a designer or production line worker, is able to evaluate the assemblability and the reverse assemblability in such a unit that is made closest to the form in which finished products, semifinished products, and components are recognized. With respect to comparisons between an operator's company's new products, and conventional products as well as comparisons with competitive company's products, assemblability and reverse assemblability can be relatively evaluated in such levels as product level, semifinished product level, and component level.

In conventional evaluation of assemblability, there are many cases where only design information such as "positional relation of components" and "tightening means" are taken as evaluation items. However, in such cases, although entry is simple (or can be automatically achieved by direct coupling with a CAD (Computer Aided Design) system), there is a gap from assemblability in actual assembly. As such, the evaluation accuracy is sacrificed. In contrast to this, in the method and apparatus of the present invention, evaluation items representing actual assembly such as "posture change" and "holdability" enable setting and entry of information on assemblability and the like. Consequently, the operator entry is aided, and assemblability and reverse assemblability can be evaluated with higher accuracy.

Further, if the operator enters information into the evaluation apparatus in response to the questions as to the evaluation items on assemblability or on assemblability and reverse assemblability, it becomes possible to output, for example, forward and reverse assemblability evaluation scores as to assemblability and reverse assemblability, a necessary-to-improve component list, reusable components, an unnecessary-to-disassemble component list, assembly man-hours, disassembly man-hours, and the like as evaluation results of the assemblability and the reverse assemblability, so that the assemblability and the reverse assemblability can be evaluated simultaneously. That is, according to the present invention, if the assemblability and the reverse assemblability evaluation is performed, for example, at design stage, then assemblability such as producibility as well as reverse assemblability, such as recyclability, can be evaluated simultaneously in a short time, which can lead to a design improvement. Also, since the evaluation of the reverse assemblability is performed principally based on information acquired on evaluation items related to the assemblability, the operator is enabled to accurately evaluate not only the assemblability but also the reverse assemblability even if he is not so conscious of the reverse assemblability.

Also, conventionally, when the evaluation of assemblability and the evaluation of reusability are executed independently of each other, it would be difficult to simultaneously accomplish an improvement in the evaluation of assemblability and an improvement in the evaluation of reusability. In contrast to this, in the present invention, the evaluation of the assemblability and the evaluation of the reverse assemblability are simultaneously executed. It can be easily predicted that, for example, if components or units, or the like, that are worse in the evaluation of the assemblability and the reverse assemblability are improved in terms of low scored items, then the evaluation of both assemblability and reverse assemblability can be enhanced, so that improvement in both assemblability and reverse assemblability can be accomplished easily and securely.

BRIEF DESCRIPTION OF THE DRAWINGS

These and other aspects and features of the present invention will become clear from the following description taken in conjunction with the preferred embodiments thereof with reference to the accompanying drawings, briefly described as follows.

FIG. 8 is a table of evaluation results of FIG. 7.

FIG. 10 is an explanatory diagram showing that the evaluation of FIG. 9 is performed for each of units constituting one product.

FIG. 16 is an explanatory diagram showing an example of evaluation items of the assemblability and reverse-assemblability evaluating method and apparatus of the embodiment.

FIG. 17 is an explanatory diagram showing an example of evaluation items of the assemblability and reverse-assemblability evaluating method and apparatus of the embodiment. subsequent to FIG. 16;

FIG. 18 is an explanatory diagram showing an example of evaluation items of the assemblability and reverse-assemblability evaluating method and apparatus of the embodiment, subsequent to FIG. 17.

FIG. 19 is an explanatory diagram showing an example of evaluation items of the assemblability and reverse-assemblability evaluating method and apparatus of the embodiment, subsequent to FIG. 18.

FIG. 20 is an explanatory diagram showing an example of evaluation items of the assemblability and reverse-assemblability evaluating method and apparatus of the embodiment, subsequent to FIG. 19.

FIG. 22 is an explanatory diagram showing a modification of the evaluation items of the assemblability and reverse-assemblability evaluating method and apparatus of the embodiment of FIGS. 16 to 20.

FIG. 23 depicts an evaluation input sheet of an assemblability and reverse assemblability (forward/reverse assemblability) evaluation sheet (component evaluation table) in a case where the assemblability and reverse-assemblability evaluating method of the embodiment is applied to a washing machine as an example of the evaluation target.

FIG. 24 depicts an evaluation input sheet of the assemblability and reverse-assemblability (forward/reverse assemblability) evaluation sheet (component evaluation table), subsequent to FIG. 23.

FIG. 25 depicts another evaluation input sheet of the assemblability and reverse-assemblability (forward/reverse assemblability) evaluation sheets (component evaluation table).

FIG. 26 depicts an evaluation input sheet of the assemblability and reverse-assemblability (forward/reverse assemblability) evaluation sheet (component evaluation table), subsequent to FIG. 25.

FIG. 27 depicts another evaluation input sheet of the assemblability and reverse-assemblability (forward/reverse assemblability) evaluation sheet (component evaluation table).

FIG. 28 depicts an assemblability evaluation input sheet of an assemblability and reverse-assemblability (forward/reverse assemblability) evaluation sheet (component evaluation table) in a case where the assemblability and reverse-assemblability evaluating method of the embodiment is applied to a washing machine as an example of the evaluation target as shown in FIGS. 23 to 27.

FIG. 29 depicts another reverse-assemblability evaluation sheet of the assemblability and reverse-assemblability (forward/reverse assemblability) evaluation sheet (component evaluation table).

FIG. 30 depicts still another reverse-assemblability evaluation sheet of the assemblability and reverse-assemblability (forward/reverse assemblability) evaluation sheet (component evaluation table).

FIG. 31 depicts showing a reverse-assemblability evaluation sheet of the assemblability and reverse-assemblability (forward/reverse assemblability) evaluation sheet (component evaluation table), subsequent to FIG. 30.

FIG. 32 depicts showing another reverse-assemblability evaluation sheet of the assemblability and reverse-assemblability (forward/reverse assemblability) evaluation sheet (component evaluation table).

FIG. 33 depicts a reverse-assemblability evaluation sheet of the assemblability and reverse-assemblability (forward/reverse assemblability) evaluation sheet (component evaluation table), subsequent to FIG. 32.

FIG. 34 depicts another reverse-assemblability evaluation sheet of the assemblability and reverse-assemblability (forward/reverse assemblability) evaluation sheet (component evaluation table).

FIG. 35 depicts a reverse-assemblability evaluation sheet of the assemblability and reverse-assemblability (forward/reverse assemblability) evaluation sheet (component evaluation table), subsequent to FIG. 34.

DETAILED DESCRIPTION OF THE INVENTION

Figure 1:
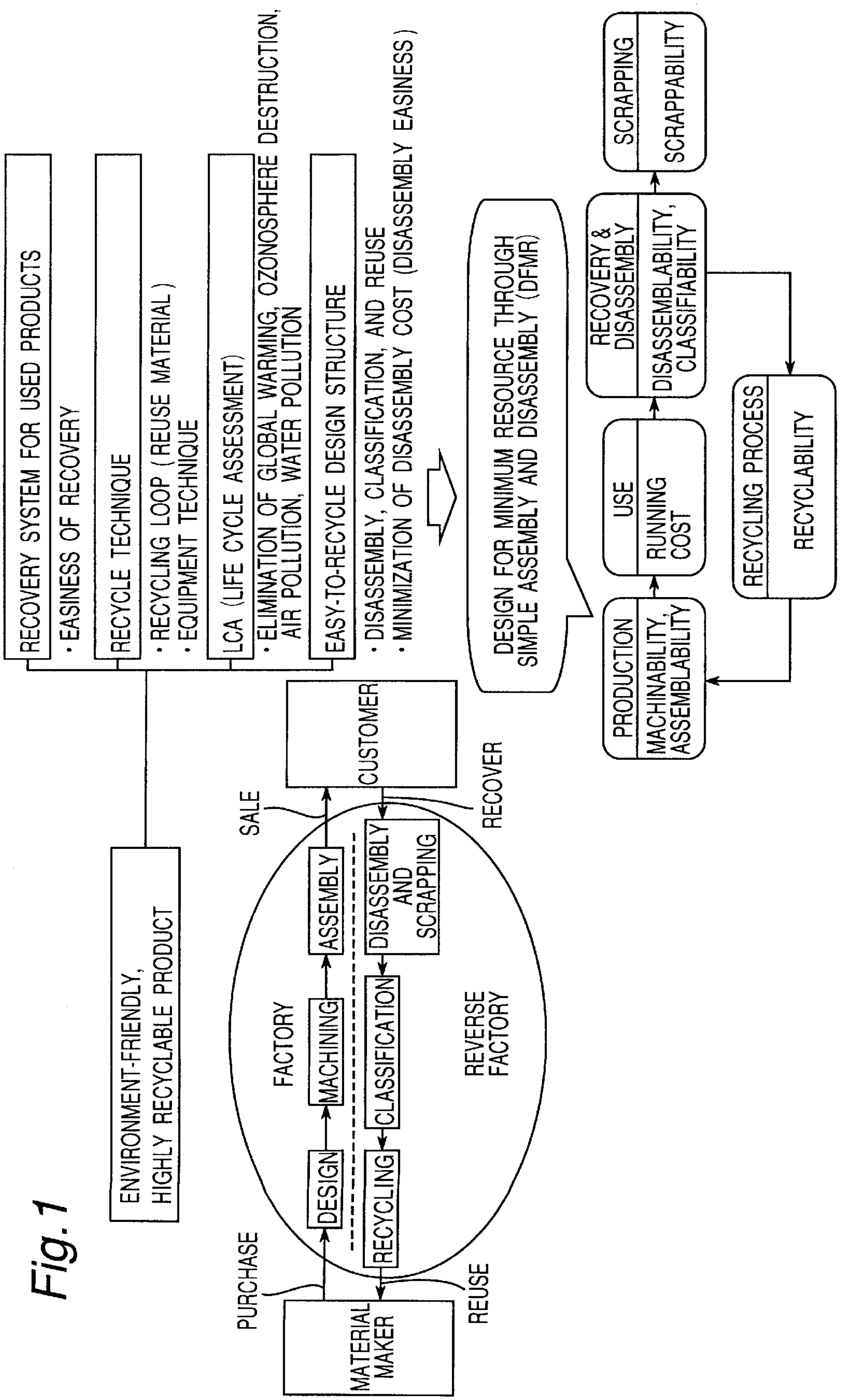
FIG. 1 is an explanatory diagram of a assemblability and reverse-assemblability evaluating method and apparatus for use thereof, according to an embodiment of the invention.

Before the description of the present invention proceeds, it is to be noted that like parts are designated by like reference numerals throughout the accompanying drawings.

A first embodiment of the present invention is described in detail with reference to the accompanying drawings below.

The embodiment of the present invention is described in detail based on the accompanying drawings.

A reverse-assemblability evaluating method and an apparatus for carrying out the method are described according to the first embodiment is explained.

The term "assemblability" herein has such a meaning as to cover the ease of production or assembly, or the like, of evaluation targets. Evaluation targets include, for example: a single-unit product (one component); a composite product, which is a component aggregate formed of a plurality of components having previously been assembled with each other into one component, and which is a component aggregate that cannot be considered in terms of producibility etc., by evaluating its assemblability and reverse assemblability; and a semifinished product, which is a component aggregate formed of a plurality of components being assembled with each other and unitized, and which is a component aggregate that can be considered in terms of producibility etc., by evaluating its assemblability and reverse assemblability, and a finished product. The term "reverse assemblability" has such a meaning as to cover decomposability, classifiability, reusability, safety, or the like.

First, the reverse-assemblability evaluating method and apparatus according to the first embodiment of the present invention are described in terms of their outlined contents, way of use, and the like.

As shown in FIG. 1, generally, commercial articles (products) are marketed for customers after design, machining, and assembly processes in factories of the manufacturing company of the products from material purchased from material makers. Meanwhile, products that become unnecessary are recovered from customers to reverse factories (that perform reverse-assembly) and the recovered products are disassembled and taken apart, classified, and subjected to recycling process. Those recyclable items are then delivered to material makers and recycled.

This being the case, generally, in order to produce environment-friendly, highly recyclable products (commercial articles), it is necessary: (1) to establish a recovery system for used products for easier recovery; (2) to establish a recycling technique to provide a recycling loop (for re-use material) and a equipment technique therefor; (3) to establish an LCA (Life Cycle Assessment) with the aim of eliminating global warming, ozonosphere destruction, air pollution, and water: pollution; and (4) to establish an easy-to-recycle design structure for implementation of disassembly, classification, and reuse, allowing the disassembly cost to be minimized and the disassembly to be easily achieved.

Consequently, machinability and assemblability matter in the production process of products and the running cost matters in the use process of products, whereas disassemblability and classifiability matter in the recovery and disassembly processes and scrappability matter in the scrapping process. For evaluation of the above (4) easy-to-recycle design structure, a reverse-assemblability evaluating method (or DFMR, i.e., Design For Minimum Resource through Simple Assembly and Disassembly) according to the assemblability and reverse-assemblability evaluating method and apparatus of this embodiment can be used to evaluate the disassemblability, classifiability, and the like in the recovery and disassembly processes. Based on this evaluation result, contribution can be made to the recyclability in the recycling process and to machinability and assemblability in the manufacturing process.

Figure 2:
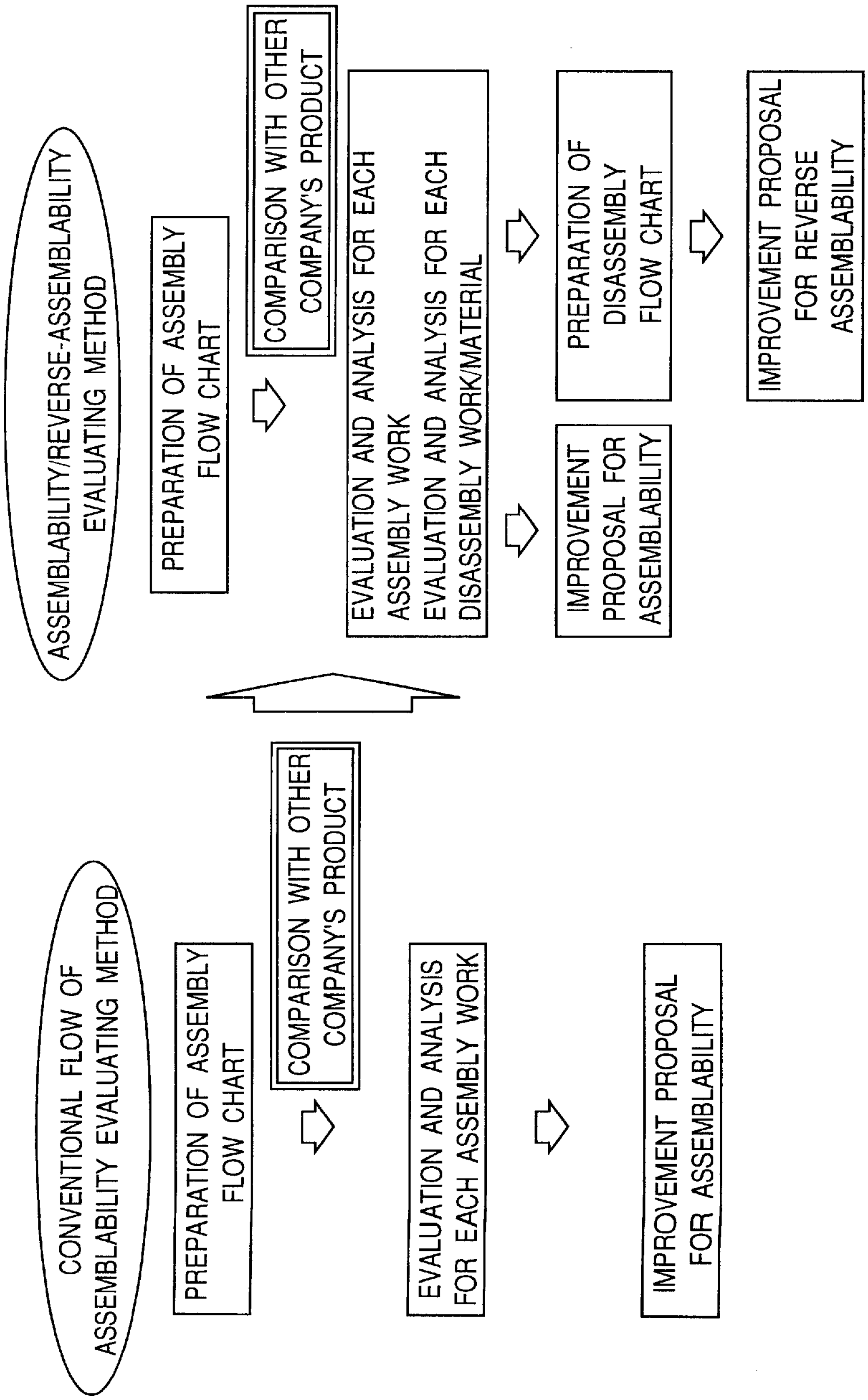
FIG. 2 is a comparative explanatory diagram between the assemblability and reverse-assemblability evaluating method and apparatus of the embodiment, and an assemblability evaluating method according to the prior art.

In the flow of the assemblability and reverse-assemblability evaluating method according to the prior art, as shown in the left side of FIG. 2, after an assembly flow chart is prepared based on information from a CAD (Computer Aided Design) system, a comparison with competitive companies' products is made as required, and evaluation and analysis are performed for each assembly work, by which a proposal for assemblability improvement is prepared. On the other hand, as shown in the right half of FIG. 2, in the assemblability and reverse-assemblability evaluating method and apparatus according to this embodiment, after an assembly flow chart is prepared based on information from a CAD (Computer Aided Design) system, a comparison with competitive companies' products or the operator's company's past products is made, as required, based on both information from the CAD system and input information from the operator while evaluation and analysis are performed for each assembly work, more specifically, for each of disassembly work, material, or the like. Thereafter a proposal for assemblability improvement and creation of a reverse-assembly flow chart for reverse-assembly can be achieved. From this reverse-assembly flow chart and evaluation results, a proposal for reverse-assemblability improvement can also be prepared.

Figure 3:
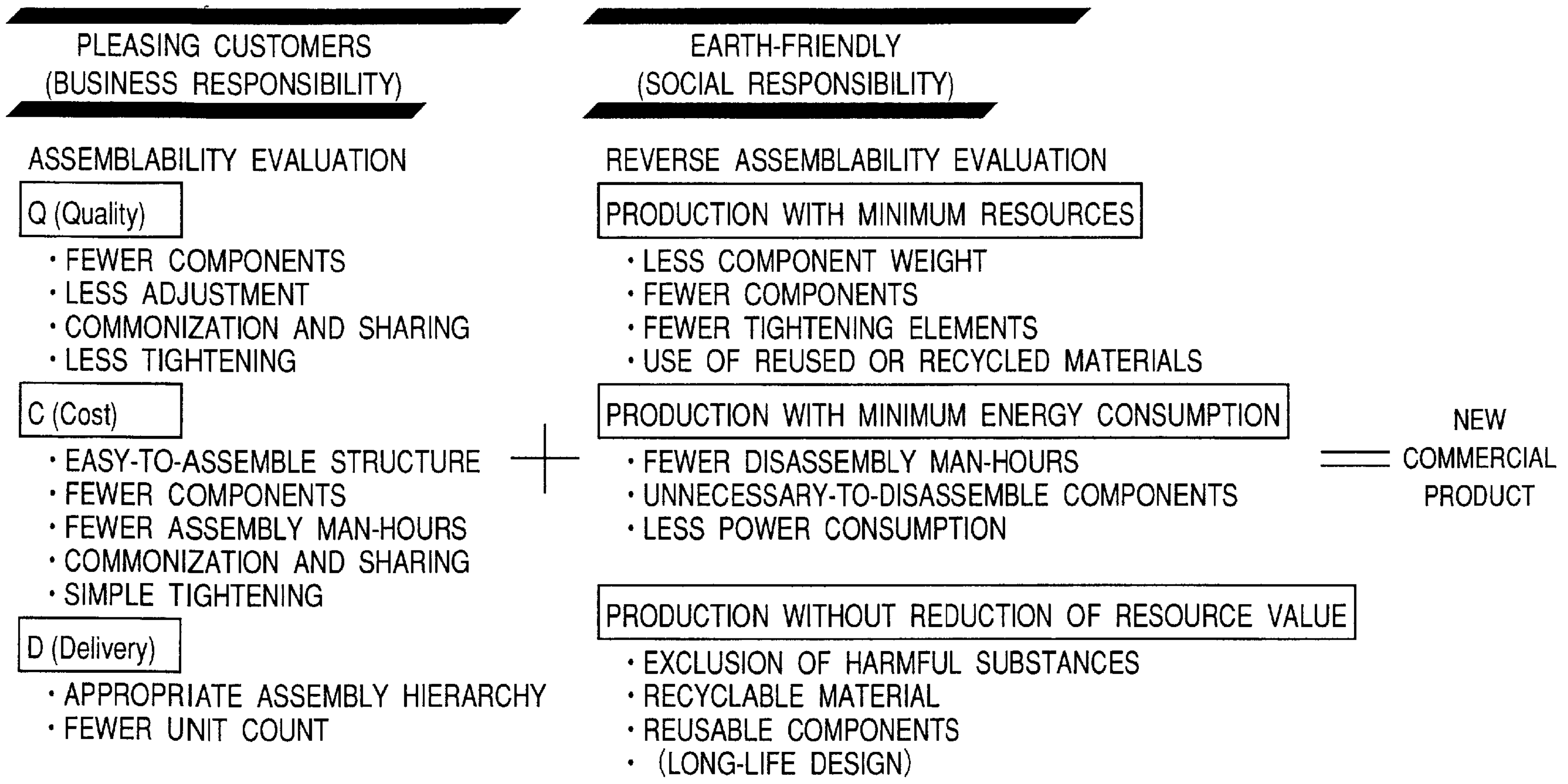
FIG. 3 is an explanatory diagram of an example of assemblability evaluation items and reverse-assemblability evaluation items in the assemblability and reverse-assemblability evaluating method and apparatus of the embodiment.

As shown in FIG. 3, in the assemblability and reverse-assemblability evaluating method and apparatus of this embodiment, for development of an assemblability and reverse-assemblability evaluating method, in particular, for development of the reverse-assemblability, the recyclability can be optimized-by tracing up to the design.

First, as a basic concept for the evaluation of the assemblability, three major items of product quality Q, product cost C, and product delivery D are considered.

First, with regard to evaluation items for the quality Q, evaluation is made as to "fewer components", i.e. whether the number of components is a possible minimum, "less adjustment", i.e. whether the number of adjustment places is a possible minimum, "sharing and commonization", i.e. whether the common components is large in number so that component commonization is accomplished, and "less tightening", i.e. whether the number of tightening places is a possible minimum.

Next, with regard to evaluation items for the cost C, evaluation is made as to "easy-to-assemble structure", i.e. whether a cost reduction is achieved as an easy-to-assemble structure, "fewer components", i.e. whether the number of components is a possible minimum so that a cost reduction is achieved, "fewer man-hours", i.e. whether the number of assembly processes is a possible minimum so that a cost reduction is achieved, "sharing and commonization", i.e. whether components is large in number so that component sharing is achieved, and that a cost reduction is achieved, "simple tightening", i.e. whether the possible tightenable and simple tightening means is used as tightening means so that a cost reduction is achieved.

Further, with regard to evaluation items for the delivery D, evaluation is made as to "appropriate assembly hierarchy", i.e. whether too many assembly hierarchical layers are used unnecessarily (where for example, two to three hierarchical layers are ideal), and "fewer unit counts", i.e. whether the number of units as semifinished products which are component aggregates is a possible minimum.

On the other hand, as a basic concept for the evaluation of the reverse assemblability, three major items of "production with minimum resources", "production with minimum energy consumption", and "production without reduction of resources value" are considered.

First, with regard to evaluation items for the "production with minimum resources", an attempt for evaluation is made as to "less component weight", i.e. whether component weight is reduced so that resources required for components are a possible minimum, "fewer components", i.e. whether the number of components is a possible minimum so that resources required for components is a possible minimum, "fewer tightening members", i.e. whether tightening members are reduced as much as possible so that resources required for the tightening members are a possible minimum, and "reusability of used components or use of recycled material", i.e. whether already used components or already recycled materials are large in number.

Next, with regard to evaluation items for the "production with minimum energy consumption", an attempt for evaluation is made as to "fewer disassembly man-hours", i.e. whether man-hours required for disassembly are a possible minimum, "unnecessary-to-disassemble components", i.e. whether components that do not need to be disassembled with consideration given to material recycling are a possible maximum, and, as required, "power consumption", i.e. whether power consumption of each component or the whole product is a possible minimum.

Next, with regard to evaluation items for the "production without reduction of resource value", an attempt for evaluation is made as to "exclusion of harmful substances", i.e. whether use of harmful substances is suppressed as much as possible, "recyclable material", i.e. whether recyclable material is used to a possible maximum, "reusable components", i.e. whether recyclable components that can be reused as they are without being decomposed are used to a possible maximum, and, as required, "long-life design", i.e. whether component and product are so designed as to make their lives longest possible.

Figure 4:
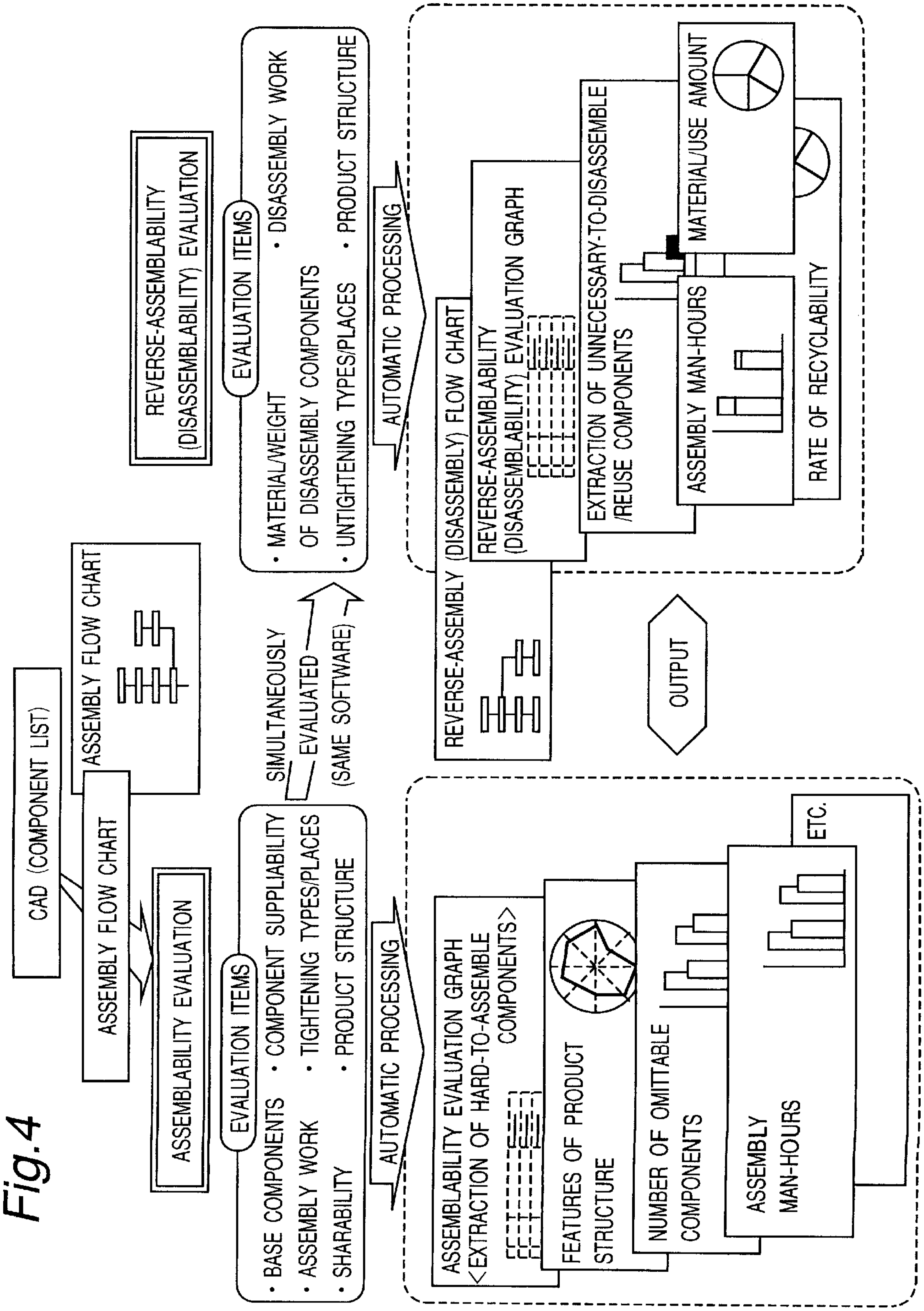
FIG. 4 is a schematic arrangement of the apparatus for carrying out the assemblability and reverse-assemblability evaluating method of the embodiment.

From these points of view, in the assemblability and reverse-assemblability evaluating method and apparatus of this embodiment, specifically, as shown in FIG. 4, an assembly flow chart is prepared from component lists, and the like, of a CAD system. Then, based on information derived from this assembly, flow chart and input information from the operator, the assemblability evaluation and the reverse-assemblability evaluation are simultaneously executed.

Evaluation items for the evaluation are exemplified by base components, component suppliability, assembly work, tightening types/places, sharability, and the like. Based on result information of the evaluation on these evaluation items, such information as an assemblability evaluation graph (to be used for extraction of hard-to-assemble components), features of product structure (for example, features such as the presence or absence of work of any separate process as can be taken out from a hierarchy of the assembly flow chart), extraction of omittable components, and assembly man-hours can be outputted in any arbitrary form of table or graph, or the like, by automatic processing of the evaluation apparatus. To execute the simultaneous evaluation of the assemblability and reverse assemblability with the same apparatus in this manner characterizes the evaluation method and apparatus of this embodiment.

Evaluation items for the reverse-assemblability evaluation are exemplified by material/weight of disassembly components, disassembly work, untightening types/places and as required, preferably, harmful substances. Based on result information of the evaluation on these evaluation items, such information as a reverse-assemblability (disassembly) flow chart, a reverse-assemblability evaluation graph, extraction of unnecessary-to-disassemble/reuse components, reverse-assembly (disassembly) man-hours, use amount of each material, rate of recyclability, and the like, can be outputted in any arbitrary form of table or graph, or the like, by automatic processing of the evaluation apparatus.

In the evaluation method and apparatus in this embodiment, the general flow of the evaluation of the assemblability and the reverse assemblability is as follows.

Figure 21:
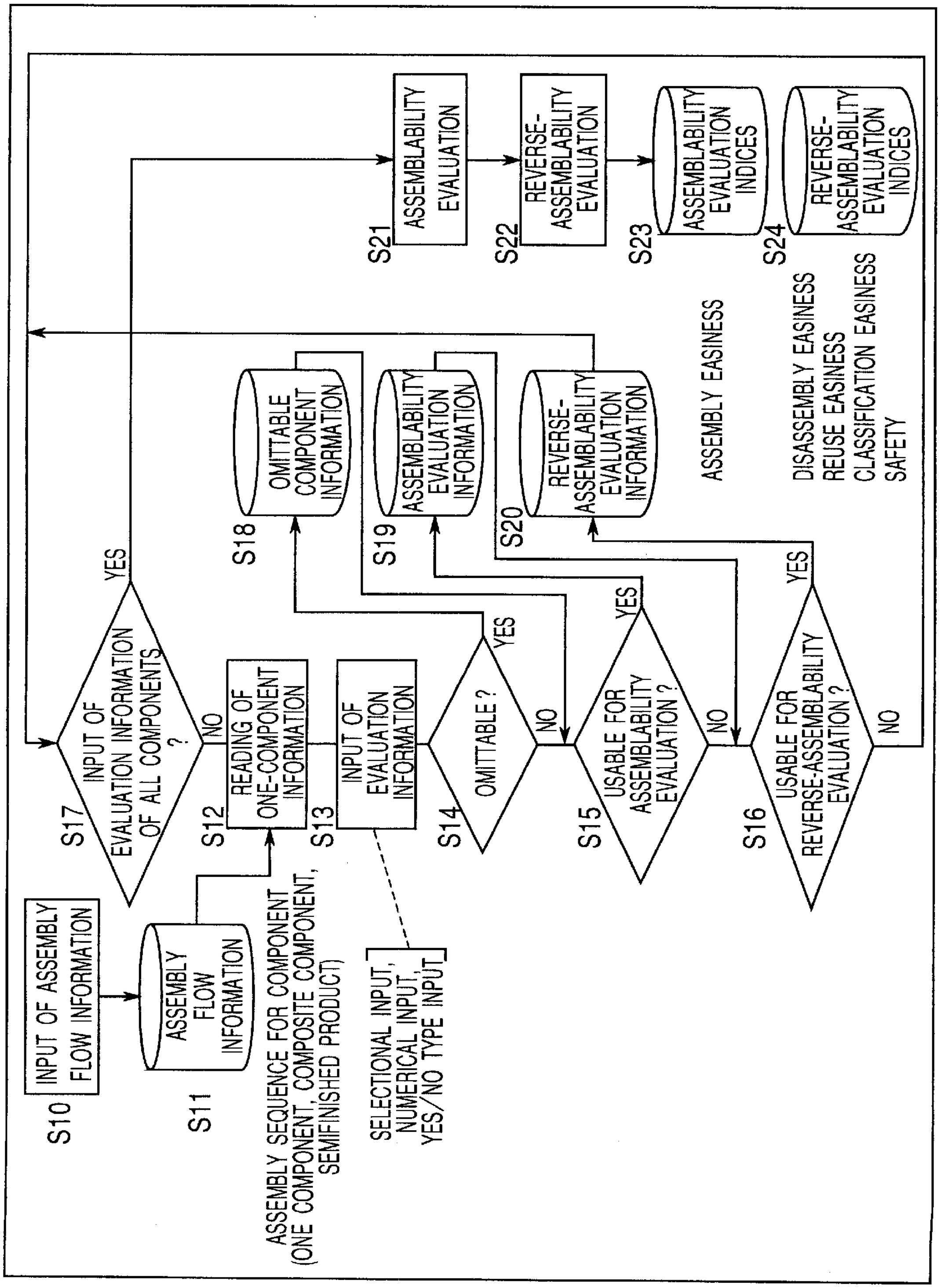
FIG. 21 is an operational flow chart of the assemblability and reverse-assemblability evaluating method and apparatus of the embodiment.
Figure 36:
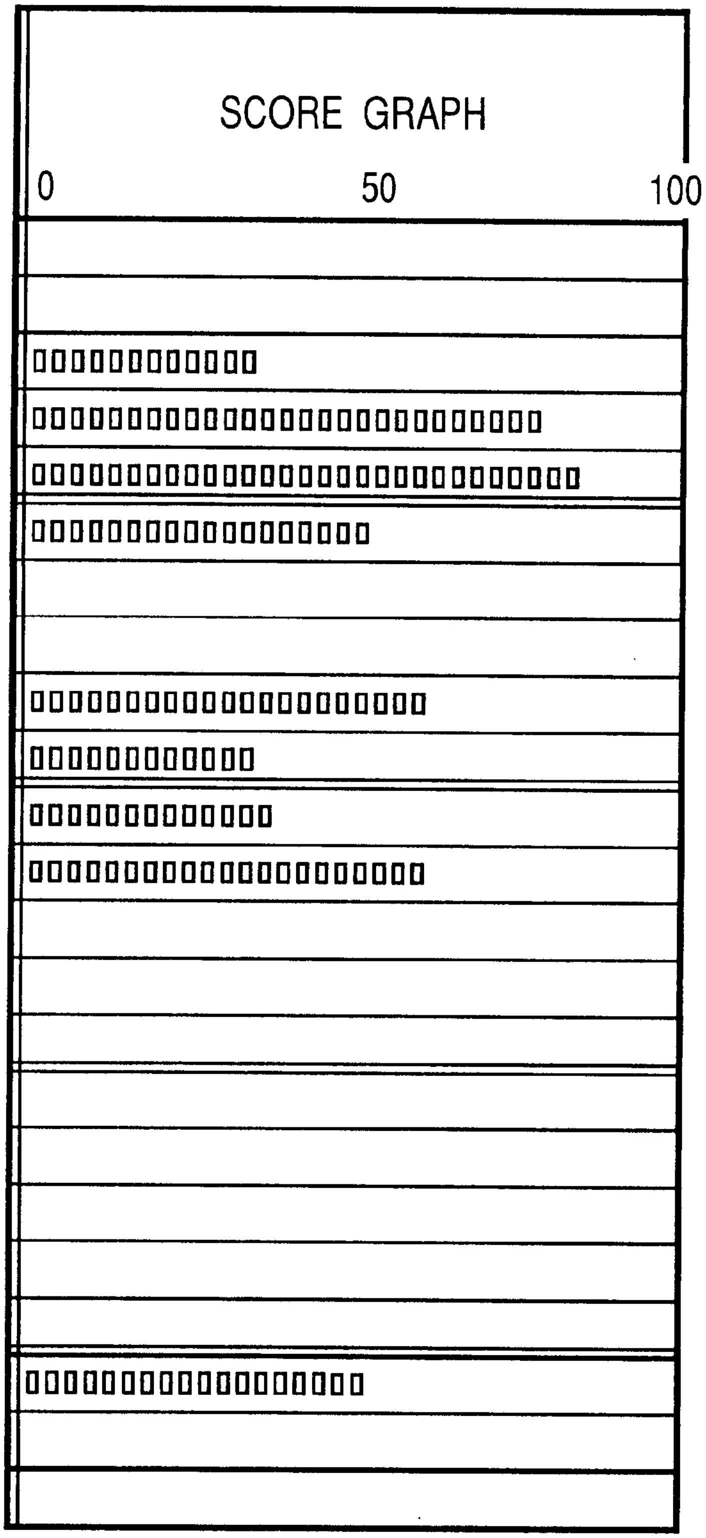
FIG. 36 depicts a reverse-assemblability evaluation sheet of the assemblability and reverse-assemblability (forward/reverse assemblability) evaluation sheet (component evaluation table), subsequent to FIG. 35.
Figure 37:
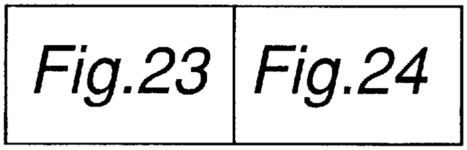
FIG. 37 depicts the positional relation between FIGS. 23 and 24.
Figure 38:
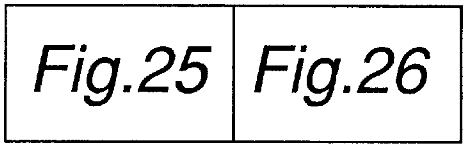
FIG. 38 depicts the positional relation between FIGS. 25 and 26.
Figure 39:
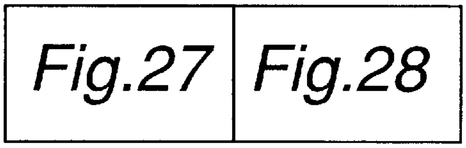
FIG. 39 depicts the positional relation between FIGS. 27 and 28.
Figure 40:
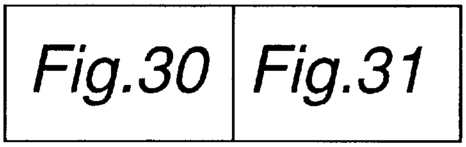
FIG. 40 depicts the positional relation between FIGS. 30 and 31.
Figure 41:
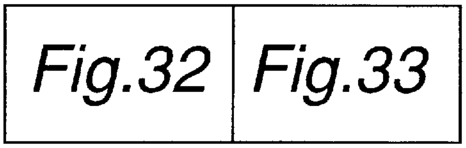
FIG. 41 depicts the positional relation between FIGS. 32 and 33.
Figure 42:
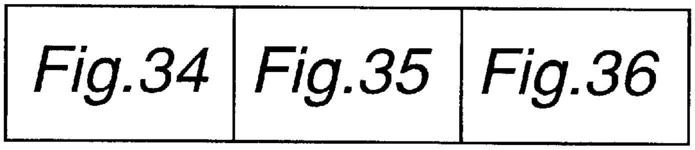
FIG. 42 depicts the positional relation between FIGS. 34, 35, and 36.

As shown in FIG. 21, first, at step S10, as will be described later, assembly flow information is entered into a component-evaluation-information computing section 8, and at step S11, the assembly flow information is stored into a storage unit 13 via the component-evaluation-information computing section 8. In this process, the sequence for assembling the evaluation-target product (a single component, composite component, or semifinished product), and the like, are also stored into the storage unit 13.

Next, at step S12, information as to components, such as questions in a plurality of evaluation items, is read out from the storage unit 13 component by component.

Next, at step S13, information for the evaluation, such as answers to the questions, is entered. This process is carried out, for example, by entering, as answers to the questions, selectional information selected from among a plurality of answered items corresponding to the questions of the evaluation items, numerical information acquired by definitively entering numerical values, and YES/NO information acquired by entering YES or NO, with respect to the evaluation-target product. The questions may be displayed on a screen of a personal computer equipped with the assemblability and reverse-assemblability evaluating apparatus so as to allow the input operator to enter answers from a keyboard or mouse, or the like.

Based on the answers to the questions at step S13, it is decided at step S14 whether the evaluation-target component is omittable. If the component is decided as non-omittable at step S14, it is decided at step S15 whether the component is usable for the assemblability evaluation. If the component is decided as non-usable at step S15, it is decided at step S16 whether the component is usable for the reverse-assemblability evaluation. If the component is decided as non-usable at step S16, the program flow goes to step S17.

On the other hand, if the evaluation-target component is decided as omittable at step S14, then omittable-component information that the relevant component may be omitted is stored into the storage unit 13 at step 18, the program then going to step S15. The stored omittable-component information will be used in a process of improving the assemblability evaluation and the reverse-assemblability evaluation.

Also, if the component is decided as usable for assemblability evaluation at step S15, then assembly evaluation information that the component is usable for assemblability evaluation is stored into the storage unit 13 at step 19, the program then going to step S16. The stored assembly evaluation information will be used in a process of the assemblability evaluation at step S21.

Also, if the component is decided as usable for the reverse-assemblability evaluation at step S16, then reverse-assemblability evaluation information that the component is usable for the reverse-assemblability evaluation is stored into the storage unit 13 at step S20, the program then going to step S17. The stored reverse-assemblability evaluation information will be used in a process of executing the reverse-assemblability evaluation at step S22.

At step S17, it is decided whether evaluation information for all the components have been entered. If evaluation information for all the components have not been entered, then the program returns to step S12. If evaluation information for all the components have been entered, assemblability evaluation is executed at step S21 based on the assembly evaluation information stored at step S19, and assemblability evaluation result is stored into the storage unit 13.

Next, at step S22, reverse-assemblability evaluation is executed based on the reverse-assembly evaluation information stored at step S20, and reverse-assemblability evaluation result is stored into the storage unit 13.

Next, at step S23, assemblability evaluation index or indices are evaluated based on the assemblability evaluation information stored in the storage unit 13 at step S21, by which degree of assemblability, and the like, are evaluated.

Next, at step S24, reverse-assemblability evaluation index or indices are evaluated based on the reverse-assemblability evaluation information stored in the storage unit 13 at step S22, by which disassemblability, reusability, classifiability, safety, and the like, are evaluated.

Individual operations are described in detail below.

Figure 5:
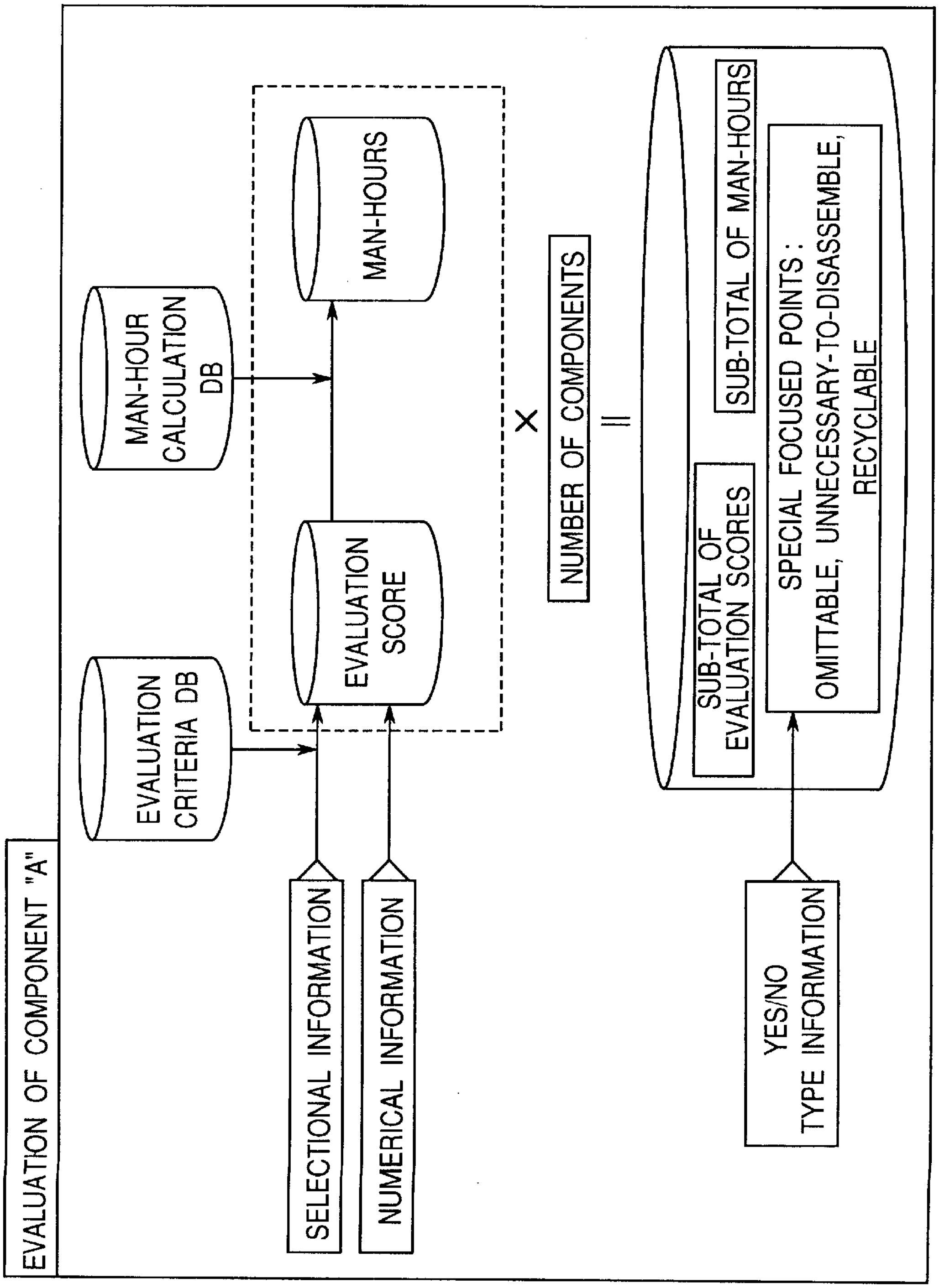
FIG. 5 is a schematic explanatory diagram of a flow of evaluation of components by the assemblability and reverse-assemblability evaluating method and apparatus of the embodiment.

As shown in FIG. 5, selectional information selected from among a plurality of answered items, numerical information answered by explicitly entering numerical values, and YES/NO information acquired by entering YES or NO, are acquired from the questions of the evaluation items with respect to, for example, one component "A" constituting a commercial product from an operator (input operator). Part of these pieces of information may also be based on information derived from a CAD system instead of the operator's own input. For the selectional information, evaluation scores are given to selected information from an evaluation criteria database by taking into consideration evaluation criteria. For the numerical information, evaluation scores are given to the numerical information. By taking into consideration these evaluation scores, man-hours are evaluated based on the man-hour information from a man-hour calculation database for the relevant component. Further, taking into consideration special focused points (e.g., whether the relevant component is an omittable component, an unnecessary-to-disassemble component, a recyclable component, or the like), evaluation scores are-multiplied by the number of components to calculate a sub-total of evaluation scores based on the YES/NO information. Further, also with respect to the man-hours, man-hours are multiplied by the number of components to calculate a sub-total of man-hours, the sub-total being stored into the storage unit 13.

Figure 6:
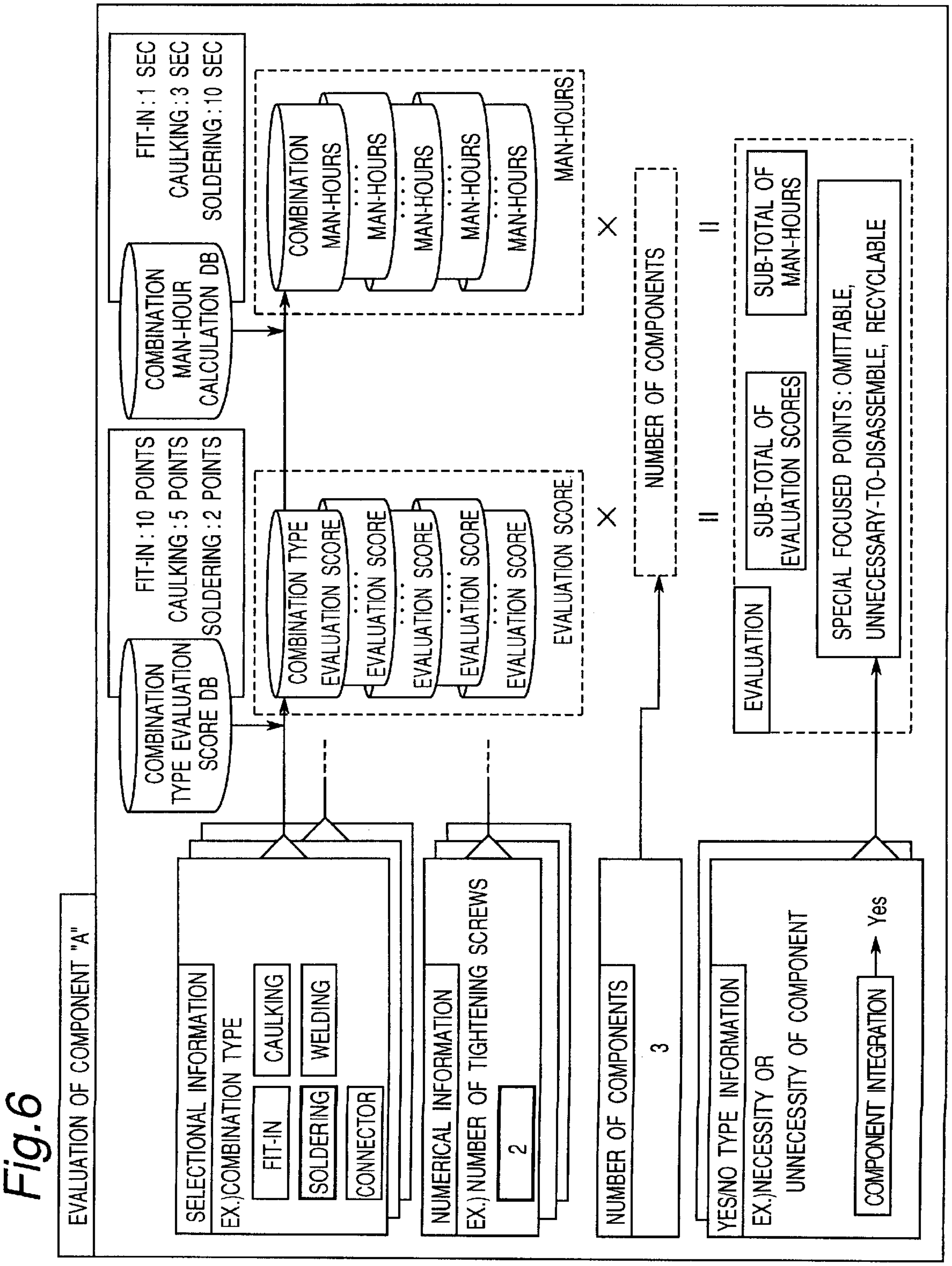
FIG. 6 is a schematic explanatory diagram of a more detailed flow of evaluation depicted in FIG. 5.

An explicit example of this flow is shown in FIG. 6. In this case, as an example, the combination type is evaluated with respect to the component "A". As the selectional information, fit-in, caulking, solder (in the figure, solder has been selected), welding, connectors, and the like, are presented as the selectional items. From among these items, the operator selects a combination type for the component A. Scores are previously stored as the evaluation criteria database for the combination type, for example, 10 points for fit-in, 5 points for caulking, and 2 points for soldering. Information is previously stored as the combining man-hour calculation database, such as 1 second for fit-in, 3 seconds for caulking, and 10 seconds for soldering. The number of tightening screws is entered as the numerical information is entered. In this example 2 is entered. In terms of necessity or non-necessity of the component the YES/NO information is entered. In this example, YES is entered as to component integration. In this way, the component is evaluated while the total product is also evaluated.

Figure 7:
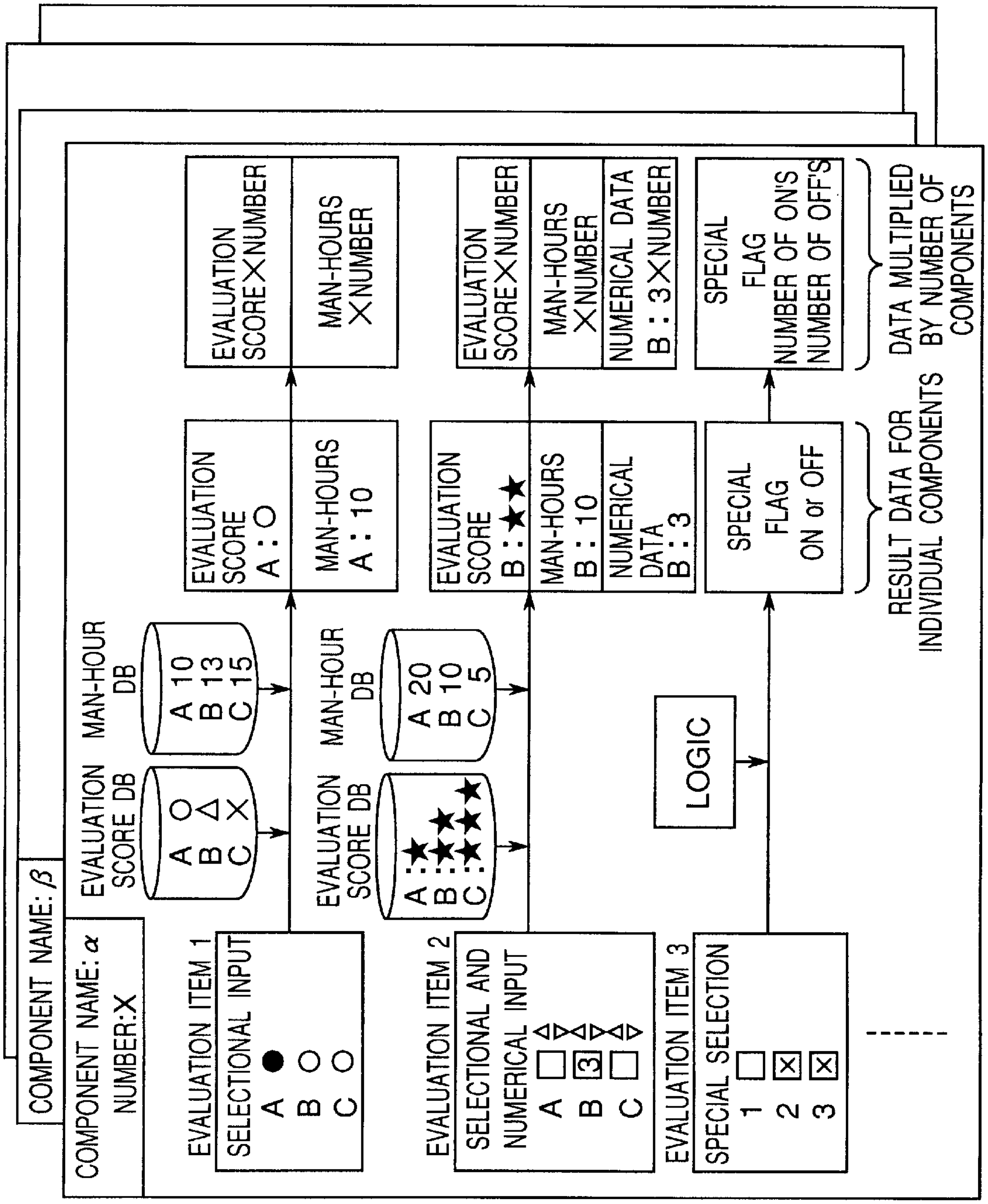
FIG. 7 is a schematic explanatory diagram of a detailed flow of the assemblability and reverse-assemblability evaluating method with respect to a component name α in FIG. 5.

In FIG. 7, with respect to a component α, A is selected from among A, B, and C by selectional input as evaluation item 1, and A is given a circle by the evaluation score database while 10 man-hours are given by the man-hour database. At evaluation item 2, B is selected and a numerical value of 3 is entered by selectional and numerical input. As a result of this, two stars are acquired from the evaluation score database, while 10 points are acquired from the man-hour database. At evaluation item 3, special selectional information is acquired, information as to whether special flags are turned ON is entered based on some special logic, and numbers of ON's and OFF's of the special flags are summed up, respectively. This operation is executed for all the components one by one. These evaluation items and their input information are listed as a table in FIG. 8.

Figure 9:
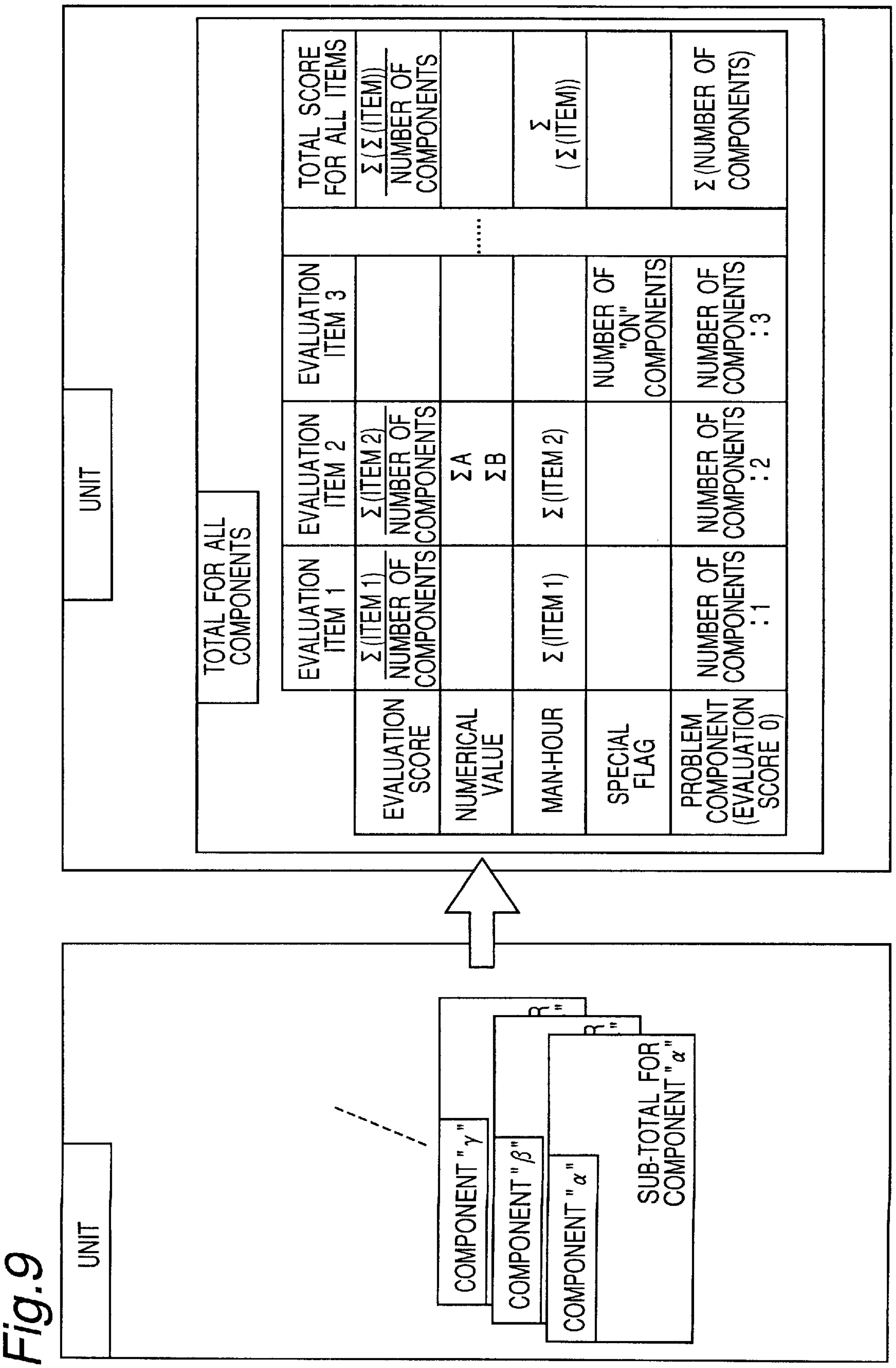
FIG. 9 is an explanatory diagram of a case where the detailed flow of the assemblability and reverse-assemblability evaluating method of FIG. 5 is applied to components within one unit.

Input operations as shown above are executed for each component (step S17), results are put together for each unit formed of a plurality of components assembled together (see FIG. 9), and finally, an evaluation for the whole product is grasped (see FIG. 10). In addition, the term "special flag" refers to, for example in FIGS. 9 and 10, a flag which is set (turned ON) in the case of a component into which a plurality of component parts can be integrated. Also in FIGS. 9 and 10, the term "problem component" refers to a component that has been evaluated particularly poor, where problem components can be discriminated by arbitrarily setting criteria, for example, by taking components having 0 points or 10 or lower points as problem components. According to the numbers and names of these problem components, the number of components requiring improving can be determined and specified.

In the method of determining the evaluation scores for the assemblability and the reverse assemblability, the total score as the product can be given by determining an average score which is obtained by summing up the scores of individual components and then dividing the summation by the number of components, but this method has one problem. That is, this method is contradictory to the notion that "it is better to eliminate even any highly pointed components". This is because reducing high scored components would cause the average score of the whole product to be lowered. Therefore, it is recommendable, as an example, to set the assembly total evaluation score to 0 for components that may be omitted at the time when evaluation for individual components has been completed. As a result of this, a contradiction that "omitting a component causes the evaluation score to be lowered" can be avoided. An explicit calculation method is as follows.

$$\text{Evaluation average score } \alpha = \left\{\sum_{A} \text{evaluation score of assembly components } A \text{ (number of assembly components } A)\right\} \Big/ \text{(total number of assembly components).}$$

Total evaluation index={evaluation average score Δx(total number of assembly components−number of omittable components)}/(total number of assembly components).

Figure 11:
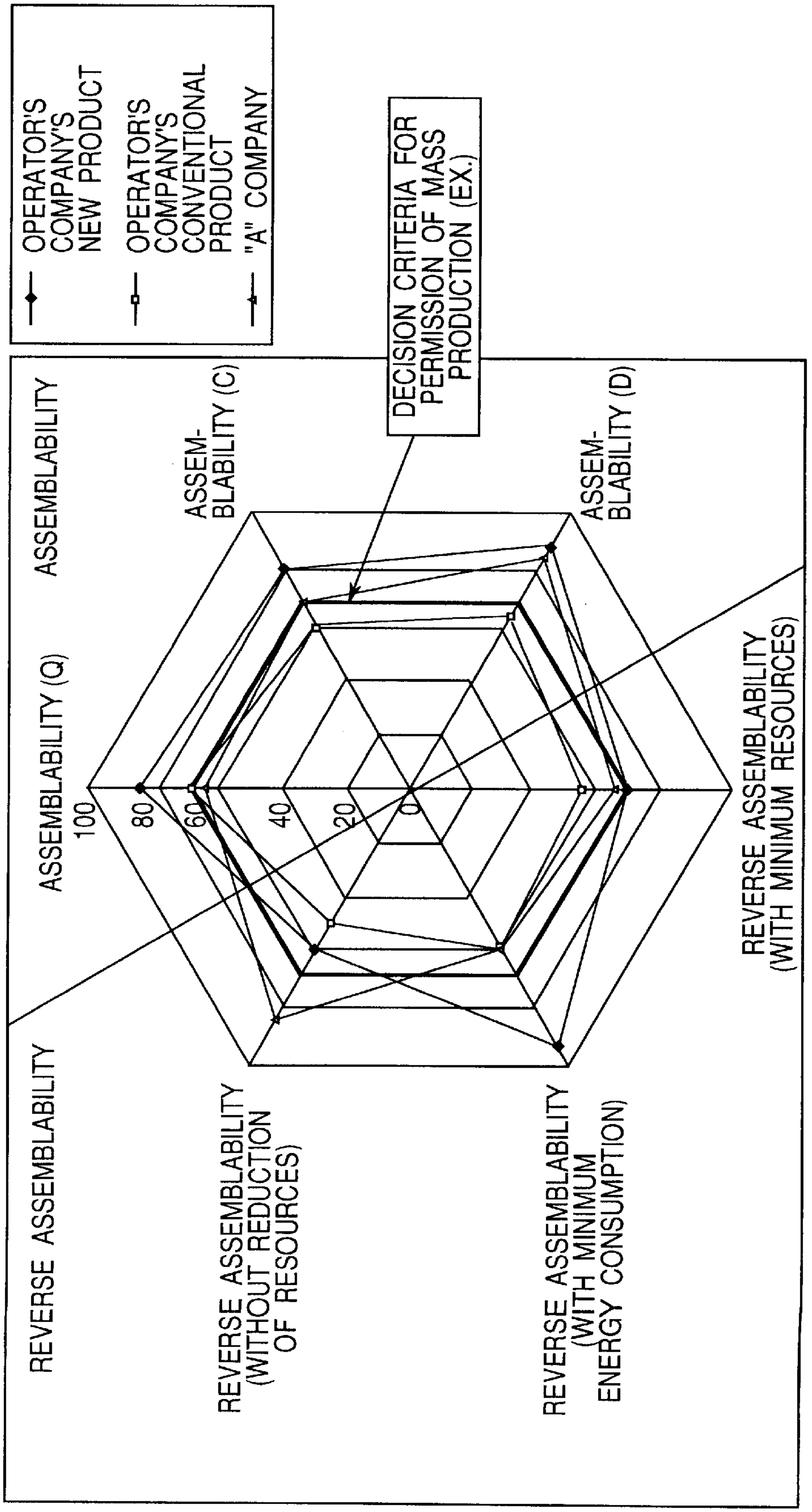
FIG. 11 is a graph of evaluation results of an example of assemblability evaluation items and reverse assemblability evaluation items in the assemblability and reverse-assemblability evaluating method and apparatus of the embodiment based on FIG. 3.
Figure 12:
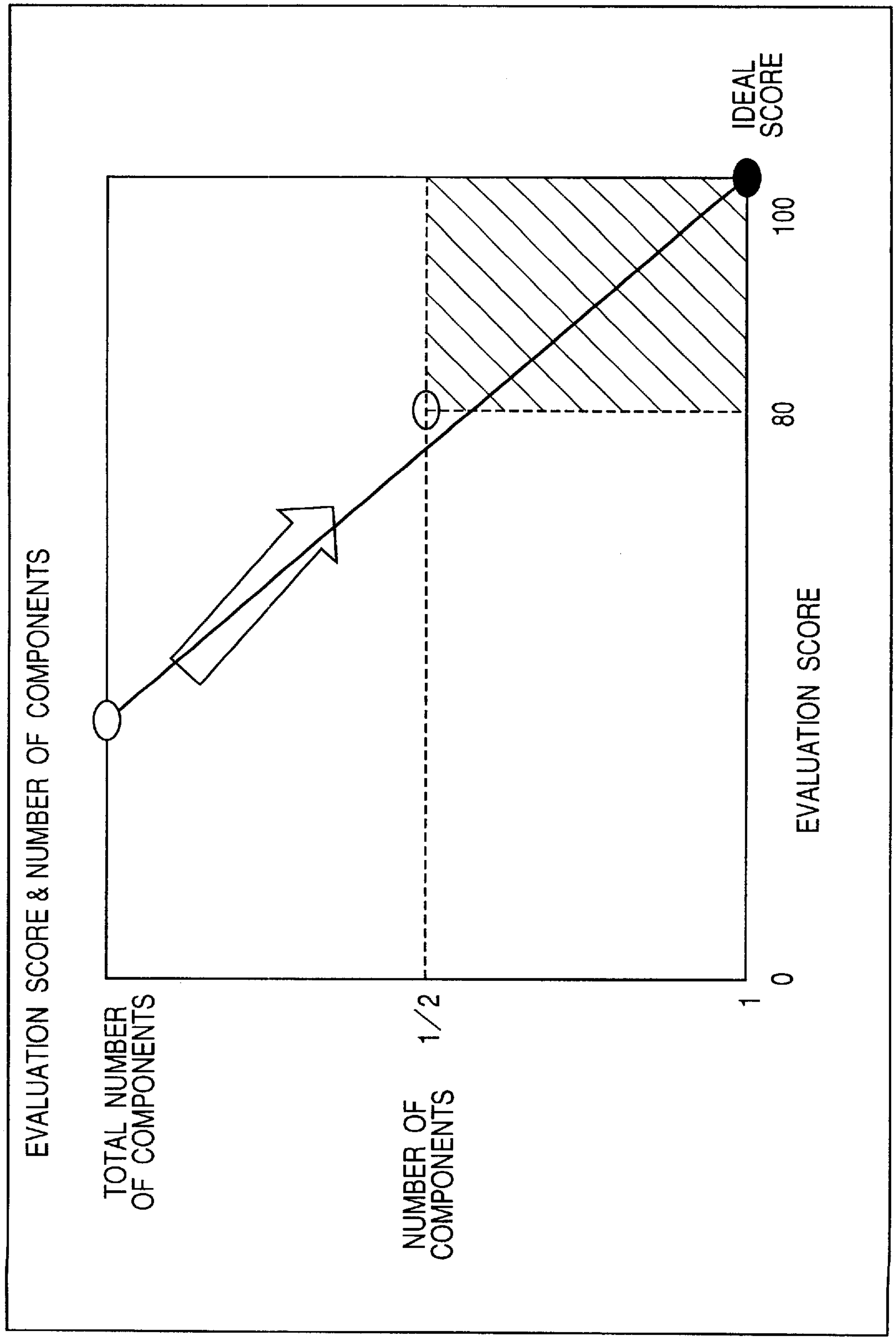
FIG. 12 is a graph of evaluation scores and component counts of the assemblability and reverse-assemblability evaluating method and apparatus of the embodiment based on FIG. 3.

Results of these evaluations can be outputted, for example, as shown in FIGS. 11 and 12. FIG. 11 shows evaluation at individual evaluation items of assemblability (Q: quality, C: cost, D: delivery) and reverse assemblability (fewer resources, less energy consumption, suppression of resource value reduction) with respect to the evaluation items of FIG. 3, assuming that the center point is assigned 0 points and the outermost periphery is assigned 100 points, as an example. This assumption of a 0-point center and a 100-point outermost periphery is intended for an easier understanding for the evaluator, but without being limited to these points, other points may be assigned. The bold line being a line of mass-production permission criterion as an example, it can be understood that this criterion and three kinds of products, "operator's company's new product", "operator's company's conventional product", and "A company's product" can be compared with one another. In FIG. 12, the vertical axis represents the total number of components and the horizontal axis represents the evaluation score. It can be seen that, although it is ideal that the current total number of components can be integrated into one component, yet it is appropriate, with an aim of halving the total number of components for the present and with a setting of evaluation score target of 80 points or more by improving the assemblability, that the resulting score falls within a target area hatched in FIG. 12. In other words, it is appropriate to make efforts to reduce the distance from the ideal point in both vertical and horizontal directions as much as possible.

Figure 13:
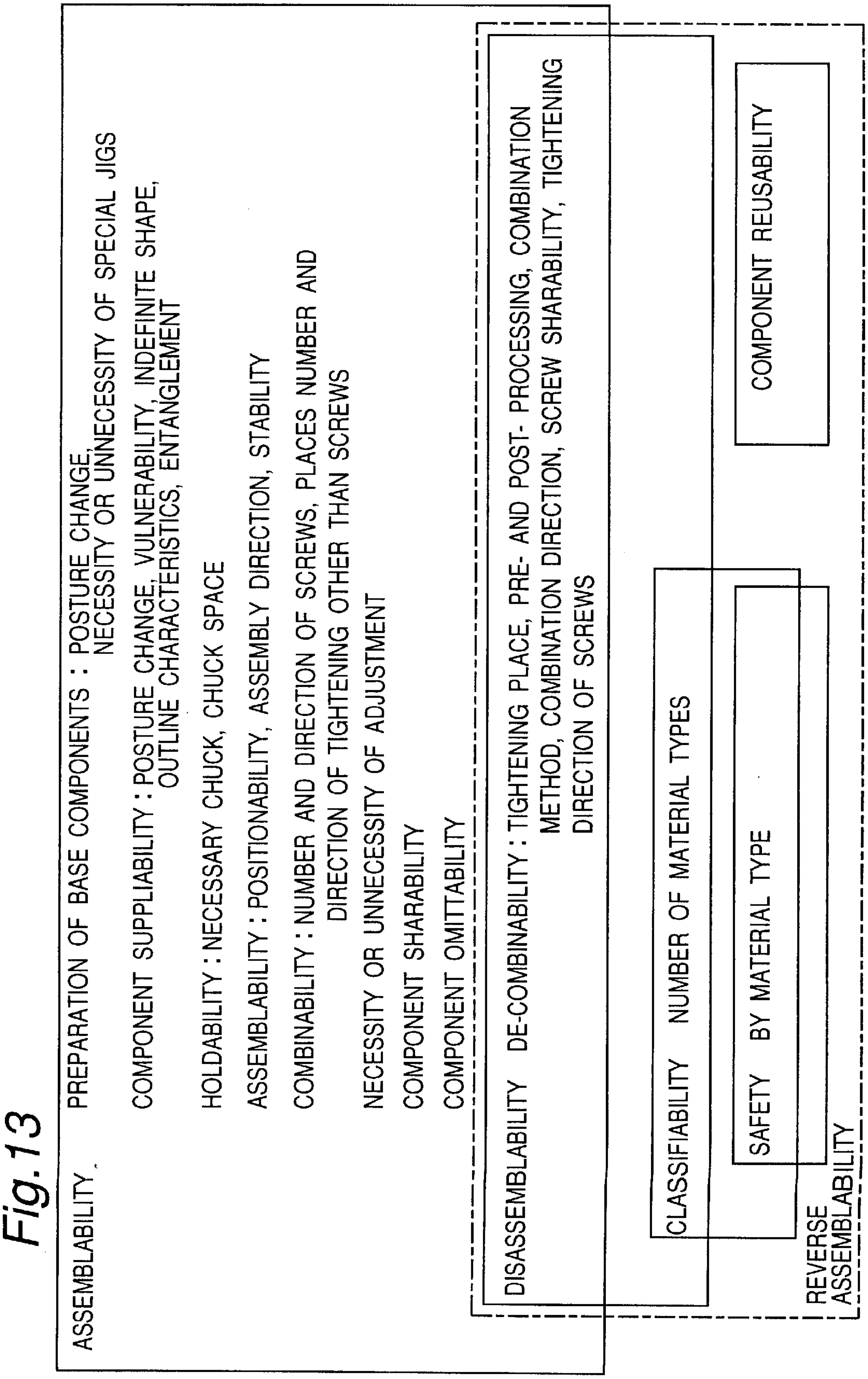
FIG. 13 is an explanatory diagram showing that evaluation items of assemblability and reverse assemblability can be shared in the embodiment.

Next, in evaluating the assemblability and the reverse assemblability, evaluation items to be used for, for example, the evaluation of the reverse assemblability when the worker enters information into the evaluation apparatus in response to the questions about the evaluation items of the assemblability evaluation are specifically shown in FIG. 13.

More specific evaluation items for the "assemblability" include "preparation for base component", "component suppliability", "holdability", "combinability", "necessity or non-necessity of adjustment", "component sharability", "component omittability", and the like.

At least, posture change of base component(s), and necessity or non-necessity of any special jig(s) for base component(s) are evaluated as more detailed evaluation items for the "preparation for base component". At least, such items as change of component, component vulnerability, indefinite shape of component's own shape, outline characteristics of component, and entanglement of component are evaluated as more detailed evaluation items for the "component suppliability". At least, such items as necessary chuck for holding and chuck space are evaluated as more detailed evaluation items for the "holdability". At least, such items as positionability, direction of assembly, and stability are evaluated as more detailed evaluation items for the "assemblability". At least, the number and direction of tightening screws in the assembly process of the evaluation-target product, and the number and direction of tightening places other than the tightening screws in the assembly process are evaluated as more detailed evaluation items for the "combinability". At least, the necessity or non-necessity of various adjustments in the assembly process of the evaluation-target product is evaluated as a more detailed evaluation item for the "necessity or non-necessity of adjustment". At least, how component sharability is accomplished and others is evaluated as a more detailed evaluation item for the "component sharability". Further, at least, the possibility that the component can be omitted by, for example, integration is evaluated as a more detailed evaluation item for the "component omittability".

In contrast to the above "assemblability", more specific evaluation items for the "reverse-assemblability" include "disassemblability", "classifiability"; "reusability", "safety", and the like.

First, a more detailed evaluation item for the "disassemblability" is "de-combinability". Such items as tightening place, pre- and post-processing, combination type, combination direction, tightening screw sharability, tightening direction of tightening screws, and the like, are evaluated As more detailed evaluation items for the "de-combinability".

The possibility of reuse of the component is evaluated as a more detailed evaluation item for the "component reusability" (recyclability).

Component weight and number of component material types are evaluated as more detailed evaluation items for the "classifiability".

Material type, i.e., whether any harmful substance is contained, how much is the quantity of the harmful substance or what is the weight of components containing the harmful substance, and the like, are to be evaluated as more detailed evaluation items for the "safety".

As shown in FIG. 13, it is expressed that between the evaluations of the "assemblability" and the "reverse assemblability", information on the evaluation item of the "combinability" (de-combinability) can be shared. Between-the evaluations of the "disassemblability" and the "classifiability", information on the evaluation item of the "component weight and number of material types" can be shared. With respect to the "classifiability" and the "safety", information on the evaluation item of the "material type" can be shared apparently. In other words, this means that once information on the evaluation item of the "combinability" as an evaluation item for the assemblability is acquired, the information acquired for the "assemblability" as the evaluation item of the "combinability" can be used, as it is, for the "disassemblability" in the evaluation of the reverse assemblability. Further, once information on the evaluation item of the "component weight and number of material types" as the "disassemblability" is acquired in the evaluation of the reverse assemblability, the information can be-used- for the evaluation of the "classifiability". Further, once information on the evaluation item of the "material type" is acquired for the "classifiability", the information can be used for the evaluation of the "safety". Accordingly, when both the assemblability and the reverse assemblability are simultaneously evaluated by associating such evaluation items with one another, input information on the evaluation items of either one of the assemblability or the reverse assemblability, for example of the assemblability can be used also for the reverse assemblability, so that input information can be used with high efficiency.

Figure 14:
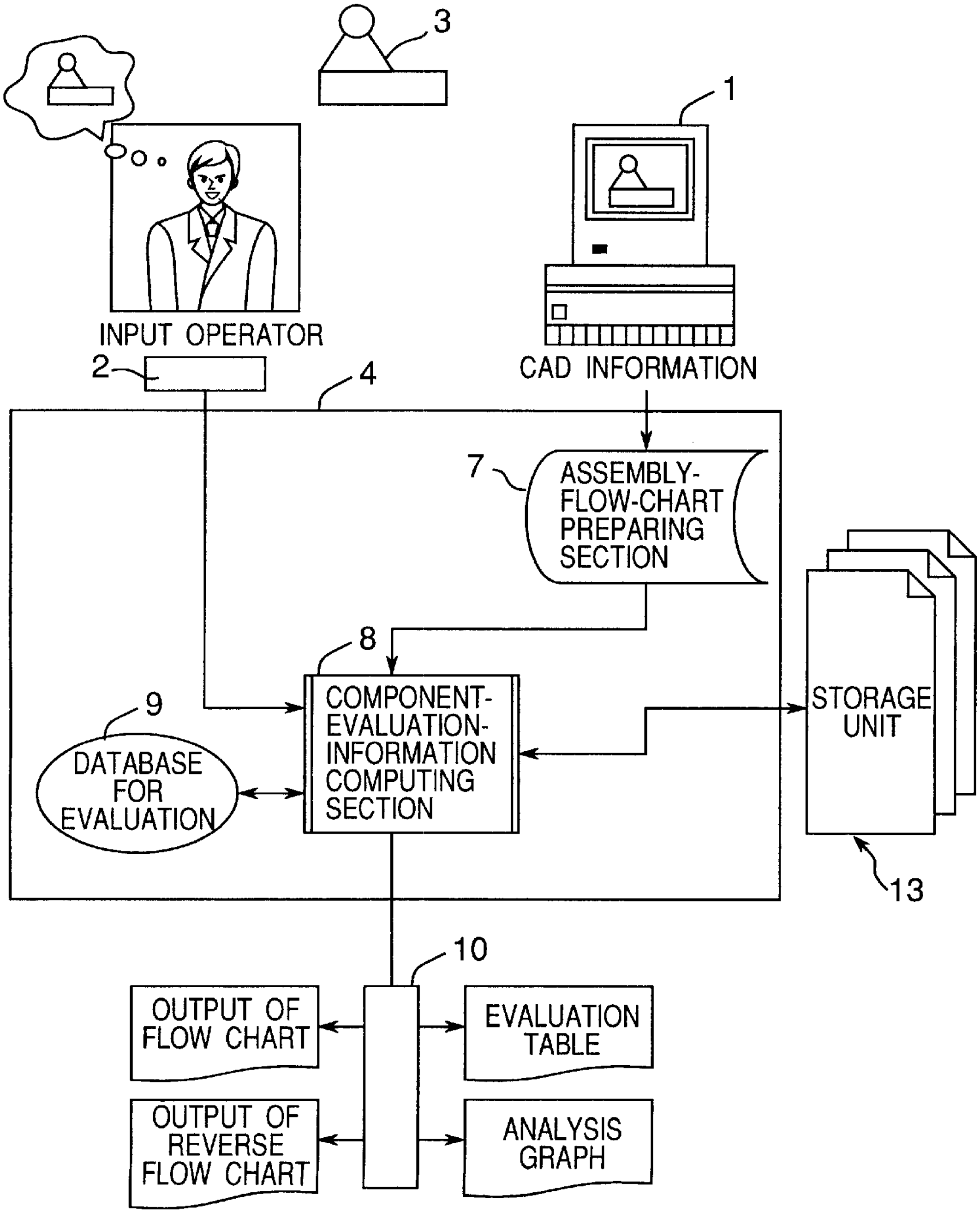
FIG. 14 is a schematic diagram of an evaluation apparatus for carrying out the assemblability and reverse-assemblability evaluating method of the embodiment.
Figure 15:
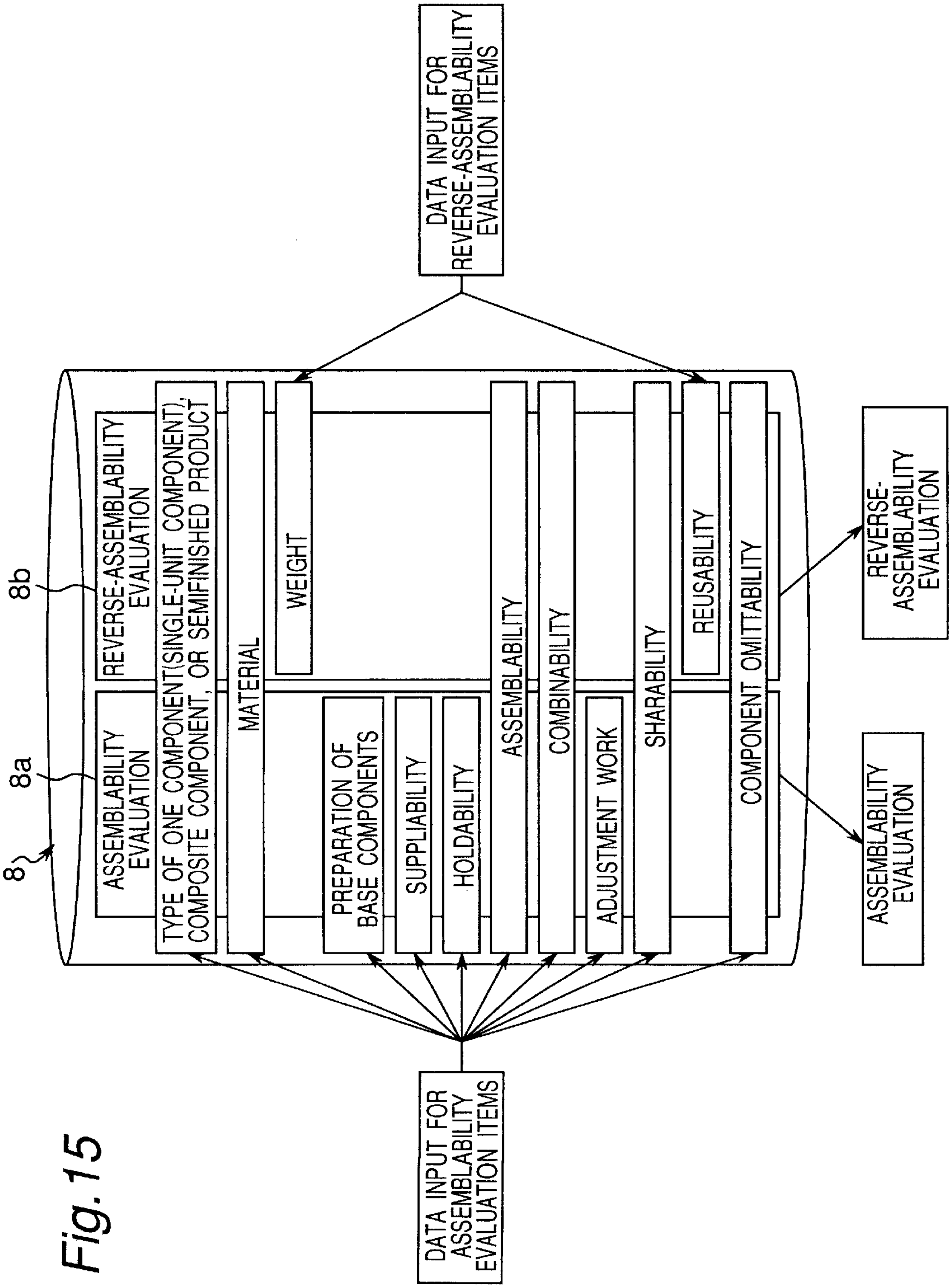
FIG. 15 is a detailed diagram of the arrangement of the evaluation section of FIG. 14.

Arrangement of the evaluation apparatus for embodying the above-described assemblability and reverse-assemblability evaluating method according to this embodiment is shown in FIGS. 14 and 15. Referring to FIG. 14, information as to the evaluation-target product (such as one component, a composite product in which a plurality of components are integrally combined, a semifinished product in which a plurality of components are assembled together, and a finished product) 3, for example, assembly information such as component name, assembly sequence, and quantity in number, is entered into the component-evaluation-information computing section 8 within a computing unit 4 with the use of an input device 2 such as a keyboard or mouse by an input operator such as an evaluator, so as to be stored into the storage unit 13. Also, part of the foregoing information as well as information as to drawings of the evaluation-target product 3 are entered as CAD information from a CAD system 1 into an assembly-flow-chart preparing section 7 of the computing unit 4, and based on the CAD information, a later-described assembly flow chart is prepared in the assembly-flow-chart preparing section 7. The assembly flow chart prepared in the assembly-flow-chart preparing section 7 is entered into the component-evaluation-information computing section 8 and stored into the storage unit 13. From various types of information stored in the storage unit 13 in this way, component detail information, for example, information as to assembly components, information as to base components, which are components to be assembled, information as to the relation between the assembly components and the base components (more specifically, such information as assembly component name, component number, base component name, base component number, number of assembly components, whether the assembly component is a semifinished product, and whether the posture of base components is changed), combination type, information as to wear is taken out from the storage unit 13. Based on these pieces of information, the evaluation of the assemblability and the reverse assemblability is executed by the component-evaluation-information computing section 8. Also, computing equations and information necessary for the evaluation of the assemblability and the reverse assemblability, for example, evaluation criteria, evaluation scores, man-hours, particular-component extraction logics (a logic for, when a plurality of components made of the same material are assembled, evaluating whether or not any component omission is possible by integrating the components into one component; a logic for, when components made of the same material are assembled, making the components unnecessary to disassemble, or the like) stored in an assemblability and reverse-assemblability evaluation database 9 are entered into the component-evaluation-information computing section 8 as required, and are used for the evaluation of the assemblability and the reverse assemblability.

As shown in FIG. 15, the component-evaluation-information computing section 8 comprises an assemblability evaluation section 8*a* and a reverse-assemblability evaluation section 8*b*. Such information as type information on components as to whether to be a single product (single-unit component), a composite product (which is a component aggregate formed of a plurality of components having previously been assembled into one component and which is a component aggregate that cannot be considered in terms of producibility etc. by evaluating its assemblability and reverse assemblability), or a semifinished product (which is a component aggregate formed of a plurality of components being assembled and unitized, and which is a component aggregate that can be considered in terms of producibility etc. by evaluating its assemblability and reverse assemblability), material information on those components, information on the preparation of the base components, information on component suppliability, information on ease of component holding (holdability), information on ease of assembling (assemblability), information on combinability (de-combinability), information on adjusting work, information on sharability, and information on component omittability is entered into the assemblability evaluation section 8*a*. Based on these pieces of information, the evaluation of the assemblability is executed by the assemblability evaluation section 8*a*. On the other hand, the type information on components as to whether to be a single product, a composite product, or a semifinished product, the material information on those components, the information on ease of assembling (assemblability), the information on combinability, the information on sharability, and the information on component omittability is entered into the assemblability evaluation section 8*a*. Out of the information that has been entered into the assemblability evaluation section 8*a,* such information as to the component weight. information and the reusability information is additionally entered from the assemblability evaluation section 8*a* into the reverse-assemblability evaluation section 8*b*. Based on these pieces of information, the evaluation of the reverse assemblability is executed by the reverse-assemblability evaluation section 8*b*.

Input of these pieces of information is done by input from the information within the storage unit 13 and by entering answer information with the input device 2 by an input operator such as an operator in response to specifically-later-described questions. Evaluation results of the evaluation by the component-evaluation-information computing section 8 are stored into the storage unit 13 as shown in FIG. 14. The evaluation result information stored in the storage unit 13 is displayed on a display unit as an example of an output device 10 in the form of an analysis graph or an evaluation table or the like, and can be printed by a printing device as another example of the output device 10, as required. Also, the assembly flowchart prepared by the assembly-flow-chart preparing section 7 can be displayed on a display unit as an example of the output device 10, or printed by a printing device as another example of the output device 10. Further, in the assembly-flow-chart preparing section 7, a reverse flow chart is prepared based on the prepared assembly flow chart and stored into the storage unit 13, and further can be displayed on the display unit or printed by the printing device like the assembly flow chart.

Referring to FIG. 14, the storage unit 13 is also capable of storing evaluation results etc. of commercial products that have been evaluated before, and these evaluation results can be displayed on the display unit or printed by the printing device together with the evaluation result information of a most recently evaluated commercial product, as required. It is also possible that evaluation result information on a commercial product that has been previously evaluated is entered into the component-evaluation-information computing section 8 and used for the evaluation of the assemblability and the reverse assemblability, as required. In addition, since information as to the preparation of assembly flow charts have also been stored in the storage unit 13, the information can be used for the output of the evaluation result information.

As depicted in FIG. 14, when CAD information derived from the CAD system 1 is entered into the computing unit 4, the information is entered into the component-evaluation-information computing section 8 via the assembly-flow-chart preparing section 7. However, the present invention not being limited to this, necessary information out of the CAD information from the CAD system 1 may be entered directly into the component-evaluation-information computing section 8 without routing via the assembly-flow-chart preparing section 7. It is also possible to directly enter information on the commercial product 3, or CAD information on the drawings, into the storage unit 13 without routing via the component-evaluation-information computing section 8, and to enter the information on the commercial product 3, and the CAD system 1, from the storage unit 13 into the evaluation section 8. Also, as required, when changing scores, or the like, of answers to individual questions is desired, score allocation within the assemblability and reverse-assemblability evaluation database 9, and the like, can be changed via the input device 2, manually by an input operator, based on the assembly information or information on the evaluation-target component 3.

Next, evaluation items for the assemblability and the reverse assemblability, questions at those evaluation items, selectional items of answers to the questions, and reverse-assemblability evaluation with respect to the selectional-items are described in more detail with reference to FIGS. 16 to 20.

As major items of the evaluation items, for example, (10A) "material", (10B) "preparation for base components", (10C) "component suppliability", (10D) "holdability", (10E) "assemblability", (10F) "combinability", (10G) "necessity or non-necessity of adjustment", (10H) "sharability", (10I) "component omittability", and (10J) "reusability" are adopted.

(10A) For the major item "material", more detailed evaluation items for example, "weight", "component formation and material", and "preprocessing" are adopted.

The question for the evaluation item "weight" is "weight?", and the numerical value input for this question is "80 g" as an example.

As the questions for the evaluation item "component formation and material", a first one is "How is the component made up?", and selectional items for this question are "A: single product, B: composite (composite product), C: semifinished product". Next, another question is "Which material is used?", and selectional items for this question are "A: metal, B: resin, C: wood, D: others, E: harmful substance". Although assembly scores for these selectional items are none, their reverse-assemblability scores are 10, 5, 2, 1, and 0 for the items A, B, C, D, E, F and G, respectively, where in the case of a composite component, the lowest score out of selected ones is adopted. Further, another question is "Is any combination type other than mechanical used within the composite component?", and selectional items for this question are "A: no, B: yes". Although assembly scores for these selectional items are none, their reverse-assemblability scores are 5 for A and 0 for B.

Next, the question for the evaluation item "preprocessing" is "Is preprocessing necessary?", and selectional items for this question are "A: yes, B: no". Although assembly scores for these selectional items are none, reverse-assemblability scores are 0 for A and 5 for B.

(10B) For the major item "preparation for base components", more detailed evaluation items "material", "posture change of base components", and "base component side jigs" are provided as an example.

The question for the evaluation item "material" is "Component is of the same material?". This is automatically decided based on material information that has previously been entered. Although assembly scores for these selectional items are none, these pieces of information. are used for the decision as to the necessity or non-necessity of disassembly with respect to the reverse assemblability evaluation.

The question for the evaluation item "posture change of base components" is "Is posture change of base components necessary?". Selectional items for this question are "A: unnecessary, B: necessary". Assembly scores for these selectional items are 3 for A and 0 for B. Reverse assemblability scores and evaluation are none.

The question for the evaluation item "base component side jigs" is "Is any jig for assembling component necessary?", and selectional items for this question are "A: unnecessary, B: necessary". Assembly scores for these selectional items are 5 for A and 0 for B. Reverse assemblability scores and evaluation are none.

(10C) For the major item "component suppliability", more detailed evaluation items for example, "posture change of assembly component", "fragility and vulnerability", "indefinite shape", "outline characteristics", and "overlap, fit-in, entanglement, affixation" are adopted.

The question for the evaluation item "posture change of assembly component" is "Is any posture change of component necessary?", and selectional items for this question are "A: unnecessary, B: necessary". Assembly scores for these selectional items are 5 for A and 0 for B. Reverse assemblability scores and evaluation are none.

The question for the evaluation item "fragility and vulnerability" is "Is the component subject to damage?", and selectional items for this question are "A: no, B: yes". Assembly scores for these selectional items are 5 for A and 0 for B. Reverse assemblability scores and evaluation are none.

The question for the evaluation item "indefinite shape" is "Is the component shape definite?", and selectional items for this question are "A: definite, B: indefinite". The term "indefinite shape" herein refers to such a shape as cords and long springs. Assembly scores for these selectional items are 5 for A and 0 for B. Reverse assemblability scores and evaluation are none.

The question for the evaluation item "outline characteristics" is "Is the component easy to align?", and selectional items for this question are "A: easy, B: not easy". Assembly scores for these selectional items are 5 for A and 0 for B. Reverse assemblability scores and evaluation are none.

The question for the evaluation item "overlap, fit-in, entanglement, affixation" is "Is there any overlap, fit-in, entanglement, or affixation?", and selectional items for this question are "A: no, B: yes". Assembly scores for these selectional items are 5 for A and 0 for B. Reverse assemblability scores and evaluation are none.

(10D) For the major item "holdability", more detailed evaluation items, for example, two kinds of "chucking ability"are adopted.

The question for the evaluation item "chucking ability (1)" is "What chuck is used?", and selectional items for this question are "A: general chuck, B: special chuck, C: cannot be chucked". Assembly scores for these selectional items are 3, 2, and 0 for A, B, and C, respectively. Reverse assemblability scores and evaluation are none.

The question for the evaluation item "chucking ability (2)" is "Is there space to accommodate a chuck?", and selectional items for this question are "A: yes, B: no". Assembly scores for these selectional items are 5 for A and 0 for B. Reverse assemblability scores and evaluation are none.

(10E) For the major item "assemblability", more detailed evaluation items, for example, "positionability", "direction and operation", and "stability" are adopted.

The comment for the evaluation item "positionability" is "as to positioning", and selectional items for this comment are "A: alignable, B: less alignable, C: not alignable". Assembly scores for these selectional items are 5, 3, and 0 for A, B, and C, respectively. Reverse assemblability scores and evaluation are none.

The comment for the evaluation item "direction and operation" is "as to direction and operation", and selectional items for this comment are "A: simply (assemblable) from upward, B: simply (assemblable) from other than upward", C: complex in both direction and operation". Assembly scores for these selectional items are 10, 5, and 0 for A, B, and C, respectively, while reverse assemblability scores are 10, 5, and 0 for A, B, and C, respectively.

The question for the evaluation item "stability" is "Is there stability of assembly component?", and selectional items for this question are "A: yes, B: no". Assembly scores for these: selectional items are 5 for A and 0 for B. Reverse assemblability scores and evaluation are none.

(10F) For the major item "combinability", more detailed evaluation items, for example, "case of screwing" and "case of other than screwing" are adopted.

A question for the evaluation item "case of screwing" is "Is pre- and post-processing work necessary?", and selectional items for this question are "A: unnecessary, B: necessary". Assembly scores and reverse-assemblability scores and evaluation for these selectional items are none. Another question for the evaluation item is "Does the component have sharability of screws?", and selectional items for this question are "A: yes, B: no". Assembly scores and reverse assemblability scores and evaluation for these selectional items are none. A comment for the evaluation item is "as to direction and method", and selectional items for this comment are "A: combining with one screw from upward, B: combining with a few screws from upward, C: screwing from other than upward". Assembly scores for these selectional items are 10, 5, and-0 for A, B, and C, respectively. In addition, this information will be used for the decision of necessity or non-necessity of disassembly in the evaluation of the reverse assemblability.

A question for the evaluation item "case of other than screwing" is "Is there preparation and processing work?", and selectional items for this question are "A: no, B: yes". Assembly scores and reverse-assemblability scores and evaluation for these selectional items are none. A comment for the evaluation item is "as to combination type", and selectional items for this comment are "A: fit-in, B: press-fitting or caulking, C: mechanical component, D: spot welding, E: soldering, F: indefinite tightening, G: difficult-to-automatize (tightening method)". Assembly scores for these selectional items are 20, 15, 10, 8, 5, 2, and 0 for A, B, C, D, E, F, and G, respectively, while reverse assemblability scores and evaluation for these selectional items are 20, 20, 20, 10, 5, 10, and 0 for A, B, C, D, E, F, and G, respectively, and these pieces of information will be used for the decision of necessity or non-necessity of disassembly. Further, another question for the evaluation item is "How many directions and types of combination are involved?", and selectional items for this question are to be selected from among "upward, downward, forward, backward, leftward, rightward" with respect to items selected from among the selectional items A to G for the question "as to combination type". Although assembly scores are none, reverse-assemblability scores are given by using the scores for "as to combination type", as they are, in response to directions selected from among "upward, downward, forward, backward, leftward, rightward" or by adjusting the scores through appropriate diversion or other operation.

(10G) For the major item "necessity or non-necessity of adjustment", a more detailed evaluation item, for example, "necessity or non-necessity of adjustment" is adopted. The question for the evaluation item is "Is adjustment work necessary?", and selectional items for this question are "A: unnecessary, B: necessary". Assembly scores and reverse-assemblability scores and evaluation for these selectional items are none.

(10H) For the major item "sharability", a more detailed evaluation item, for example, "sharability" is adopted. The question for the evaluation item is "Is there sharability?", and selectional items for this question are "A: yes, B: no". Assembly scores for these selectional items are 5 for A and 0 for B. Reverse assemblability scores and evaluation for these selectional items are none.

(10I) For the major item "component omission", a more detailed evaluation item, for example, "necessity or non-necessity of component" is adopted. The question for the evaluation item is "Is the component necessary?", and selectional items for this question are "Can the component be integrated into one unit? (YES/NO)". Assembly scores for these selectional items are none. In the reverse-assemblability score and evaluation, 20 points are given when the component can be integrated into one unit.

(10J) For the major item "reusability", a more detailed evaluation item, for example, "theoretical reusability" is adopted. The question for the evaluation item is "possibility of reuse?", and selectional items for this question are "①: Wear (YES/NO), ②: deterioration (YES/NO), ③: flaw (YES/NO)?". Assembly scores for these selectional items are none. In the reverse-assemblability score and evaluation, if all of the items ①, ②, and ③are answered NO, then it is decided that there is a possibility of reuse.

In the above-described explicit example, the major items "preparation for base components", "component suppliability", "holdability", and "necessity or non-necessity of adjustment" are information that is used for only the evaluation of the assemblability, while "material" and "reusability" are information that is used for only the reverse-assemblability. The major items "assemblability", "combinability", and "component omittability" are information that is used for both the evaluation of the assemblability and the evaluation of the reverse assemblability. That is, information as to "assemblability", "combinability", and "component omittability" is used for both the evaluation of the assemblability and the evaluation of the reverse assemblability.

In addition, the above assembly scores and reverse-assemblability scores are given as an example, where it is arranged in the answers to the same question that a preferable answer results in a higher score than answers that are not preferable. However, without being limited to the above score allocation, the present invention allows arbitrary setting, as required, by taking into consideration the way of displaying evaluation results etc. of the assemblability evaluation and the reverse-assemblability evaluation (for example, such a score allocation that a component superior in all the items results in a full score of 100 points).

For instance, as a modification of the above example, another evaluation method for the "combinability" is explained in FIG. 22. In the "combinability" according to this modification, the following evaluation items are adopted: ①disassembly target components/weight of unit?, ② easy-to-undo tightening method? (input unnecessary . . . e.g. , information that has been used for the assemblability evaluation is automatically entered by the assemblability evaluation section 8*a*) (tightening by screws/tightening other than screws, type of untightening jigs . . . bare hand/general jigs (screwdriver etc. )/jigs and equipment), ③ (a preprocessing for untightening necessary? (for untightening, is such preprocessing as dewatering, degassing and derusting necessary?), ④ tightening direction? (degree of concentration of untightening direction . . . the first untightening direction is regarded as top face (A) or front face (B)), ⑤ removing operation simple? (input unnecessary . . . e.g., information that has been used for the assemblability evaluation is automatically entered by the assemblability evaluation section 8*a*) (according to the items for the assemblability evaluation (where one-operation removal from the top or front face is good). Then, as the evaluation score allocation, untightening score is classified into "screws" and "other than screws", and further questions for these items are "number and direction of untightening places", "direction score", "necessary tools", and "removal operation". In the case where the "necessary tools" are any of bare hand, screwdriver, nipper, pliers, and the like, if the "removal operation" is one operation, then the score allocation for the "removal operation" is 20 points, where the "untightening score" is also 20 points for both "screws" and "other than screws". In the case where the "necessary tools" are any of power tool, soldering iron, hammer, chisel, and the like, if the "removal operation" is a double-operation, then the score for "removal operation" is 10 points, where the "untightening score" is 15 points for "screws" and 10 points for "other than screws". In the case where the "necessary tools" are other jigs, special equipment or the like, if the "removal operation" is a complex operation, then the score for "removal operation" is 0 points, where the "untightening score" is 10 points for "screws" and 0 points for "other than screws". With respect to the "number and direction of untightening places", information as to the direction of upward, forward, leftward, rightward, backward, and downward as well as the number of untightening places is entered, and used for the component evaluation and general evaluation. Also, the "direction score" is 10 points for less than 4 directions and 0 points for not less than 4 directions.

Further, more specifically, evaluation input sheets of an assemblability and reverse-assemblability (forward/reverse assemblability) evaluation sheet (component evaluation table) with respect to an example in which the assemblability and reverse-assemblability evaluation is performed on the assumption of a washing machine as the product are shown in FIGS. 23 to 27. Reverse-assemblability evaluation sheets of the assemblability and reverse-assemblability (forward/reverse assemblability) evaluation sheet (component evaluation table) are shown in FIGS. 28 to 31.

In this example, with respect to the "disassemblability", a component that does not need to be disassembled is assigned a full score, and two components assembled together, if made of the same material, are treated as unnecessary to disassemble also in this case. Also, in a decision of material, iron, aluminum, and the like, because being easy to reuse by the present state of the art, are scored high as compared with resins. This score allocation may appropriately be so set that the score becomes higher as resin gets easier to recycle. According to this evaluation sheet, by the score graph, determination of the number of components having low scores at the assemblability and the reverse assemblability (e.g., components that cause the general evaluation to be lowered) as well as identification of those components can be easily achieved, and proposed as an improvement proposal. This may be implemented by operator's visual observation, or may be outputted by automatically detecting the names and numbers of components that do not satisfy decision criteria after previously setting the decision criteria.

Next, an example of the assembly flow chart to be prepared prior to the evaluation of the assemblability and the reverse assemblability is described below. As described above, after this assembly flow chart is prepared, assemblability evaluation is performed based on the assembly flow, and then reverse-assemblability evaluation is performed and a reverse-assembly flow is prepared, thus assembly flow chart being of importance.

Figure 43:
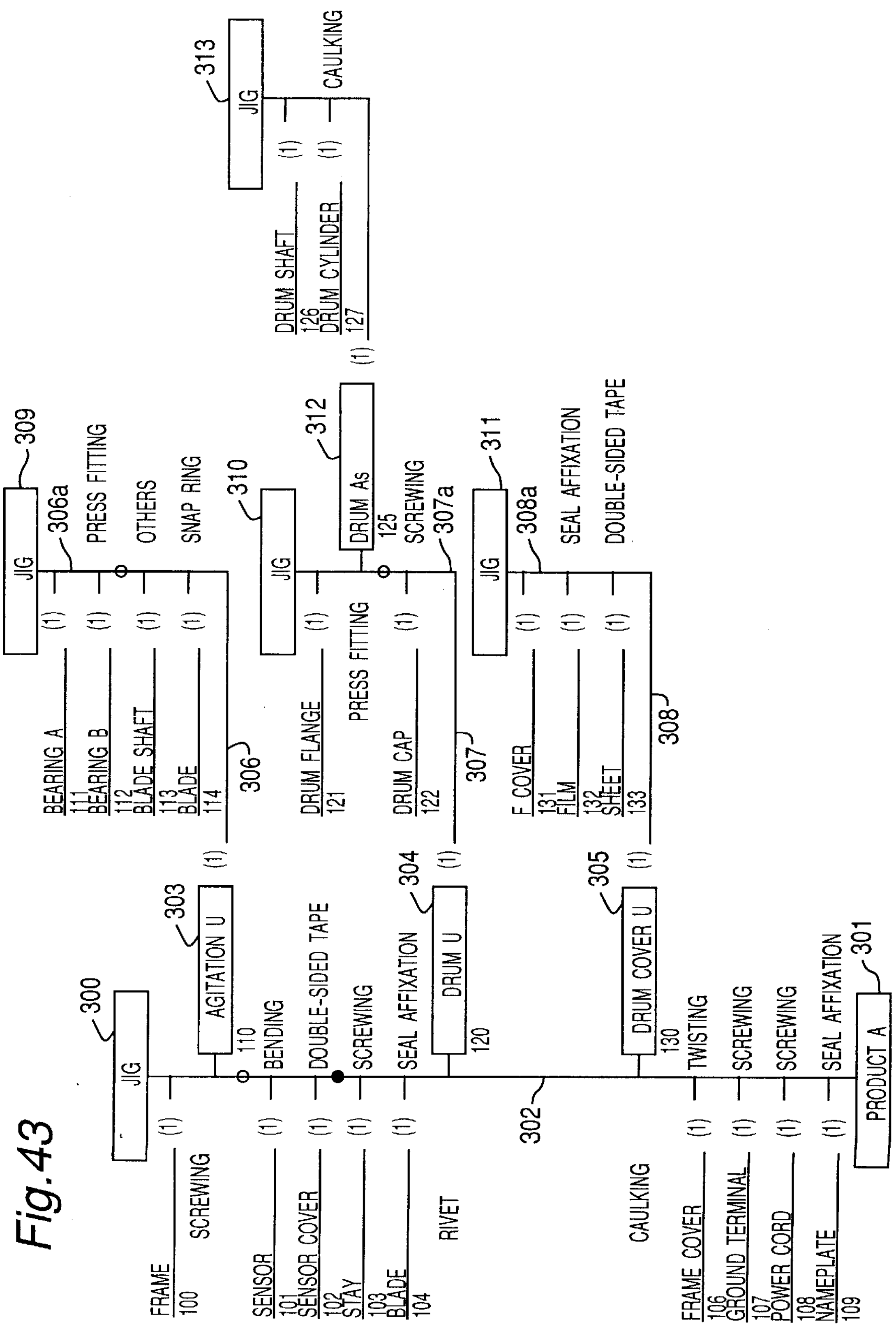
FIG. 43 depicts the example of the assembly flow chart of the embodiment.

When an assembly flow chart is prepared, first, a finished product is disassembled into semifinished products and components. For this disassembly, information may be taken out within the CAD system 1 on the assumption that the finished product is actually disassembled and then entered into the assembly-flow-chart preparing section 7, or results of actual disassembly may be entered from the CAD system 1 into the assembly-flow-chart preparing section 7. It is noted here that the term, component, refers to one aggregate that does not need to be disassembled in the department or company that performs the evaluation of the assemblability, and the like, and refers to a single-unit product (one component) or composite product as mentioned before. Also, the term, semifinished product, refers to a set of single-unit products or composite products composed of components that can be disassembled in the department or company that performs the evaluation of the assemblability and the like. Then, first as shown in FIG. 43, a jig 300 to be first assembled and a product "A" 301 as a finished product example are displayed or entered and then a straight line 302 is drawn from the jig 300 to be first assembled toward the finished product 301. Names of components that are aggregates that do not need to be disassembled in the department or company that performs the evaluation of the assemblability, and the like, are described, for example, on the left side of the straight line 302, while semifinished products that can be disassembled in the department or company that performs the evaluation of the assemblability, and the like (i.e. , that found improvable in design or other process as a result of the evaluation of the assemblability and the like), are described on the right side of the straight line 302, opposite to the left side. Each of the semifinished products, for clear expression of being disassemblable, is surrounded by, for example, a rectangular frame. In FIG. 43, an agitation unit (agitation U) 303, a drum unit (drum U) 304, a drum cover unit (drum cover U) 305, a drum assembly (drum As) 312 are semifinished products. From the individual semifinished products, lateral lines 306, 307, and 308 are drawn rightward to appropriate lengths, upwardly bent straight lines 306*a,* 307*a,* and 308*a* are drawn, further components or semifinished products that constitute the individual semifinished products are disassembled on the left side of the straight lines 306*a,* 307*a,* and 308*a,* and the names of components or semifinished products are described so that jigs 309, 310, and 311 are located at the uppermost ends of the lines. On the right side of the straight lines 306*a,* 307*a,* and 308*a,* which is the opposite side to the left side where the names of the components or semifinished products are described, is described the assembly way for assembling the component or semifinished product.

The example of the assembly flow chart of FIG. 43 is described in more detail.

With the jig 300 for the product "A" regarded as a base component, a frame (component number 100) is placed on this jig 300. Then, with the frame (component number 100) regarded as a base component, an agitation unit 303 (component number 110) is assembled by screwing to this frame (component number 100). Then, with the agitation unit 303 regarded as a base component, a sensor (component number 101) is assembled to this agitation unit 303 by bending work. Then, with the agitation unit 303 regard as a base component, a sensor cover (component number 102) is assembled to this agitation unit 303 by double-sided tape. Then, with the frame (component number 100) regarded as a base component, a stay (component number 103) is assembled to this frame (component number 100) by screwing. Then, with the stay (component number 103) regarded as a base component, a blade (component number 104) is assembled to this stay (component number 103) by seal affixation.

Next, with the frame (component number 100) regard as a base component, a drum unit 304 (component number 120) is assembled to this frame (component number 100) by rivets. After that, with the frame (component number 100) regarded as a base component, a drum cover unit 305 (component number 130) is assembled to this frame (component number 100) by caulking. After that, with the frame (component number 100) regarded as a base component, a frame cover (component number 106) is assembled to this frame (component number 100) by twisting. Then, with the frame cover (component number 106) regarded as a base component, a ground terminal (component number 107) is assembled to this frame cover (component number 106) by screwing. Then, with the agitation unit 303 (component number 110) regarded as a base component, a power cord (component number 108) is assembled to this agitation unit (component number 110) by screwing. Then, with the frame (component number 100) regarded as a base component, a nameplate (component number 109) is assembled to this frame (component number 100) by seal affixation, thus the component "A" 301 being completed.

In this connection, the agitation unit 303 (component number 110) is assembled in advance in the following manner. That is, with the jig 309 for the agitation unit regarded as a base component, a bearing A (component number 111) is placed on this jig 309. Then, a bearing B (component number 112) is assembled to the bearing A (component number 111) by press fitting. Then, with the bearing B (component number 112) regarded as a base component, a blade shaft (component number 113) is assembled to this bearing B (component number 112) by other work. Then, with the blade shaft (component number 113) regarded as a base component, a blade (component number 114) is assembled to this blade shaft (component number 113) by a snap ring, thus the agitation unit 303 (component number 110) being completed.

Also, the drum unit 304 (component number 120) is assembled in the following manner. That is, with the jig 310 for the drum unit regarded as a base component, a drum flange (component number 121) is placed on this jig 310. Then, with the drum flange (component number 121) regarded as a base component, the drum assembly 312 (component number 125) which is a semifinished product is assembled to this drum flange (component number 121) by press fitting. Then, with the drum flange (component number 121) regarded as a base component, a drum cap (component number 122) is assembled to this drum flange (component number 121) by screwing, thus the drum unit 304 being completed.

Also, as to the drum assembly 312, with a jig 313 for the drum assembly regarded as a base component, a drum shaft (component number 126) and a drum cylinder (component number 127) are assembled together by caulking-with the use of this jig 313, thus the drum assembly 312 being completed.

Also, the drum cover unit 305 is assembled in the following manner. That is, with a jig 311 for the drum cover unit regarded as a base component, a frame cover (component number 131) is placed on this jig 311. Then, with the frame cover (component number 131) regarded as a base component, a film (component number 132) is assembled to this frame cover (component number 131) by seal affixation. Then, with the frame cover (component number 131) regarded as a base component, a sheet (component number 133) is assembled to this frame cover (component number 131) by double-sided tape, thus the drum cover unit 305 being completed.

As shown above, changing the base component for each assemble work can also be displayed in the assembly flow chart. Also, information as to the material type of each component can also be included in the assembly flow chart by distinguishing individual components according to their materials by means of color-coding or hatching, or by means of various types of lines such as dotted line or one-dot chain line. Further, when the number of individual components is one, the number can also be displayed as (1).

Figure 44:
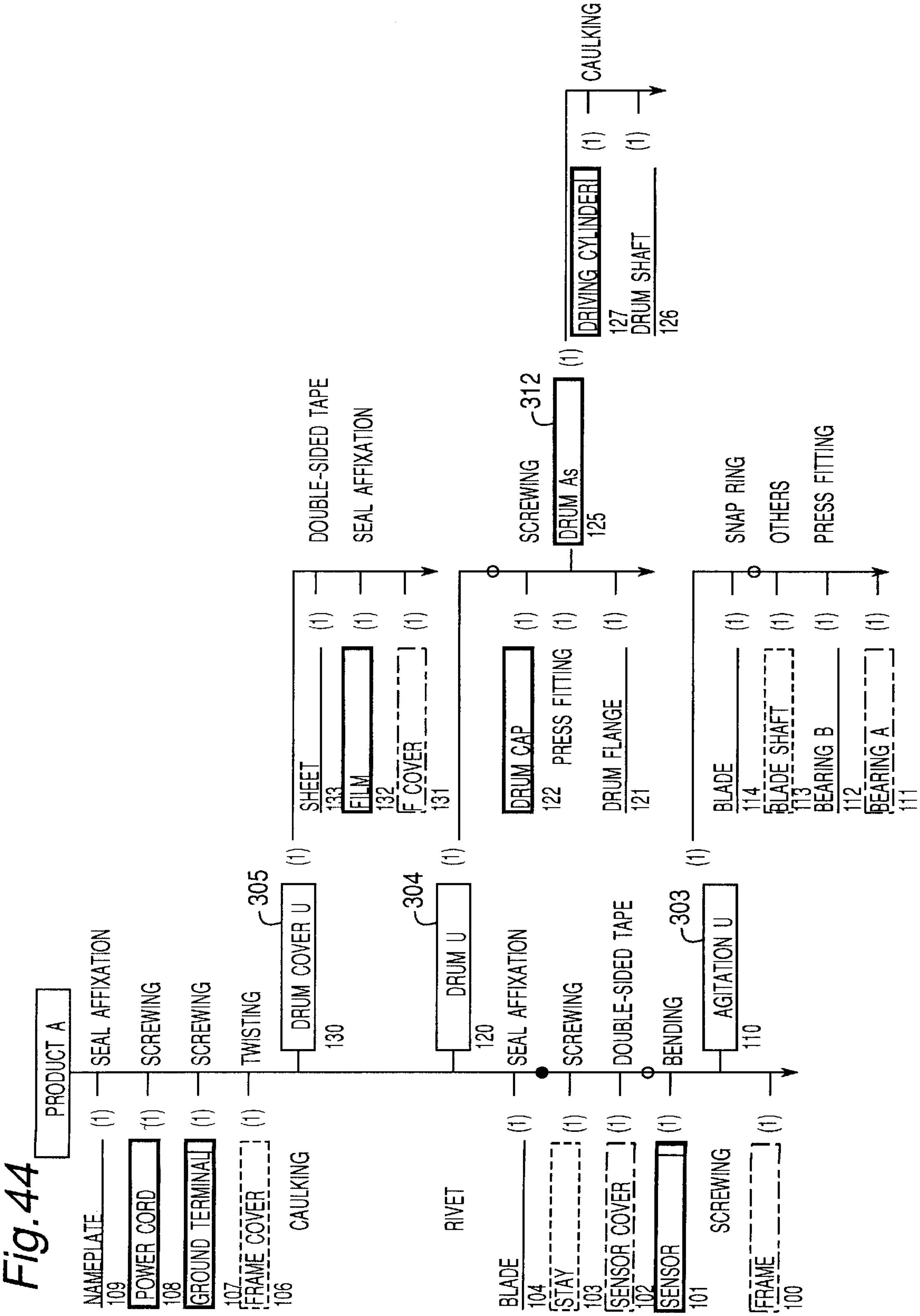
FIG. 44 depicts the example of the reverse-assembly flow chart of the embodiment.

Based on the above assembly flow chart, the procedure for preparing a reverse-assembly flow chart is described with reference to FIG. 44.

With respect to the product "A" 301, first, a nameplate (component number 109) that has been seal-affixed is removed from the frame (component number 100) serving as a base component. Then, the power cord (component number 108) is removed from the agitation unit (component number 110) serving as a base component by loosening the screws. Then, the ground terminal (component number 107) is removed from the frame cover (component number 106) serving as a base component by loosening the screws. Then, the frame cover (component number 106) is removed from the frame (component number 100) serving as a base component by releasing the caulking of the drum cover unit 305 (component number 130).

Then, the drum unit 304 (component number 120) is removed from the frame (component number 100) serving as a base component by removing the rivets. Then, the blade (component number 104) that has been seal-affixed is removed from the stay (component number 103) serving as a base component. Then, the stay (component number 103) is removed from the frame (component number 100) serving as a base component by loosening the screws. Then, the sensor cover (component number 102) affixed by double-sided tape is removed from the agitation unit 303 (component number 110) serving as a base component. Then, the sensor (component number 101) is removed from the agitation unit 303-serving as a base component by bending work. Then, the agitation unit 303 is removed from the frame (component number 100) serving as a base component by loosening the screws of the agitation unit 303, thus the frame (component number 100) being left.

In the above description, as to the removed drum cover unit 305, the sheet (component number 133) that has been affixed by double-sided tape is first removed, the film (component number 132) that has been seal-affixed is removed, and the frame cover (component number 131) is removed, thus the drum cover unit 305 being completely disassembled.

Also, as to the removed drum unit 304, the drum cap (component number 122) is first removed by loosening its screws, the drum assembly 312 (component number 125) is removed by releasing its press fitting, and the drum flange (component number 121) is removed, thus the drum unit 304 being completely disassembled.

Also, as to the removed drum assembly 312, the drum cylinder (component number 127) is removed by releasing its caulking, and the drum shaft (component number 126) is removed, thus the drum assembly 312 being completely disassembled.

Also, as to the removed agitation unit 303, the blade (component number 114) is removed by removing its snap ring, the blade shaft (component number 113) is removed by other work, the bearing B (component number 112) is removed by releasing its press fitting, and the bearing A (component number 111) is removed by releasing its press fitting, thus the agitation unit 303 being completely disassembled.

In addition, information as to the material type of each component can also be included in the reverse-assembly flow chart, like the assembly flow chart, by distinguishing individual components according to their materials by means of color-coding or hatching, or by means of vanous types of lines such as dotted line or one-dot chain line. Further, when the number of individual components is one, the number can also be displayed as (1).

As a result of drawing the assembly flow chart as shown above, the following advantages are produced: (1) The assembly sequence can be clarified, that is, the assembly sequence can be known by even persons other than the input operator or known on even later days; (2) Combining means for assembling the components can be clarified; (3) Semi-finished products and components can be distinguished from each other; (4) Hierarchies and parent-child relations of semifinished products can be clarified; (5) States of base components, e. g. , whether to be inverted. or rotated, can be clarified; and (6) Evaluation omissions of components and semifinished products (units) in the evaluation process can be eliminated.

Like this, by preparing the assembly flow chart, such information as component name, component number, base component name, base component number, posture change of base components, and number of components is sent from the CAD system 1 to the assembly-flow-chart preparing section 7 and further to the component-evaluation-information computing section 8. Accordingly, in the assembly-flow-chart preparing section 7 and the component-evaluation-information computing section 8, the foregoing items do not need to be reentered.

Further, the length of the assembly process can be known by the flow length of the assembly flow chart. Also, the level of how many semifinished products are involved makes known the risk that stock in production may increase. Further, the depth of the hierarchy makes known the length of the production lead time. Also, the size of the area of the entire assembly flow chart makes known the complexity of design.

On the other hand, the following can be known from the reverse-assembly (disassembly) flow chart.

That is, the position on design of components including environmentally loading substances, the route of the disassembly until the environmentally loading substances are taken out, man-hours of the disassembly until the environmentally loading substances are taken out, the position on design of components containing valuables, the route of the disassembly until the valuables are taken out, man-hours of the disassembly until the valuables are taken out, the position on design of recyclables, the route of the disassembly until the recyclables are taken out, man-hours of the disassembly until the recyclables are taken out, how the scope of non-necessity of disassembly (unnecessary-to-disassemble components) ranges, and material distribution of components (the degree of collection of similar kinds of materials) can be known.

For example, although not shown specifically, in the case of a component that is made up by assembling a cover or other component by screwing to a component having a brass nut insert-molded in a base component of synthetic resin, if the inserted nut is eliminated while the base component is made of iron with screws formed therein, then a reduction in the number of components can be implemented so that the recyclability can be enhanced.

Also, as to the manner for decommissioning environmentally loading chemical substances, in the case of a semifinished product in which only the sensor cover is made of an environmentally loading chemical substance that causes toxic gas to be produced in incineration, such as vinyl chloride, while the other components are not environmentally loading chemical substances, this information is displayed in the flow chart by a display unit as an example of the output device 10. Accordingly, for decommissioning of the environmentally loading chemical substance, improvement points can be clearly understood, such as making the sensor cover easier to disassemble from the semifinished product by assembling only the sensor cover independently of the semifinished product, or modifying the design so that the material of the sensor cover is changed to another that is not an environmentally loading chemical substance. Further, in the reverse assemblability evaluation process, whereas part of the environmentally loading chemical substance and part in which materials that are not environmentally loading chemical substances have been assembled together need to be disassembled from each other, the part in which materials that are not environmentally loading chemical substances have been assembled together does not need to be disassembled, showing that the man-hours of the disassembly is reduced.

Also, in the flow chart, when it has been found that five components made of respectively different materials are provided, where the number of kinds of materials is five, changing the number of materials from 5 to 3 kinds produces a part in which components of the same material are assembled together. In such a case, because this part does do not need to be disassembled, man-hours of the disassembly can be reduced. It can also be understood that changing the material, while viewing the flow chart, so that a easy-to-recycle metal part or thermoplastic resins other than hard-to-recycle synthetic resins are increased, facilitates reuse of the materials and enhances their recyclability.

Functions and effects by the assemblability and reverse-assemblability evaluating method and apparatus according to this embodiment are described below.

By the assemblability and reverse-assemblability evaluating method and apparatus of this embodiment, since evaluation items are selected based on the work of actual assembly process, the operator (e.g., designer) enters information on evaluation items directly to the evaluation apparatus based on actual assembly work. On the other hand, it can be seen that, assuming that the reverse-assembly process such as disassembly for which the reverse assemblability such as reusability is evaluated is a reverse flow to the above assembly process, the reverse assemblability is automatically evaluated while information for the evaluation of the reverse assemblability, which is unknown from the assemblability, can be entered. As a result, the operator is able to enter information with a better understanding of the reverse-assembly work such as assembly and disassembly, which helps the operator to definitively determine improvement proposals for both the assemblability and the reverse assemblability.

Also, as evaluation-target products, the evaluation unit may be set as a unit product (semifinished product), a composite product made up of a plurality of components, and one component, without limiting to a finished product, in which case an operator, such as a designer or production line worker, is able to evaluate the assemblability and the reverse assemblability in such a unit that is made closest to the form in which finished products, semifinished products, and components are recognized. Also, for comparisons between the operator's company's new products. and conventional products as well as comparisons with competitive company's products, the! assemblability and the reverse assemblability can be evaluated relatively in such levels as product level, semifinished product level, and component level.

Also, in conventional evaluation of assemblability, there are many cases where only design information such as "positional relation of components" and "tightening means" are taken as evaluation items. However, in such cases, although entry is simple (or can be automatically achieved by direct coupling with a CAD (Computer Aided Design) system), there is a gap from the assemblability in actual assembly work, causing a problem that the evaluation accuracy is sacrificed. In contrast to this, in the method and apparatus of this embodiment, evaluation items representing actual assembly work such as "posture change" and "holdability" make it possible to enter information on assemblability, and the like, so that the operator is helped to make entry and that the assemblability and the reverse assemblability can be evaluated with higher accuracy.

Further, the operator enters information into the evaluation apparatus in response to the questions as to the evaluation items on the assemblability, or on the assemblability and the reverse assemblability, thus making it possible to output forward and reverse assemblability evaluation scores as to the assemblability and the reverse assemblability, a necessary-to-be-improved component list, a reusable component list, an unnecessary-to-disassemble component list, assembly man-hours, disassembly man-hours, and the like, as evaluation results of the assemblability and the reverse assemblability, so that the assemblability and the reverse assemblability can be evaluated simultaneously. That is, according to this embodiment, if the assemblability and reverse assemblability evaluation is performed, for example, at a design stage, then assemblability, such as producibility, as well as reverse assemblability, such as recyclability, can be evaluated simultaneously in a short time, which can lead to a design improvement. Also, since the evaluation of the reverse assemblability is performed principally based on information acquired on evaluation items related to the assemblability, the operator is able to accurately evaluate not only the assemblability but also the reverse assemblability even if he is not so conscious of the reverse assemblability.

Also, as shown in FIG. 4, for the evaluation method and apparatus according to this embodiment, the evaluation items for the assemblability are base components as a basis of the product, suppliability of components of the product, assemble works of the product, tightening types/places, sharability of components, and the like. Outputs as a result of the evaluation on these evaluation items are an assembly flow chart, features of product structure, an assemblability evaluation graph (in this graph, hard-to-assemble components can be extracted), extraction of omittable components, assembly man-hours, and the like. As a result of this, by evaluating the product as to whether it will be easy to produce, an evaluation as a finished product, i.e. as a commercial product, can be achieved.

On the other hand, the evaluation items for the reverse assemblability are material/weight of disassembly components, disassembly works of the product, untightening types/places, degrees of influence on global environment, harmful substances contained in the product, and the like in the disassembly process. Outputs as a result of the evaluation on these evaluation items are a reverse-assembly flow chart, a reverse-assemblability evaluation graph, extraction of unnecessary-to-disassemble/reuse components, use amount of individual materials, reverse-assembly man-hours, rates of recyclability, and the like. As a result of this, by evaluating the product as to whether it will be environment-friendly, an evaluation as a finished product, i.e. as a commercial product, can be achieved.

Also, conventionally, when the evaluation of the assemblability and the evaluation of the reusability are executed independently of each other, it would be difficult to simultaneously accomplish an improvement in the evaluation of the assemblability and an improvement in the evaluation of the reusability. In contrast to this, in this embodiment, since the evaluation of the assemblability and the evaluation of the reverse assemblability are simultaneously executed, it can be easily predicted that if components or units or the like that are worse in the evaluation of the assemblability and the reverse assemblability are improved in terms of low scored items, then the evaluation of both the assemblability and the reverse assemblability can be enhanced, so that improvement in both the assemblability and the reverse assemblability can be accomplished easily and securely.

In addition, the present invention is not limited to the above embodiment and may be embodied in other various ways.

For instance, as evaluation items for entry by the operator, evaluation items for the assemblability may be set without providing evaluation items that are used for only the reverse assemblability, and information acquired from the evaluation items may be selected, as appropriate, and used for the evaluation of the reverse assemblability. In this case also, information on evaluation items that are used only for the evaluation of the reverse assemblability may be acquired from a CAD system or a database having stored information on the reverse assemblability.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of evaluating the assemblability and reverse-assemblability of a product comprising at least one of a single component, a composite component comprising a plurality of single components combined together, a semi-finished product comprising a plurality of single components assembled together or a finished product, said method comprising:

providing assemblability evaluation information items corresponding to assemblability of the product; and simultaneously performing an assemblability evaluation of the product based on the provided assemblability evaluation information items, and a reverse-assemblability evaluation of the product based on a number of the assemblability evaluation information items.

2. The method according to claim 1, further comprising:

providing reverse-assemblability evaluation information items corresponding to reverse-assemblability of the product, wherein said performing the reverse-assemblability evaluation of the product comprises performing the reverse-assemblability evaluation of the product based on the reverse-assemblability evaluation information items and the number of the assemblability evaluation information items.

3. The method according to claim 1, wherein said performing an assemblability evaluation of the product comprises evaluating ease of production of the product or evaluating ease of assembly of the product, wherein said performing a reverse-assemblability evaluation of the product comprises evaluating ease of disassembly of the product, evaluating ease of classification of the product, evaluating ease of reuse of the product and evaluating safety of the product.

4. The method according to claim 1, wherein the assemblability evaluation information items comprise selectional information items comprising at least one of a plurality of answer items, numerical information items comprising numerical values and YES or NO information items, and wherein said simultaneously performing the assemblability evaluation of the product and the reverse-assemblability evaluation of the product comprises providing evaluation scores for the assemblability evaluation information items.

5. The method according to claim 1, wherein the assemblability evaluation information items comprise at least one evaluation information item corresponding to evaluation of preparation for a base component of the product, at least one evaluation information item corresponding to evaluation of suppliability of the base component of the product, at least one evaluation information item corresponding to evaluation of holdability of the base component of the product, at least one evaluation information item corresponding to evaluation of assemblability of the base component of the product, at least one evaluation information item corresponding to evaluation of combinability of the base component of the product, at least one evaluation information item corresponding to evaluation of necessity or non-necessity of adjustment of the base component of the product, at least one evaluation information item corresponding to evaluation of component sharability of the base component of the product and at least one evaluation information item corresponding to evaluation of component omittability of the product.

6. The method according to claim 5, wherein the at least one evaluation information item corresponding to evaluation of preparation for the base component of the product comprises an evaluation information item corresponding to evaluation of posture change of the base component and an evaluation information item corresponding to evaluation of necessity or non-necessity of a jig for the base component, wherein the at least one evaluation information item corresponding to evaluation of suppliability of the product comprises an evaluation information item corresponding to evaluation of posture change of the product, an evaluation information item corresponding to evaluation of vulnerability of the product, an evaluation information item corresponding to evaluation of indefinite shape of the product, an evaluation information item corresponding to evaluation of an outline feature of the product and an evaluation information item corresponding to evaluation of entanglement of the product, wherein the at least one evaluation information item corresponding to evaluation of holdability comprises an evaluation information item corresponding to evaluation of whether a chuck is necessary for holding the product and an evaluation information item corresponding to evaluation of an amount of chuck space needed for holding the product, wherein the at least one evaluation information item corresponding to evaluation of assemblability comprises an evaluation information item corresponding to evaluation of positionability of the product, an evaluation information item corresponding to evaluation of direction of assembly of the product and an evaluation information item corresponding to evaluation of stability of the product, wherein the at least one evaluation information item corresponding to evaluation of combinability comprises an evaluation information item corresponding to evaluation of a number of tightening screws in an assembly process of the product, at least one evaluation information item corresponding to evaluation of a direction of tightening of at least one screw in the assembly process of the product, at least one evaluation information item corresponding to evaluation of at least one place of tightening other than a place of tightening of the at least one tightening screw in the assembly process, an evaluation information item corresponding to an evaluation of a number of tightenings other than the tightening of the at least one tightening screw in the assembly process and at least one evaluation information item corresponding to evaluation of at least one direction of tightening other than the tightening of the at least one tightening screw in the assembly process, wherein the at least one evaluation information item corresponding to evaluation of necessity or non-necessity of adjustment corresponds to evaluation of necessity or non-necessity of adjustments in the assembly process of the product, wherein the at least one evaluation information item corresponding to evaluation of component sharability comprises an evaluation information item corresponding to evaluation of how sharability of components of the product is accomplished, and wherein the at least one evaluation information item corresponding to evaluation of component omittability corresponds to evaluation of possibility that a component of the product can be omitted.

7. The method according to claim 5, further comprising setting an assembly total score for a component of the product that is possible to be omitted from the product to 0 after said performing the assemblability evaluation of the product and after said performing the reverse-assemblability evaluation.

8. The method according to claim 1, further comprising:

providing reverse-assemblability evaluation information items corresponding to evaluation of reverse-assemblability of the product, wherein said providing assemblability evaluation information items comprises providing at least one evaluation information item corresponding to evaluation of disassemblability, wherein the reverse-assemblability evaluation information items comprise at least one evaluation information item corresponding to evaluation of classifiability of the product, at least one evaluation information item corresponding to evaluation of reusability of the product and an evaluation information item corresponding to evaluation of safety of the product, wherein said performing a reverse-assemblability evaluation of the product comprises performing a reverse-assemblability evaluation of the product based on the at least one evaluation information item corresponding to evaluation of disassemblability and the reverse-assemblability evaluation information items.

9. The method according to claim 8, wherein the at least one evaluation information item corresponding to evaluation of disassemblability comprises at least one evaluation information item corresponding to evaluation of de-combinability of the product, which comprises at least one evaluation information item corresponding to evaluation of at least one tightening place of the product, an evaluation information item corresponding to evaluation of pre-processing of the product, an evaluation information item corresponding to evaluation of post-processing of the product, an evaluation information item corresponding to evaluation of combination type of the product, an evaluation information item corresponding to evaluation of combination direction of the product, at least one evaluation information item corresponding to evaluation of tightening screw sharability of the product and at least one evaluation information item corresponding to evaluation of tightening direction of tightening screws of the product, wherein the at least one evaluation information item corresponding to evaluation of classifiability of the product comprises at least one evaluation information item corresponding to evaluation of component weight of the product, at least one evaluation information item corresponding to evaluation of number of the product and at least one evaluation information item corresponding to evaluation of material types of the product, wherein the at least one evaluation information item corresponding to an evaluation of component reusability of the product corresponds to an evaluation of possibility of reuse of components of the product, and wherein the evaluation information item corresponding to evaluation of safety of the product corresponds to an evaluation of whether any harmful substance is contained in the product.

10. The method according to claim 11, further comprising:

providing reverse-assemblability evaluation information items corresponding to reverse-assemblability of the product, wherein the assemblability evaluation information items comprise at least one evaluation information item corresponding to evaluation of preparation for a base component of the product, at least one evaluation information item corresponding to evaluation of suppliability of the base component of the product, at least one evaluation information item corresponding to evaluation of holdability of the base component of the product, at least one evaluation information item corresponding to evaluation of assemblability of the base component of the product, at least one evaluation information item corresponding to evaluation of combinability of the base component of the product, at least one evaluation information item corresponding to evaluation of necessity or non-necessity of adjustment of the base component of the product, at least one evaluation information item corresponding to evaluation of component sharability of the base component of the product and at least one evaluation information item corresponding to evaluation of component omittability of the product, wherein the at least one evaluation information item corresponding to evaluation of preparation for the base component of the product comprises an evaluation information item corresponding to evaluation of posture change of the base component and an evaluation information item corresponding to evaluation of necessity or non-necessity of a jig for the base component, wherein the at least one evaluation information item corresponding to evaluation of suppliability of the product comprises an evaluation information item corresponding to evaluation of posture change of the product, an evaluation information item corresponding to evaluation of vulnerability of the product, an evaluation information item corresponding to evaluation of indefinite shape of the product, an evaluation information item corresponding to evaluation of outline feature of the product and an evaluation information item corresponding to evaluation of entanglement of the product, wherein the at least one evaluation information item corresponding to evaluation of holdability comprises an evaluation information item corresponding to evaluation of whether a chuck is necessary for holding the product and an evaluation information item corresponding to evaluation of an amount chuck space for holding the product, wherein the at least one evaluation information item corresponding to evaluation of assemblability comprises an evaluation information item corresponding to evaluation of positionability of the product, an evaluation information item corresponding to evaluation of direction of assembly of the product and an evaluation information item corresponding to evaluation of stability of the product, wherein the at least one evaluation information item corresponding to evaluation of combinability comprises an evaluation information item corresponding to evaluation of a number of tightening screws in an assembly process of the product, at least one evaluation information item corresponding to evaluation of a direction of tightening of at least one screw in the assembly process of the product, at least one evaluation information item corresponding to evaluation of at least one place of tightening other than a place of tightening of the at least one tightening screw in the assembly process, an evaluation information item corresponding to an evaluation of a number of tightenings other than the tightening of the at least one tightening screw in the assembly process and at least one evaluation information item corresponding to evaluation of at least one direction of tightening other than the tightening of the at least one tightening screw in the assembly process, wherein the at least one evaluation information item corresponding to evaluation of necessity or non-necessity of adjustment corresponds to evaluation of necessity or non-necessity of adjustments in the assembly process of the product, wherein the at least one evaluation information item corresponding to evaluation of component sharability corresponds to evaluation of how sharability of components of the product is accomplished, wherein the at least one evaluation information item corresponding to evaluation of component omittability corresponds to evaluation of possibility that a component of the product can be omitted, wherein the assemblability evaluation information items comprise at least one information item corresponding to evaluation of disassemblability, wherein the reverse-assemblability evaluation information items comprise at least one information item corresponding to evaluation of classifiability of the product, at least one information item corresponding to evaluation of reusability of the product and an information item corresponding to evaluation of safety of the product, wherein the at least one evaluation information item corresponding to evaluation of disassemblability comprises at least one evaluation information item corresponding to evaluation of de-combinability of the product, which comprises at least one evaluation information item corresponding to evaluation of at least one tightening place of the product, an evaluation information item corresponding to evaluation of pre-processing of the product, an evaluation information item corresponding to evaluation of post-processing of the product, an evaluation information item corresponding to evaluation of combination type of the product, an evaluation information item corresponding to evaluation of combination direction of the product, at least one evaluation information item corresponding to evaluation of tightening screw sharability of the product and at least one evaluation information item corresponding to evaluation of tightening direction of tightening screws of the product, wherein the at least one evaluation information item corresponding to evaluation of classifiability of the product comprises at least one evaluation information item corresponding to evaluation of component weight of the product, at least one evaluation information item corresponding to evaluation of number of the product and at least one evaluation information item corresponding to evaluation of material types of the product, wherein the at least one evaluation information item corresponding to an evaluation of component reusability of the product corresponds to an evaluation of possibility of reuse of components of the product, wherein the evaluation information item corresponding to evaluation of safety of the product corresponds to an evaluation of whether any harmful substance is contained in the product, wherein said performing assemblability evaluation and said performing reverse-assemblability evaluation are based on the at least one evaluation information item corresponding to evaluation of combinability and said at least one evaluation information item corresponding to evaluation of component omittability, wherein the at least one evaluation information item corresponding to evaluation of de-combinability of the product and the at least one evaluation information item corresponding to evaluation of classifiability of the product comprise at least one evaluation information item corresponding to evaluation of component weight and at least one evaluation information item corresponding to evaluation of number of material types of the product, and wherein the at least one evaluation information item corresponding to evaluation of classifiability of the product and the least one evaluation information item corresponding to evaluation of safety of the product comprise an evaluation information item corresponding to evaluation of material type of the product.

11. The method according to claim 1, further comprising:

supplying results of the assemblability evaluation; and supplying results of the reverse-assemblability evaluation, wherein the results of the assemblability evaluation comprise at least one of a graph comprising information corresponding to the assemblability evaluation, a table or graph comprising information corresponding to structural characteristics of the product, a table or graph comprising information corresponding to extraction of omittable components and a table or graph comprising information corresponding to assembly man-hours, and wherein the results of the reverse-assemblability evaluation comprise at least one of a flow chart comprising information corresponding to the reverse-assembly of the product, a graph comprising information corresponding to reverse-assemblability evaluation of the product, a table or graph comprising information corresponding to extraction of unnecessary-to-disassemble/reuse components of the product, a table or graph comprising information corresponding to reverse-assembly man-hours of the product, a table or graph comprising information corresponding to use amount of each material of the product and a table or graph comprising information corresponding to rate of recyclability of the product.

12. An apparatus for evaluating the assemblability and reverse-assemblability of a product comprising at least one of a single component, a composite product comprising a plurality: of components that are combined together, a semifinished product comprising a plurality of components that are assembled together, or a finished product, said apparatus operable to receive CAD information corresponding to the product from a CAD system, said apparatus comprising:

a computing unit operable to receive assembly information corresponding to the product, and other information corresponding to component name, assembly sequence and quantity, said computing unit comprising an assembly-flow-chart preparing section and an evaluation database; and a storage unit;

wherein said computing unit is operable to instruct said storage unit to store the assembly information and other information in said storage unit, wherein said computing unit is operable to prepare an assembly flow chart in said assembly-flow-chart preparing section based on the assembly information and the other information stored in said storage unit and based on the CAD information, wherein said computing unit is operable to store the assembly flow chart into the storage unit, wherein said computing unit is operable to extract from the storage unit, information corresponding to assembly components of the product, base components of the product, relations between assembly components of the product and base components of the product, and product component detail information on combination type, wherein said computing unit is operable to perform, based on the extracted information, an assemblability and reverse-assemblability evaluation by using computational equations, evaluation criteria, evaluation scores, man-hours and particular-component extraction logics, necessary for the assemblability and reverse-assemblability evaluation of the product, which are stored in a database for the assemblability and reverse-assemblability evaluation.

13. The apparatus according to claim 12, wherein said computing unit further comprises an evaluation unit that comprises an assemblability evaluation section and a reverse-assemblability evaluation section, wherein said assemblability evaluation section is operable to store information for use for evaluating assemblability of the product comprising type information corresponding to whether the product is a single product, a composite product, or a semifinished product, material information corresponding to the material of the product, base component information corresponding to a base component of the product, suppliability information corresponding to suppliability of the product, holdability information corresponding to holdability of the product, assemblability information corresponding to assemblability of the product, combinability information corresponding to combinability of the product, adjusting work information corresponding to adjusting work of the product, sharability information corresponding to sharability of the product and component omittability information corresponding to component omittability of the product, wherein said assemblability evaluation section is operable to evaluate an assemblability of the product and generate an assemblability evaluation result, wherein said assemblability evaluation section is operable to transfer the type information, the material information, the assemblability information, the combinability information, the sharability information and the component omittability information to said reverse-assemblability evaluation section, wherein said reverse-assemblability evaluation section is operable to store information for use for evaluating reverse-assemblability of the product comprising the type information, the material information, the assemblability information, the combinability information, the sharability information, the component omittability information, component weight information corresponding to a component weight of a component of the product and reusability information corresponding to reusability of the product, and wherein said reverse-assemblability evaluation section is operable to evaluate a reverse-assemblability of the product and generate a reverse-assemblability evaluation result.

14. The apparatus according to claim 13, wherein the component omittability information is capable of being set to 0 at a time after said reverse-assemblability evaluation section evaluates the reverse-assemblability of the product.

15. The apparatus according to claim 12, further comprising an output device, wherein said evaluation unit is operable to transmit the assemblability evaluation result and the reverse-assemblability evaluation result to said storage unit and to said output device, wherein said storage unit is operable to store the assemblability evaluation result and the reverse-assemblability evaluation result, wherein said output device is operable to output the assemblability evaluation result as a graph or table, and wherein said output device is operable to output the reverse-assemblability evaluation result as a graph or table.

16. The apparatus according to claim 12, wherein the assembly information comprises information corresponding to ease of production of the product or information corresponding to ease of assembly of the product, and wherein the reverse assemblability information comprises information corresponding to disassemblability of the product, information corresponding to classifiability of the product, information corresponding to reusability of the product and information corresponding to safety.

17. The apparatus according to claim 12, further comprising an input device operable to input assemblability evaluation information items comprising selectional information items comprising at least one of a plurality of answer items, numerical information items comprising numerical values, and YES/NO information items, wherein said apparatus is operable to simultaneously evaluate the assemblability of the product and the reverse-assemblability of the product, and wherein said apparatus is operable to generate an assemblability score and a reverse-assemblability score based on the evaluation of the assemblability of the product and the reverse-assemblability of the product, respectively.

18. The apparatus according to claim 12, wherein said apparatus is operable to store evaluation information items comprising at least one evaluation information item corresponding to evaluation of preparation for a base component of the product, at least one evaluation information item corresponding to evaluation of suppliability of the base component of the product, at least one evaluation information item corresponding to evaluation of holdability of the base component of the product, at least one evaluation information item corresponding to evaluation of assemblability of the base component of the product, at least one evaluation information item corresponding to evaluation of combinability of the base component of the product, at least one evaluation information item corresponding to evaluation of necessity or non-necessity of adjustment of the base component of the product, at least one evaluation information item corresponding to evaluation of component sharability of the base component of the product and at least one evaluation information item corresponding to evaluation of component omittability of the product.

19. The apparatus according to claim 18, wherein the at least one evaluation information item corresponding to evaluation of preparation for-the base component of the product comprises an evaluation information item corresponding to evaluation of posture change of the base component and an evaluation information item corresponding to evaluation of necessity or non-necessity of a jig for the base component, wherein the at least one evaluation information item corresponding to evaluation of suppliability of the product comprises an evaluation information item corresponding to evaluation of posture change of the product, an evaluation information item corresponding to evaluation of vulnerability of the product, an evaluation information item corresponding to evaluation of indefinite shape of the product, an evaluation information item corresponding to evaluation of an outline feature of the product and an evaluation information item corresponding to evaluation of entanglement of the product, wherein the at least one evaluation information item corresponding to evaluation of holdability comprises an evaluation information item corresponding to evaluation of whether a chuck is necessary for holding the product and an evaluation information item corresponding to evaluation of an amount of chuck space needed for holding the product, wherein the at least one evaluation information item corresponding to evaluation of assemblability comprises an evaluation information item corresponding to evaluation of positionability of the product, an evaluation information item corresponding to evaluation of direction of assembly of the product and an evaluation information item corresponding to evaluation of stability of the product, wherein the at least one evaluation information item corresponding to evaluation of combinability comprises an evaluation information item corresponding to evaluation of a number of tightening screws in an assembly process of the product, at least one evaluation information item corresponding to evaluation of a direction of tightening of at least one screw in the assembly process of the product, at least one evaluation information item corresponding to evaluation of at least one place of tightening other than a place of tightening of the at least one tightening screw in the assembly process, an evaluation information item corresponding to an evaluation of a number of tightenings other than the tightening of the at least one tightening screw in the assembly process and at least one evaluation information item corresponding to evaluation of at least one direction of tightening other than the tightening of the at least one tightening screw in the assembly process, wherein the at least one evaluation information item corresponding to evaluation of necessity or non-necessity of adjustment corresponds to evaluation of necessity or non-necessity of adjustments in the assembly process of the product, wherein the at least one evaluation information item corresponding to evaluation of component sharability comprises an evaluation information item corresponding to evaluation of manner for accomplishing sharability of components of the product, and wherein the at least one evaluation information item corresponding to evaluation of component omittability corresponds to evaluation of possibility that a component of the product can be omitted.

20. The apparatus according to claim 12, wherein the evaluation criteria comprises evaluation information items corresponding to the reverse assemblability which comprise at least one evaluation information item corresponding to disassemblability of the product, at least one evaluation information item corresponding to classifiability of the product, at least one evaluation information item corresponding to reusability of the product and an evaluation information item corresponding to safety of the product.

21. The apparatus according to claim 20, wherein the at least one evaluation information item corresponding to evaluation of disassemblability comprises at least one evaluation information item corresponding to evaluation of de-combinability of the product, which comprises at least one evaluation information item corresponding to evaluation of at least one tightening place of the product, an evaluation information item corresponding to evaluation of pre-processing of the product, an evaluation information item corresponding to evaluation of post-processing of the product, an evaluation information item corresponding to evaluation of combination type of the product, an evaluation information item corresponding to evaluation of combination direction of the product, at least one evaluation information item corresponding to evaluation of tightening screw sharability of the product and at least one evaluation information item corresponding to evaluation of tightening direction of tightening screws of the product, wherein the at least one evaluation information item corresponding to evaluation of classifiability of the product comprises at least one evaluation information item corresponding to evaluation of component weight of the product, at least one evaluation information item corresponding to evaluation of number of the product and at least one evaluation information item corresponding to evaluation of material types of the product, wherein the at least one evaluation information item corresponding to an evaluation of component reusability of the product corresponds to an evaluation of possibility of reuse of components of the product, and wherein the evaluation information item corresponding to evaluation of safety of the product corresponds to an evaluation of whether any harmful substance is contained in the product.

22. The apparatus according to claim 12, wherein the evaluation criteria comprises assemblability evaluation information items corresponding to assemblability of the product and reverse-assemblability evaluation information items corresponding to reverse-assemblability of the product, wherein the assemblability evaluation information items comprise at least one evaluation information item corresponding to evaluation of preparation for a base component of the product, at least one evaluation information item corresponding to evaluation of suppliability of the base component of the product, at least one evaluation information item corresponding to evaluation of holdability of the base component of the product, at least one evaluation information item corresponding to evaluation of assemblability of the base component of the product, at least one evaluation information item corresponding to evaluation of combinability of the base component of the product, at least one evaluation information item corresponding to evaluation of necessity or non-necessity of adjustment of the base component of the product, at least one evaluation information item corresponding to evaluation of component sharability of the base component of the product and at least one evaluation information item corresponding to evaluation of component omittability of the product, wherein the at least one evaluation information item corresponding to evaluation of preparation for the base component of the product comprises an evaluation information item corresponding to evaluation of posture change of the base component and an evaluation information item corresponding to evaluation of necessity or non-necessity of a jig for the base component, wherein the at least one evaluation information item corresponding to evaluation of suppliability of the product comprises an evaluation information item corresponding to evaluation of posture change of the product, an evaluation information item corresponding to evaluation of vulnerability of the product, an evaluation information item corresponding to evaluation of indefinite shape of the product, an evaluation information item corresponding to evaluation of outline feature of the product and an evaluation information item corresponding to evaluation of entanglement of the product, wherein the at least one evaluation information item corresponding to evaluation of holdability comprises an evaluation information item corresponding to evaluation of whether a chuck is necessary for holding the product and an evaluation information item corresponding to evaluation of an amount chuck space for holding the product, wherein the at least one evaluation information item corresponding to evaluation of assemblability comprises an evaluation information item corresponding to evaluation of positionability of the product, an evaluation information item corresponding to evaluation of direction of assembly of the product and an evaluation information item corresponding to evaluation of stability of the product, wherein the at least one evaluation information item corresponding to evaluation of combinability comprises an evaluation information item corresponding to evaluation of a number of tightening screws in an assembly process of the product, at least one evaluation information item corresponding to evaluation of a direction of tightening of at least one screw in the assembly process of the product, at least one evaluation information item corresponding to evaluation of at least one place of tightening other than a place of tightening of the at least one tightening screw in the assembly process, an evaluation information item corresponding to an evaluation of a number of tightenings other than the tightening of the at least one tightening screw in the assembly process and at least one evaluation information item corresponding to evaluation of at least one direction of tightening other than the tightening of the at least one tightening screw in the assembly process, wherein the at least one evaluation information item corresponding to evaluation of necessity or non-necessity of adjustment corresponds to evaluation of necessity or non-necessity of adjustments in the assembly process of the product, wherein the at least one evaluation information item corresponding to evaluation of component sharability corresponds to evaluation of how sharability of components of the product is accomplished, wherein the at least one evaluation information item corresponding to evaluation of component omittability corresponds to evaluation of possibility that a component of the product can be omitted, wherein the assemblability evaluation information items comprise at least one information item corresponding to evaluation of disassemblability, wherein the reverse-assemblability evaluation information items comprise at least one information item corresponding to evaluation of classifiability of the product, at least one information item corresponding to evaluation of reusability of the product and an information item corresponding to evaluation of safety of the product, wherein the at least one evaluation information item corresponding to evaluation of disassemblability comprises at least one evaluation information item corresponding to evaluation of de-combinability of the product, which comprises at least one evaluation information item corresponding to evaluation of at least one tightening place of the product, an evaluation information item corresponding to evaluation of pre-processing of the product, an evaluation information item corresponding to evaluation of post-processing of the product, an evaluation information item corresponding to evaluation of combination type of the product, an evaluation information item corresponding to evaluation of combination direction of the product, at least one evaluation information item corresponding to evaluation of tightening screw sharability of the product, and at least one evaluation information item corresponding to evaluation of tightening direction of tightening screws of the product, wherein the at least one evaluation information item corresponding to evaluation of classifiability of the product comprises at least one evaluation information item corresponding to evaluation of component weight of the product, at least one evaluation information item corresponding to evaluation of number of the product and at least one evaluation information item corresponding to evaluation of material types of the product, wherein the at least one evaluation information item corresponding to an evaluation of component reusability of the product corresponds to an evaluation of possibility of reuse of components of the product, wherein the evaluation information item corresponding to evaluation of safety of the product corresponds to an evaluation of whether any harmful substance is contained in the product, wherein said apparatus is operable to perform an assemblability evaluation and a reverse-assemblability evaluation based on the at least one evaluation information item corresponding to evaluation of combinability and said at least one evaluation information item corresponding to evaluation of component omittability, wherein the at least one evaluation information item corresponding to evaluation of de-combinability of the product and the at least one evaluation information item corresponding to evaluation of classifiability of the product comprise at least one evaluation information item corresponding to evaluation of component weight and at least one evaluation information item corresponding to evaluation of number of material types of the product, and wherein the at least one evaluation information item corresponding to evaluation of classifiability of the product and the least one evaluation information item corresponding to evaluation of safety of the product comprise an evaluation information item corresponding to evaluation of material type of the product.

23. The apparatus according to claim 12, further comprising:

an output device that is operable to output an assemblability evaluation result and a reverse-assemblability evaluation result, wherein the assemblability evaluation result comprises at least one of a graph comprising information corresponding to the assemblability evaluation, a table or graph comprising information corresponding to structural characteristics of the product, a table or graph comprising information corresponding to extraction of omittable components and a table or graph comprising information corresponding to assembly man-hours, and wherein the reverse-assemblability evaluation result comprises at least one of a flow chart comprising information corresponding to the reverse-assembly of the product, a graph comprising information corresponding to reverse-assemblability evaluation of the product, a table or graph comprising information corresponding to extraction of unnecessary-to-disassemble/reuse components of the product, a table or graph comprising information corresponding to reverse-assembly man-hours of the product, a table or graph comprising information corresponding to use amount of each material of the product and a table or graph comprising information corresponding to rate of recyclability of the product.

* * * * *

UNITED STATES PATENT AND TRADEMARK OFFICE

CERTIFICATE OF CORRECTION

PATENT NO. : 6,434,438 B1
DATED : August 13, 2002
INVENTOR(S) : Keiichi Jin et al.

It is certified that error appears in the above-identified patent and that said Letters Patent is hereby corrected as shown below:

Title page,
Item [56], FOREIGN PATENT DOCUMENTS, replace "96-190152" with -- 9-190152 --.

Column 36,
Line 52, replace "claim 11" with -- claim 1 --.

Column 39,
Line 42, replace "plurality:" with -- plurality --.

Column 41,
Line 56, replace "for-the" with -- for the --.

Signed and Sealed this

Twenty-ninth Day of April, 2003

JAMES E. ROGAN
*Director of the United States Patent and Trademark Office*